(12) United States Patent
Onuki et al.

(10) Patent No.: US 7,113,318 B2
(45) Date of Patent: Sep. 26, 2006

(54) LIGHT AMOUNT CONTROL APPARATUS, PHOTOGRAPHING APPARATUS, AND FILTER

(75) Inventors: Ichiro Onuki, Kanagawa (JP); Takeshi Miyazaki, Kanagawa (JP); Akio Kashiwazaki, Kanagawa (JP); Eriko Namazue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 10/837,178

(22) Filed: Apr. 30, 2004

(65) Prior Publication Data

US 2004/0218246 A1 Nov. 4, 2004

(30) Foreign Application Priority Data

Apr. 30, 2003 (JP) ............................. 2003-125310
Apr. 30, 2003 (JP) ............................. 2003-125311

(51) Int. Cl.
*G02B 26/02* (2006.01)
*G03B 7/00* (2006.01)

(52) U.S. Cl. ...................... 359/234; 359/230; 359/233; 396/241

(58) Field of Classification Search ...................... None
See application file for complete search history.

(56) References Cited

U.S. PATENT DOCUMENTS 6,533,473 B1 * 3/2003 Edamitsu et al. ........... 396/450
2004/0021758 A1 2/2004 Miyazaki et al.

FOREIGN PATENT DOCUMENTS

| JP | 51-145929 | 11/1976 |
|---|---|---|
| JP | 6-273655 | 9/1994 |
| JP | 8-043878 | 2/1996 |
| JP | 11-218797 | 8/1999 |
| JP | 2000-106649 | 4/2000 |
| JP | 2000-155352 | 6/2000 |
| JP | 2002-064745 | 2/2002 |
| JP | 2002-204390 | 7/2002 |
| JP | 2004-246306 | 9/2004 |

OTHER PUBLICATIONS

English Abstract for Japanese Patent Application Laid-Open No. 6-273655.
English Abstract for Japanese Patent Application Laid-Open No. 8-043878.
English Abstract for Japanese Patent Application Laid-Open No. 11-218797.

(Continued)

*Primary Examiner*—James Phan
(74) *Attorney, Agent, or Firm*—Morgan & Finnegan, L.L.P.

(57) ABSTRACT

It is an object of this invention to independently control the F-number and the number of light attenuation steps of a multi-density ND filter by using a light amount control apparatus using an iris stop and the ND filter. The iris stop mechanism made up of a plurality of aperture blades and the ND filter having a multi-density pattern are stacked in a single unit. This simultaneously realizes continuous control of the F-number, multi-step control of the light attenuation ratio of the ND filter, a substantially circular stop aperture, and a uniform transmittance distribution in the stop aperture. In the first embodiment, the driving region of an actuator is divided into an ND control region and aperture control region. This makes it possible to independently control the F-number and the number of ND steps by the single actuator.

2 Claims, 32 Drawing Sheets

OTHER PUBLICATIONS

English Abstract for Japanese Patent Application Laid-Open No. 2000-155352.

English Abstract for Japanese Patent Application Laid-Open No. 2000-106649.

English Abstract for Japanese Patent Application Laid-Open No. 2002-064745.

English Abstract for Japanese Patent Application Laid-Open No. 2002-204390.

* cited by examiner

ROTATIONAL ANGLE 0°

ROTATIONAL ANGLE 30°

ROTATIONAL ANGLE 60°

ROTATIONAL ANGLE 90°

ROTATIONAL ANGLE 120°

FIG. 6

| | PHOTOGRAPHING MODE | FEATURE OF EXPOSURE CONTROL | ND CONTROL METHOD |
|---|---|---|---|
| STILL IMAGE MODE | (1) FULL AUTOMATIC | COMBINATION OF STANDARD SHUTTER SPEED AND F-NUMBER | · AUTOMATICALLY SELECTED IN ACCORDANCE WITH PHOTOMETRIC VALUE BEFORE PHOTOGRAPHING<br>· FIXED ON AND AFTER SECOND FRAME IN CONTINUOUS PHOTOGRAPHING |
| | (2) LANDSCAPE | INCREASE DEPTH OF FIELD (DECREASE APERTURE DIAMETER) | |
| | (3) SPORTS | HIGH-SPEED SHUTTER (INCREASE APERTURE DIAMETER) | |
| | (4) PORTRAIT | DECREASE DEPTH OF FIELD (INCREASE APERTURE DIAMETER) | |
| | (5) CLOSE-UP (MACRO) | INCREASE DEPTH OF FIELD (DECREASE APERTURE DIAMETER) | |
| | (6) PROGRAM AE | COMBINATION OF STANDARD SHUTTER SPEED AND F-NUMBER | · MANUALLY SELECTED |
| | (7) SHUTTER-PRIORITY AE | PHOTOGRAPHER SELECTS SHUTTER SPEED | |
| | (8) APERTURE-PRIORITY AE | PHOTOGRAPHER SELECTS F-NUMBER | |
| | (9) MANUAL | PHOTOGRAPHER SELECTS SHUTTER SPEED AND F-NUMBER | |
| MOTION IMAGE MODE | (11) FULL AUTOMATIC | COMBINATION OF STANDARD SHUTTER SPEED AND F-NUMBER | · AUTOMATICALLY SELECTED IN ACCORDANCE WITH PHOTOMETRIC VALUE BEFORE PHOTOGRAPHING<br>· FIXED DURING PHOTOGRAPHING |
| | (12) SPORTS | COMBINATION OF STANDARD SHUTTER SPEED AND F-NUMBER | |
| | (13) SURF & SNOW | OVEREXPOSURE BY CORRECTION | |
| | (14) SPOTLIGHT | CORRECTLY EXPOSE HIGHLIGHT PORTION | |
| | (15) PORTRAIT | DECREASE DEPTH OF FIELD (INCREASE APERTURE DIAMETER) | |
| | (16) NIGHT | CORRECTLY EXPOSE HIGHLIGHT PORTION | |

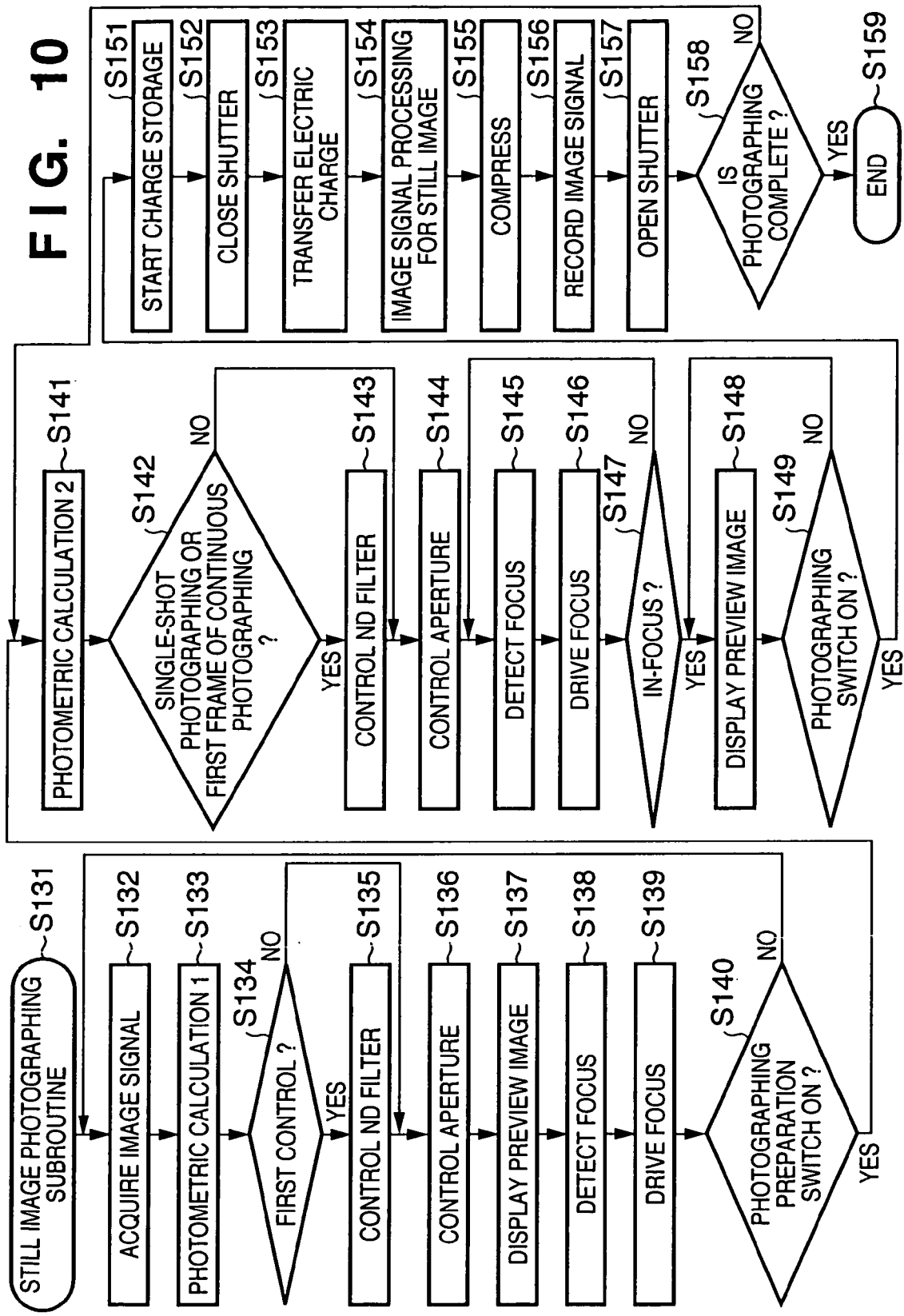

APERTURE OPERATION

ND FILTER OPERATION

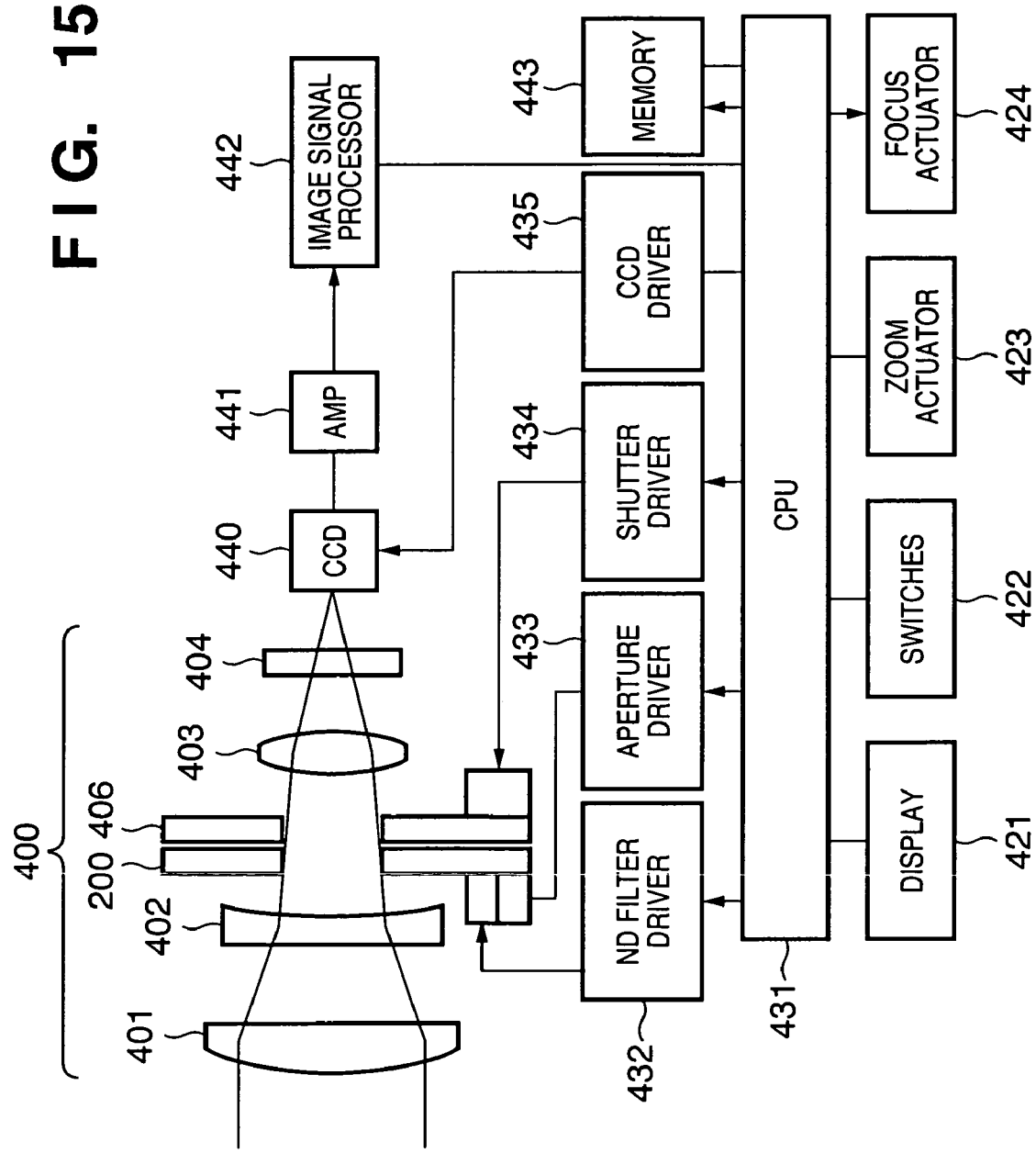

DENSITY DISTRIBUTION

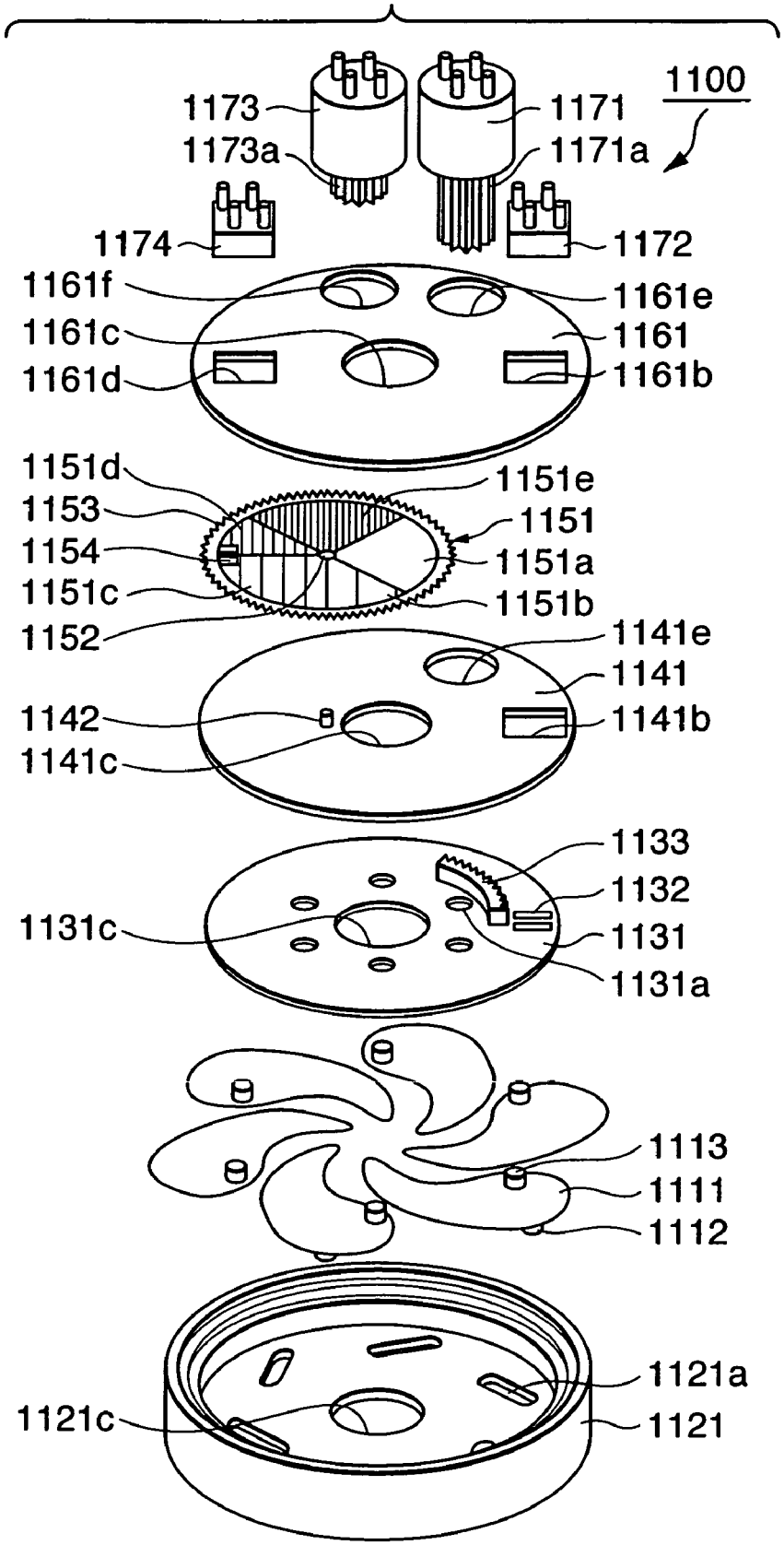

ROTATIONAL ANGLE 0°

ROTATIONAL ANGLE 67.5°

ROTATIONAL ANGLE 135°

ROTATIONAL ANGLE 202.5°

ROTATIONAL ANGLE 270°

ROTATIONAL ANGLE 0°

ROTATIONAL ANGLE 45°

ROTATIONAL ANGLE 90°

ROTATIONAL ANGLE 135°

ROTATIONAL ANGLE 180°

ROTATIONAL ANGLE 225°

ROTATIONAL ANGLE 270°

LIGHT AMOUNT CONTROL APPARATUS, PHOTOGRAPHING APPARATUS, AND FILTER

FIELD OF THE INVENTION

The present invention relates to a light amount control apparatus having a light amount attenuating function, a photographing apparatus, and a filter.

BACKGROUND OF THE INVENTION

Conventionally, a video camera which records motion images on a magnetic tape medium by using an image sensing means such as a CCD (Charge-Coupled Device) or a CMOS (Complementary Metal-Oxide Semiconductor) and a digital still camera which records still images on a solid memory medium by using a similar image sensing means have been produced. Recently, as the capacity of the solid memory medium is increased and the speed and performance of an image signal processor of a photographing apparatus are improved, photographing apparatuses having functions of both motion image photographing and still image photographing are also beginning to be widely used. On the other hand, as the interval between unit light-receiving portions, that is, a so-called pixel pitch of an image sensing means is decreased, the influence of diffraction caused by a stop aperture for light amount control which a photographing optical system has is no longer negligible. That is, when the size of the stop aperture decreases in high-luminance object photographing or slow-shutter photographing, the image contrast lowers by the influence of so-called small-aperture diffraction. This makes it impossible to well achieve the original image forming performance of the photographing optical system or the high pixel capability of the image sensing means, so no high-resolution images can be obtained. To alleviate this small-aperture diffraction, therefore, a technique using a neutral density filter (to be referred to as an ND filter hereinafter) for attenuating the transmitted light amount is disclosed.

When the ND filter is used for this purpose, the naturalness of blurred images and the resolution and continuity of light amount control are also important as well as the original purpose, that is, the prevention of diffraction. To solve this problem, the following techniques are disclosed.

For example, Japanese Utility Model Laid-Open No. 51-145929 discloses a stop mechanism which uses ND filters having gradation as an appropriate number of aperture blades of an iris diaphragm made up of a large number of aperture blades. In this stop mechanism, the ND filters enter into a light beam after light-shielding blades are stopped down to the minimum aperture diameter, thereby controlling the light amount.

Japanese Patent Laid-Open No. 6-273655 discloses a lens barrel which includes a turret diaphragm and a turret ND filter, and controls the light amount by individually driving these members by using different actuators.

Japanese Patent Laid-Open No. 8-43878 discloses a stop device in which an ND filter whose transmittance decreases outward in the radial direction from the optical axis is formed for each of two aperture blades, and the light amount is controlled by driving the two aperture blades relative to each other.

Japanese Patent Laid-Open No. 11-218797 discloses an exposure control mechanism in which a turret aperture plate and ND filter are stacked in the optical axis direction, and these two members are driven by a single motor.

Japanese Patent Laid-Open No. 2000-155352 discloses a stop device in which the aperture diameter is controlled by operating a large number of aperture blades having the same shape in accordance with the operation of an actuator, and the light amount is controlled by inserting an ND filter into the aperture in a region in which the aperture diameter is changed little by the aperture blades.

Japanese Patent Laid-Open No. 2000-106649 discloses an apparatus which independently controls driving of iris blades for forming a stop aperture and an ND filter having a multilevel density.

Unfortunately, the above conventional techniques have the following drawbacks.

In the conventional techniques disclosed in Japanese Utility Model Laid-Open No. 51-145929 and Japanese Patent Laid-Open No. 2000-155352, the ND filters enter into a light beam after the light-shielding blades are stopped down to the minimum aperture diameter. This eliminates the degree of freedom of control of the ND filters. In particular, if the ND filters suddenly enter when a dark scene changes to a bright scene during motion image photographing, the continuity of exposure control deteriorates. This significantly degrades the naturalness of the reproduced motion image.

In the conventional technique disclosed in Japanese Patent Laid-Open No. 6-273655, the aperture is made up of a plurality of holes formed in a turret plate, so the F-number cannot be finely adjusted. In the second embodiment, a spiral hole having a continuously changing aperture width is used as an aperture. However, a circular stop aperture can not be obtained by this mechanism, so blurred images have unnatural shapes.

In the conventional technique disclosed in Japanese Patent Laid-Open No. 8-43878, the ND filter enters into the aperture in an open aperture state. This produces a light amount loss at open aperture. Also, since the aperture blades and ND filter are driven together, the degree of freedom of control of the ND filter is lost.

In the conventional technique disclosed in Japanese Patent Laid-Open No. 11-218797, the ND filter having a uniform density completely covers the stop aperture or does not cover the stop aperture at all. Therefore, no multi-step light amount control by the ND filter can be performed.

In the conventional technique disclosed in Japanese Patent Laid-Open No. 2000-106649, the rhombic shape of the stop aperture makes the shapes of blurred images unnatural. Also, since the strip-like ND filter requires a large accommodating space, the size of the whole apparatus increases.

On the other hand, in a photographing apparatus having functions of both motion image photographing and still image photographing, the image sizes (the numbers of photographing pixels) of acquired motion images and still images are generally different. That is, low-pixel images are continuously acquired during motion image photographing, and one to about a few frames of high-pixel images are acquired during still image photographing. In this case, even when the stop aperture diameter, that is, the F-number of a photographing optical system remains the same, small-aperture diffraction affects low-pixel motion images and high-pixel still images to different degrees. Therefore, techniques in which the forms of stop aperture control for motion image photographing and still image photographing are different are disclosed as follows.

In Japanese Patent Laid-Open No. 2002-64745, only a normal aperture range (e.g., the range of F2.8 to F8) having guaranteed optical performance is used in normal photographing (of still images). That is, the use of an open aperture having a large aberration is limited, or the use of a small aperture which increases the influence of diffraction is limited, thereby preventing deterioration of the image quality and obtaining high-resolution images. Also, when thinned-out photographing (of motion images) is to be performed, low-pixel images need only be acquired. Since this increases the allowance of optical aberration, a wide aperture range (e.g., the range of F1.4 to F11) by which the optical performance deteriorates is used to widen the exposure control range.

Likewise, in Japanese Patent Laid-Open No. 2002-204390, the F-number control range is limited from F1.4 to F16 during motion image photographing, and limited from F2.8 to F8 during still image photographing, thereby obtaining the same effect as in Japanese Patent Laid-Open No. 2002-64745 described above.

Unfortunately, the above conventional techniques still have the following drawbacks.

In the conventional technique disclosed in Japanese Patent Laid-Open No. 8-43878, the ND filter enters the aperture in an open aperture state. This produces a light amount loss at open aperture. Also, the density distribution of the ND filter in the vertical direction of the stop aperture differs from that in the horizontal direction of the stop aperture. This makes a blurred image unnatural when an object having a large distance difference is photographed. Accordingly, this structure is particularly unsuited to still image photographing requiring high-quality images.

Japanese Patent Laid-Open Nos. 2002-64745 and 2002-204390 disclose the techniques of performing optimum aperture control for each of motion image photographing and still image photographing. However, no light amount control using an ND filter is disclosed, and the prevention of small-aperture diffraction is unsatisfactory.

The conventional technique disclosed in Japanese Patent Laid-Open No. 2000-106649 has a degree of freedom of transmittance control by a stop aperture diameter and ND filter. However, details of switching between the control forms of motion image photographing and still image photographing are not described.

SUMMARY OF THE INVENTION

The present invention has been made in consideration of the above situation, and has as its object to provide a small-sized, inexpensive light amount control apparatus, photographing apparatus, and filter having a large degree of freedom of light amount control, and capable of holding a predetermined shape of an aperture during stopping down.

It is another object of the present invention to provide a filter having a predetermined density distribution, and a light amount control apparatus and photographing apparatus capable of obtaining high-quality images by using the filter.

To achieve the above objects, according to the first aspect of the present invention, a light amount control apparatus for controlling an amount of a light beam passing through an opening comprises a stop device having a plurality of aperture blades, a rotatably supported filter having a predetermined optical density distribution, and a controller which arranges the aperture device and the filter adjacent to each other in an optical axis direction, and independently controls a stop aperture diameter of the aperture device and a light amount attenuating function of the filter.

According to the second aspect of the present invention, a light amount control apparatus for controlling an amount of a light beam passing through an opening comprises a stop device having a plurality of aperture blades, a rotatably supported filter having a predetermined optical density distribution, and an actuator which drives the aperture device and the filter.

According to the third aspect of the present invention, a filter for attenuating a light beam passing through an opening having a predetermined size by covering the opening is rotatably supported around a predetermined rotation center, and an optical density changes step by step or continuously in a phase angle direction around the rotation center.

According to the fourth aspect of the present invention, a light amount control apparatus for controlling an amount of a light beam passing through an opening comprises a filter having a first region having a first optical density, a driving device which moves the first region relative to the opening, and a controller which can select a first control mode which permits the first region to partially cover the opening, and a second control mode which inhibits the first region to cover a portion of the opening.

According to the fifth aspect of the present invention, in a filter having a first region having a first optical density and a second region having a second optical density different form the first optical density in order to cover an opening having a predetermined size, the first and second optical densities are connected step by step or continuously in a boundary between the first and second regions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for explaining photographing modes of the photographing apparatus according to the first embodiment;

FIG. 10 is a flow chart of a still image photographing subroutine flow in the first embodiment;

FIG. 15 is a block diagram of a photographing apparatus according to the second embodiment;

FIG. 18 is an exploded perspective view of a light amount control apparatus according to the fourth embodiment;

DETAILED DESCRIPTION OF THE PREFERRED EMBODIMENTS (First Embodiment)

FIGS. 1 to 11C are views related to the first embodiment.

Figure 1:
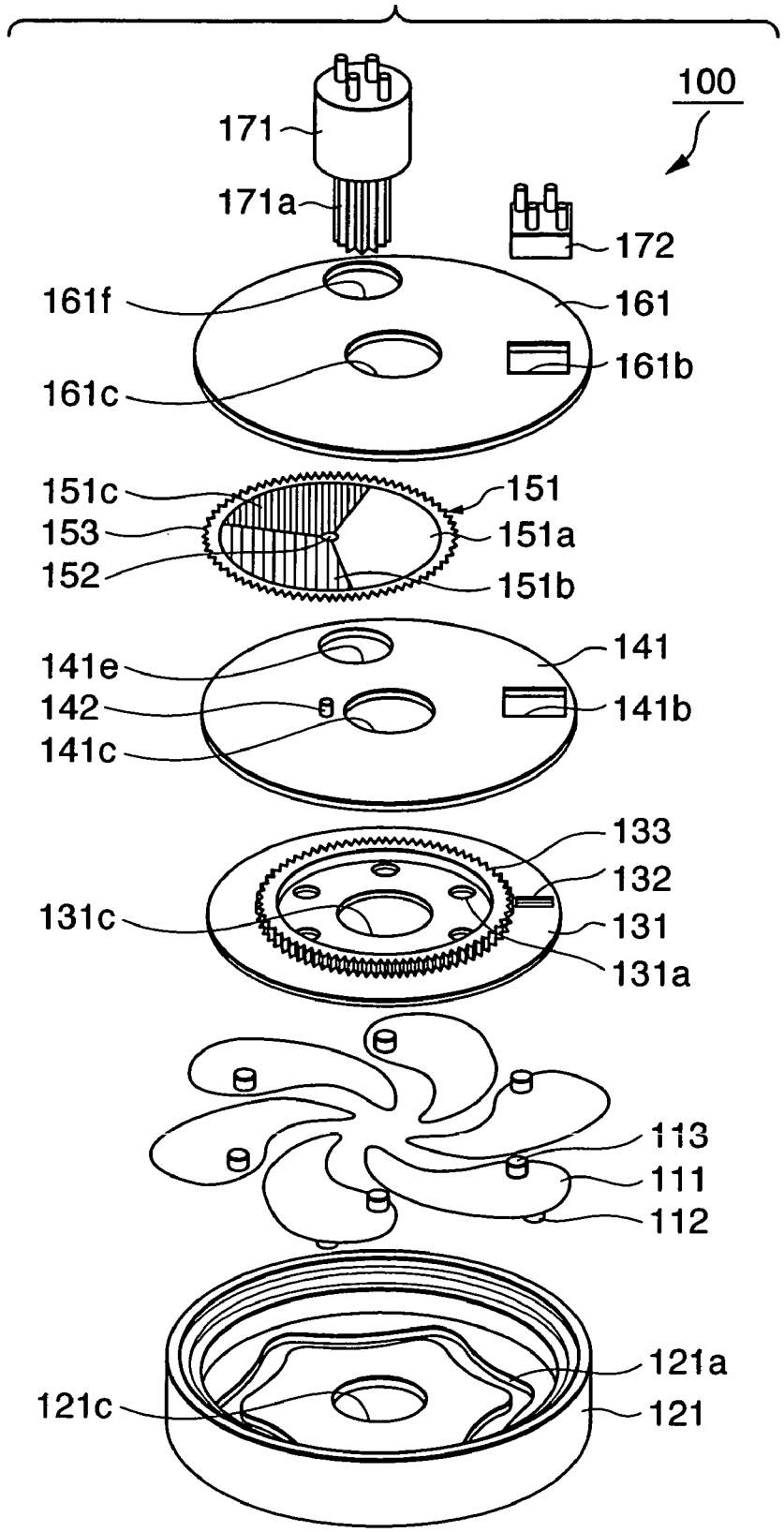
FIG. 1 is an exploded perspective view of a light amount control apparatus according to the first embodiment.

FIG. 1 is an exploded perspective view of the main parts of a light amount control apparatus 100 according to this embodiment. In FIG. 1, reference numeral 111 denotes an aperture blade having light-shielding properties over the entire region. Pins 112 and 113 to be driven stand upward from the lower and upper surfaces, respectively, of the aperture blade 111. A stop aperture is formed by using six aperture blades 111 having the same shape. As the number of the aperture blades 111 increases, the aperture shape becomes close to a circle during stopping down, and this improves the naturalness of blurred images and reduces diffraction at the apexes of the polygonal aperture. However, the manufacturing cost also increases. In the stop mechanism of this type, therefore, the number of aperture blades is preferably 5 to 9. As shown in FIG. 1, this embodiment uses the six aperture blades to optimize the size, optical performance, and manufacturing cost.

Reference numeral 121 denotes a base plate for holding the aperture blades 111. In the center of the planar bottom surface, an opening 121c which defines the maximum diameter of a light beam at open aperture is formed. A cam groove 121a is formed around the opening 121c. The pins 112 of the aperture blades 111 fit in the cam groove 121a and can move in slidable contact with the cam groove 121a. The range of a phase angle of 60° around the opening 121c forms one unit portion of the cam groove 121a. The cam groove 121a is an endless cam groove obtained by connecting six unit portions adjacent to each other.

Reference numeral 131 denotes a driving member called a windmill. Six holes 131a for driving the blades are equally spaced around a central opening 131c. The pins 113 of the aperture blades 111 rotatably fit in the holes 131a. When the windmill 131 rotates counterclockwise, the six aperture blades 111 are driven by the pins 113 on their upper surfaces, and the pins 112 on their lower surfaces slidably move in the cam groove 121a. Since the cam groove 121a is an endless structure, the stop aperture diameter repetitively decreases and increases in accordance with the rotation of the windmill. That is, when the windmill 131 rotates 30° from the initial position (rotational angle 0°), the aperture blades 111 are stopped down from the open aperture to the minimum aperture value. When the windmill 131 rotates from 30° to 60°, the aperture blades 111 return from the minimum aperture to the open aperture. Accordingly, while the windmill rotates 360°, the aperture blades 111 perform the cycle of stopping down and returning to the open aperture six times. Also, an index 132 for detecting the windmill initial position and a gear 133 to be driven are formed on the upper surface of the windmill 131.

A partition 141 forms a predetermined space between the base plate 121 and partition 141. In this space, the aperture blades 111 and windmill 131 are accommodated. An opening 141c for allowing a light beam to pass through it is formed in the center of the partition 141. A rotation support shaft 142 of a filter, for example, an ND filter (to be described later) stands upward adjacent to the opening 141c. In addition, a phase detecting window 141b for detecting the presence/absence of the index 132 of the windmill and an escape hole 141e for a pinion gear (to be described layer) are formed in the partition 141.

Reference numeral 151 denotes a disk-like filter, for example, an ND filter obtained by forming an ND pattern (to be described later) on a transparent resin film, for example, a PET (PolyEthylene Terephthalate) film about 0.1 mm thick by inkjet printing. A bearing 152 is formed in the center of the ND filter 151 and rotatably axially supported by the rotation support shaft 142 on the partition. A gear 153 to be driven made of a metal plate is adhered to the outer edge of the ND filter. The number of teeth of the gear 153 is the same as that of the gear 133 of the windmill. Note that the outer edge of the transparent film as the base of the ND filter may also be formed into the shape of a gear.

In this embodiment, the light attenuation pattern of the ND filter 151 is made up of the following three regions. Reference numeral 151a denotes a transparent portion having a transmittance of 100%, in which the optical density is 0 and the number of ND steps (the number of light attenuation steps) is also 0. The optical density (OD value), a transmittance Tr (%), and the number of ND steps are related by Transmittance $Tr=100*10(-OD \text{ value})$ (1)

$OD \text{ value}=-\text{Log}_{10}(Tr/100)$ (2)

Number of ND steps $= -\text{Log}_2(Tr/100)$ (3)
$= -3.32*\text{Log}_{10}(Tr/100)$
$= 3.32*OD \text{ value}$ Reference numeral 151b denotes a uniform-density portion having an optical density of 0.6 (the number of ND steps is 2); and 151c, a uniform-density portion having an optical density of 1.2 (the number of ND steps is 4). That is, the optical densities of the three ND filters including the transparent portion are set to form an arithmetic sequence.

A cover plate 161 forms a predetermined space between the partition 141 and cover plate 161. The ND filter 151 is accommodated in this space. An opening 161c for letting a light beam pass through it is formed in the center of the cover plate 161. In addition, a detection window 161b for detecting the presence/absence of the index 132 of the windmill and an escape hole 161f for the pinion gear (to be described later) are formed in the cover plate 161.

Reference numeral 171 denotes a step motor for driving the windmill 131 and ND filter 151. A pinion gear 171a extends through the holes 161f and 141e. The proximal end portion (upper portion) of the gear 171a meshes with the gear 153 formed on the outer edge of the ND filter 151. The distal end portion (lower portion) of the gear 171a meshes with the gear 133 formed on the windmill 131. Reference numeral 172 denotes an optical position detecting means incorporating a light-emitting element and light-receiving element. The optical position detecting means 172 detects reflected light from the upper surface of the windmill 131. When the index 132 opposes the detecting means 172 in a position immediately below the detecting means 172, the detecting means 172 outputs a predetermined signal to indicate that the phase angle of the windmill 131 has returned to the initial state. Since the windmill gear 133 and ND filter gear 153 have the same number of teeth, the windmill 131 and ND filter 151 rotate at the same phase angle when driven by the motor 171. When the windmill 131 returns to the initial position, the ND filter 151 also returns to the initial position.

In the above arrangement, the windmill 131 is returned to the initial state by driving the step motor 171 while the output from the detecting means 172 is monitored, thereby returning the stop aperture to the open aperture. By driving the step motor from this position in accordance with a predetermined program, the phase angle of the ND filter 151 and the stop aperture can be controlled to arbitrary sizes. Also, the stop mechanism and ND filter are stacked in the optical axis direction to form a single unit as a whole, and the ND filter itself is a disk-like rotatable film. Therefore, although the ND filter is used, the dimensions in the optical axis direction and in the direction perpendicular to the optical axis are about the same as those of the conventional stop mechanism having no ND filter.

Note that in this embodiment, when the above stop mechanism is incorporated into a photographing optical system (to be described later), the F-number can be controlled from F2 as an open-aperture F-number to F8 as a small-aperture F-number.

Figure 2:
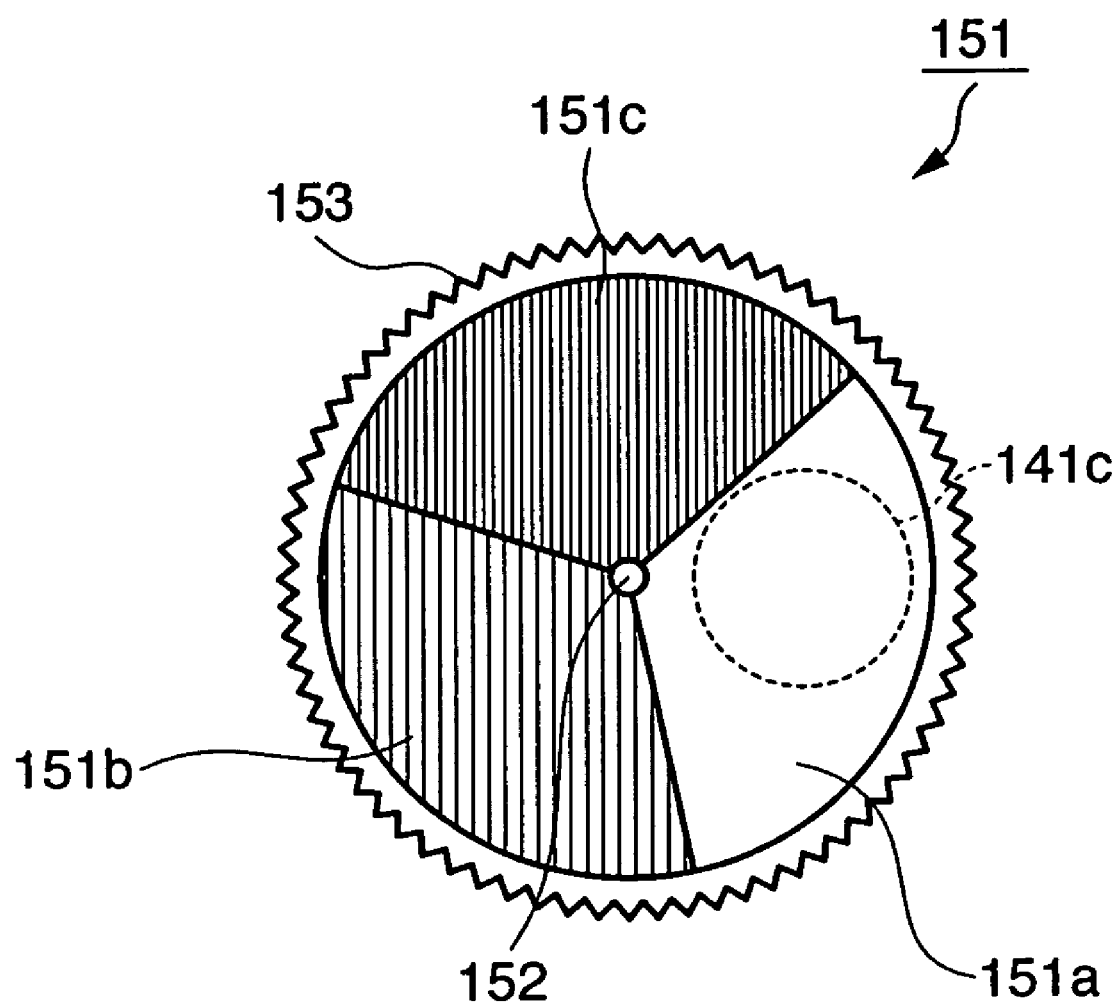
FIG. 2 is a plan view of an ND filter according to the first embodiment.

FIG. 2 is a plan view for explaining details of the optical density distribution of the ND filter 151. Reference numeral 151a denotes the uniform-density portion having an optical density of 0, that is, the transparent portion (the number of ND steps is 0); 151b, the uniform-density portion having an optical density of 0.6 (the number of ND steps is 2); and 151c, the uniform-density portion having an optical density of 1.2 (the number of ND steps is 4). Each of these three uniform-density portions assumes a fan shape, and the central angle of each uniform-density portion is 120°. The circle 141c indicated by the broken line is the opening of the partition 141, and represents an effective beam diameter. In this embodiment, each of the three uniform-density portions 151a, 151b, and 151c has an enough size to completely cover the opening 141c even while the ND filter 151 rotates through a predetermined angle as will be described later.

The ND filter having the above density distribution can be manufactured by vapor deposition, printing, or the like. When the technique described in Japanese Patent Application No. 2002-041634 filed by the present applicant is used, an ND filter which does not cause many optical defects such as scattering and has a desired optical density distribution can be manufactured by using the inkjet printing method.

FIGS. 3A to 3E are views for explaining the relative positions of the beam passing opening 141c and ND filter 151 with respect to the rotational angle of the ND filter 151.

Figure 3A:
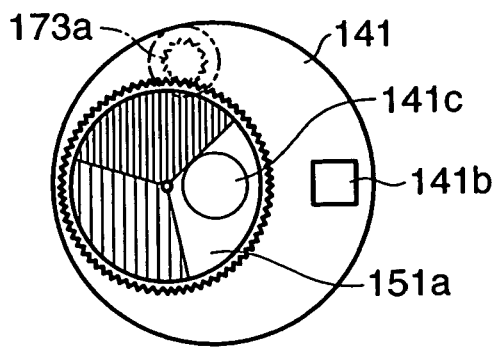
FIGS. 3A to 3E are views for explaining the rotational phase of the ND filter according to the first embodiment.

FIG. 3A is a view showing the state in which the rotational angle of the ND filter 151 is 0°, that is, the ND filter 151 is in the initial position. In this state, the whole region of the opening 141c is covered with the transparent portion 151a of the ND filter. That is, in this state, the transmittance of the stop aperture is uniform throughout the entire region, and the intensity distribution of a light beam passing through the aperture is uniform. In other words, the pupil intensity distribution viewed from the image formation plane is uniform.

Figure 3B:
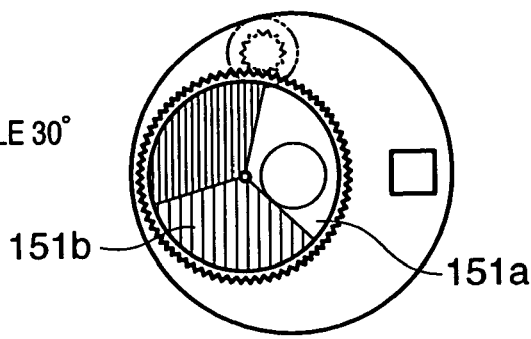

FIG. 3B shows the state in which the ND filter 151 rotates 30° counterclockwise from the initial position. In this state, the opening 141c is still covered with the transparent portion 151a.

Figure 3C:
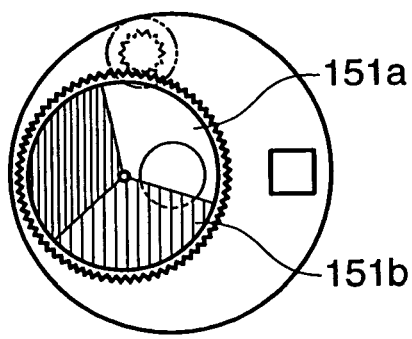

FIG. 3C shows the state in which the rotational angle of the ND filter 151 is 60°. In this state, a portion of the opening 141c is covered with the uniform-density portion 151b having an optical density of 0.6, and the remaining largest half of the opening 141c is covered with the transparent portion 151a. That is, in this state, the transmittance of the stop aperture is nonuniform, and the intensity distribution of a light beam passing through the aperture is nonuniform. In other words, the pupil intensity distribution viewed from the image formation plane is nonuniform.

Figure 3D:
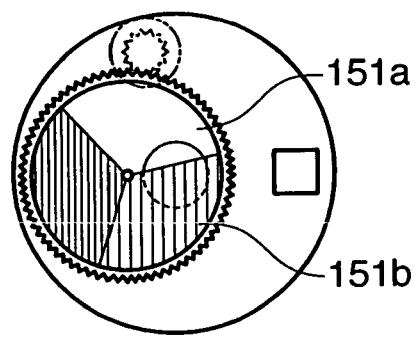

FIG. 3D shows the state in which the rotational angle of the ND filter 151 is 90°. In this state, the largest half of the opening 141c is covered with the uniform-density portion 151b having an optical density of 0.6, and the rest is covered with the transparent portion 151a. That is, the transmittance of the stop aperture is still nonuniform in this state.

Figure 3E:
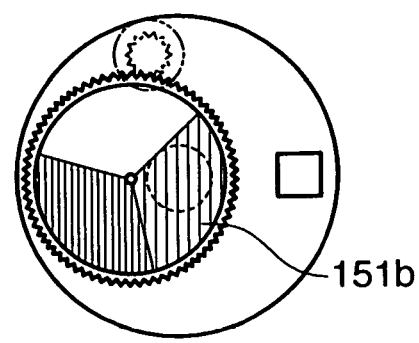

FIG. 3E shows the state in which the rotational angle of the ND filter 151 is 120°. In this state, the opening 141c is entirely covered with the uniform-density portion 151b having an optical density of 0.6. That is, in this state, the stop aperture is covered with the ND filter whose number of ND steps is 2, and the transmittance of the stop aperture is uniform throughout the entire region.

Although the states in which the rotational angle of the ND filter 151 further increases are not shown, operations analogous to those shown in FIGS. 3A to 3E are repeated. That is, when the rotational angle is 120° to 150°, the opening 141c is entirely covered with the uniform-density portion 151b having an optical density of 0.6. When the rotational angle further increases, the uniform-density portion 151c having an optical density of 1.2 starts covering a portion of the opening. When the rotational angle is 240° to 270°, The opening 141c is entirely covered with the uniform-density portion 151c having an optical density of 1.2. When the rotational angle further increases, the transparent portion 151a starts covering a portion of the opening. When the rotational angle is 360°, the state shown in FIG. 3A returns.

Figure 4:
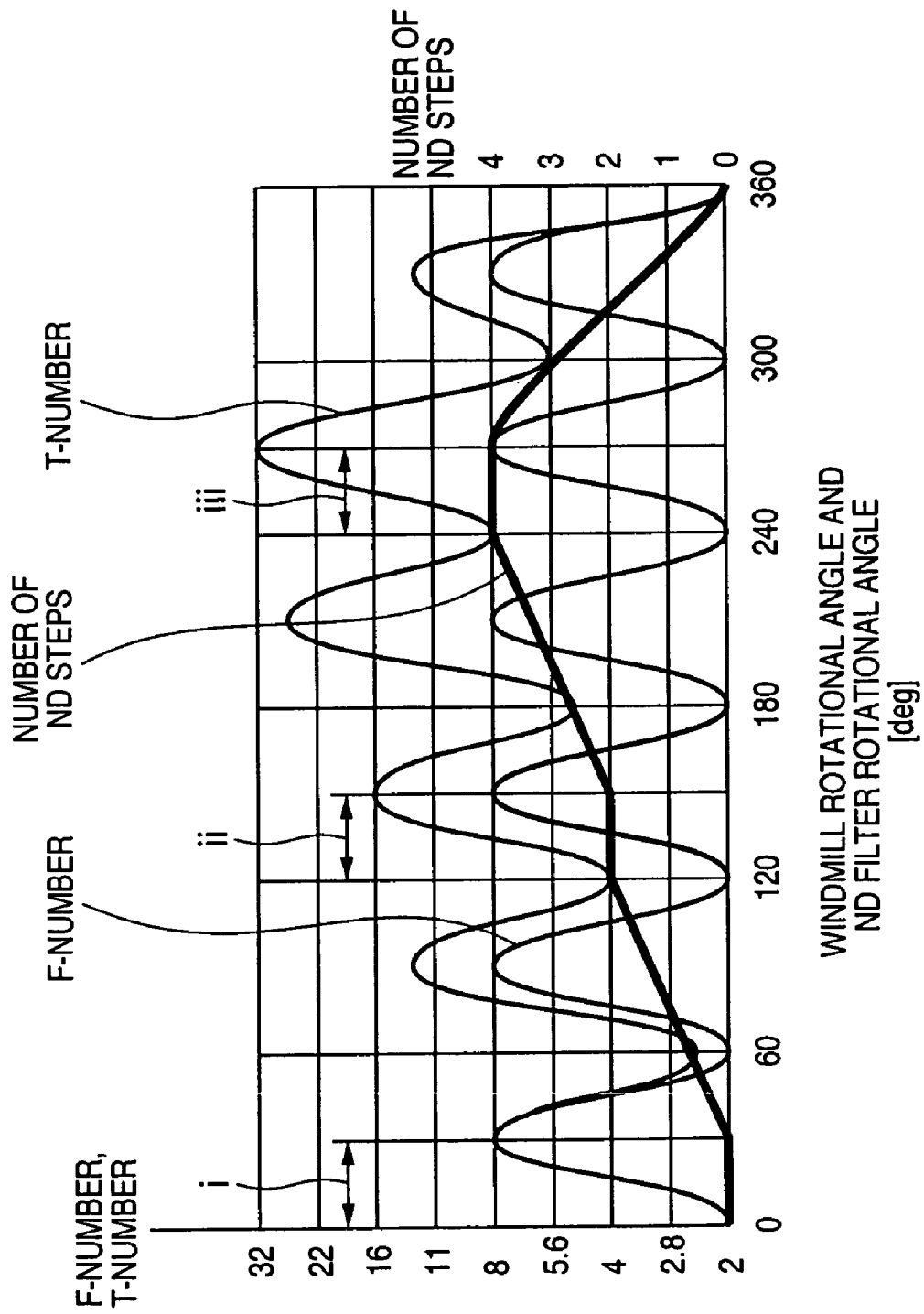
FIG. 4 is a graph for explaining the light amount control function of the light amount control apparatus according to the first embodiment.

FIG. 4 is a graph for explaining the light amount control function of the light amount control apparatus 100 shown in FIG. 1. In FIG. 4, the abscissa indicates the counterclockwise rotational angles of the windmill 131 and ND filter 151. The ordinates indicate the numbers of steps of light amount control. That is, the left ordinate represents the scale of the F-number of the stop aperture and the T-number to which the transmittance obtained by attenuation of light by the ND filter is added. The right ordinate represents the number of light attenuation steps by the ND filter.

Referring to FIG. 4, a sine-wave curve indicated by "F-NUMBER" represents the F-number of the stop mechanism controlled by the rotation of the windmill 131. When the windmill 131 rotates 30°, the F-number continuously changes from F2 as an open-aperture F-number to F8 as the minimum aperture value. When the windmill 131 further rotates 30°, the F-number continuously returns to F2 as an open-aperture F-number. While the windmill 131 rotates 360°, the F-number makes six round trips between F2 and F8.

Referring to FIG. 4, an inclined curve indicated by "NUMBER OF ND STEPS" represents the number of light attenuation steps controlled by the rotation of the ND filter 151. While the ND filter 151 rotates 360°, the number of ND steps changes from 0 to 4 and then returns to 0. However, this change in number of ND steps is nonlinear because the boundaries between the uniform-density portions of the ND filter alternately cover the opening. That is, as described in FIGS. 3A to 3E, when the rotational angle is 0° to 30°, 120° to 150°, and 240° to 270°, the uniform-density portions of the ND filter keep covering the opening, so the number of ND steps remains unchanged and holds a predetermined value. In other rotational angle ranges, the position of the density boundary portion crossing the opening changes in accordance with the rotational angle of the ND filter 151. Therefore, the number of ND steps also continuously changes.

The attenuation amount of light passing through the opening of the light amount control apparatus 100 is the sum of the number of attenuation steps obtained by the increase in F-number and the number of ND steps. T-number corresponding to the number of light amount attenuation steps is the curve indicated by "T-NUMBER" in FIG. 4. When region (i) in FIG. 4 is chosen as the rotation control range of the windmill 131, that is, when the rotational angle of the windmill 131 is controlled to a desired value within the range of 0° to 30°, the F-number can be controlled to any arbitrary value while the number of ND steps is fixed to 0. When region (ii) in FIG. 4 is chosen as the rotation control range of the windmill 131, that is, when the rotational angle of the windmill 131 is controlled to a desired value within the range of 120° to 150°, the F-number can be controlled to any arbitrary value while the number of ND steps is fixed to 2. Likewise, when region (iii) in FIG. 4 is chosen as the rotation control range of the windmill 131, that is, when the rotational angle of the windmill 131 is controlled to a desired value within the range of 240° to 270°, the F-number can be controlled to any arbitrary value while the number of ND steps is fixed to 4.

In the above arrangement, the number of ND steps can be determined by coarsely driving the windmill 131 through an angle of 120°×n (n is a natural number larger than 0), and then the F-number can be determined by finely driving the windmill 131 through a predetermined angle from the angle of 120°×n. That is, the F-number and the number of ND steps can be independently controlled by using the step motor 171. This increases the degree of freedom of light amount control without increasing the size and cost of the light amount control apparatus. Furthermore, even when the F-number is adjusted, the transmittance of the ND filter covering the stop aperture is held uniform. Since this maintains the symmetry of blurred images, high-quality images are obtained.

Figure 5:
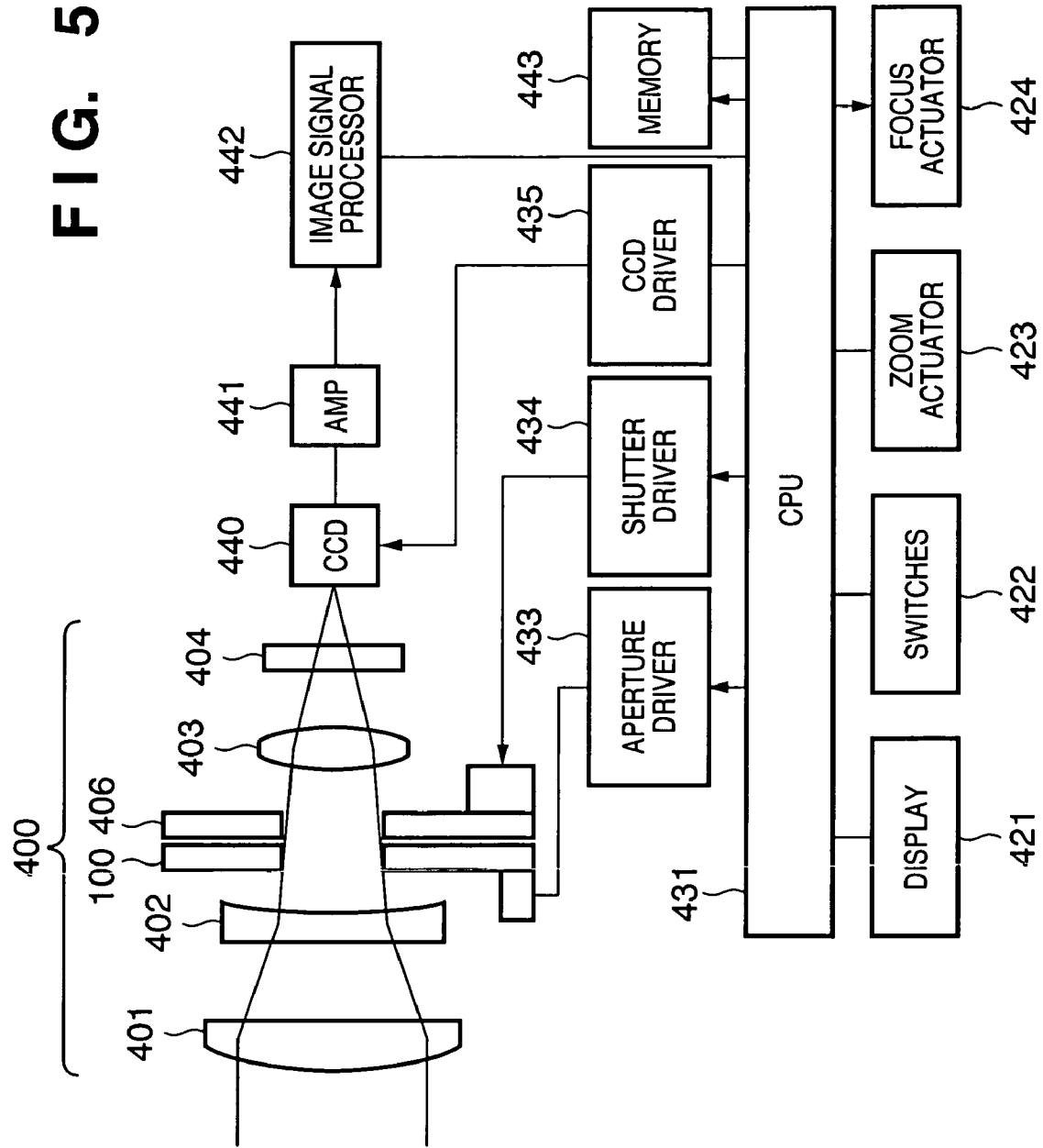
FIG. 5 is a block diagram of a photographing apparatus according to the first embodiment.

FIG. 5 shows an arrangement in which the light amount control apparatus 100 explained in FIGS. 1 to 4 is incorporated into a photographing apparatus. In this embodiment, the photographing apparatus will be explained by taking, as an example, a digital camera in which an image sensing means photoelectrically converts an optical image into an electrical signal, and still images and motion images are recorded as digital data.

A photographing optical system 400 made up of a plurality of lens groups has a front lens group 401, variator lens group 402, focusing lens group 403, and optical low-pass filter 404. The optical specifications of the photographing optical system of this embodiment are that the focal length is 35 to 200 mm and the open-aperture F-number is 2 as specifications of a camera using a 35-mm film. Reference numeral 100 denotes the light amount control apparatus shown in FIG. 1; and 406, a well-known shutter mechanism which controls the exposure time by driving a plurality of light-shielding blades.

An image sensing means 440 is placed in the focusing position (prospective image formation plane) of the photographing optical system. The image sensing means 440 is a photoelectric converting means such as a two-dimensional CCD including a plurality of photoelectric converters which convert radiated optical energy into electric charge, a charge storage unit which stores the electric charge, and a charge transfer unit which transfers the electric charge to the outside. In this embodiment, a CCD sensor having 3,000,000 pixels is used.

An object image formed on the image sensing means 440 is converted into an electrical signal as a charge amount of each pixel which corresponds to the brightness of the pixel. This electrical signal is amplified by an amplifier circuit 441, and undergoes predetermined processing such as γ correction performed by a camera signal processor 442. This processing may also be performed by digital signal processing after A/D conversion. The video signal thus obtained is recorded in a memory 443. As the memory 443, it is possible to use various memories, for example, a semiconductor memory such as a flash ROM, an optical memory such as a magneto-optical disk, and a magnetic memory such as a magnetic tape.

A display 421 such as a liquid crystal display displays an object image acquired by the image sensing means 440, the operation status of the optical apparatus, and the like. Operation switches 422 include a zoom switch, a photographing preparation switch, a photographing start switch, a photographing mode select switch for selecting a still image mode and motion image mode, and a photographing condition switch for setting an exposure control mode, AF mode, and the like. A zoom actuator 423 changes the focal length of the photographing optical system 400 by driving the zoom lens group 402. A focus actuator 424 adjusts the focusing state of the photographing optical system 400 by driving the focusing lens group 403.

A CPU 431 controls the overall photographing apparatus. An aperture driver 433 drives the step motor 171 while monitoring the output from the optical position detecting means 132 shown in FIG. 1. The aperture driver 433 adjusts the rotational angles of the windmill 131 and ND filter 151, thereby controlling the F-number and the number of ND steps to desired values. A shutter driver 434 controls the exposure time of the image sensing means 440 by driving the shutter mechanism 406.

FIGS. 6 to 11C are views for explaining an exposure control method of the photographing apparatus shown in FIG. 5. First, exposure control modes of this photographing apparatus will be explained below with reference to FIG. 6.

A still camera generally has a plurality of exposure control modes in order to reflect the effects of the aperture value (F-number), shutter speed, and the like on photographed images. A motion image camera also generally has a function of automatically switching photometry regions and exposure levels in accordance with a photographing scene.

FIG. 6 is a view for explaining exposure control modes of the photographing apparatus of this embodiment. A photographer first selects a still image mode or motion image mode by using a photographing condition set switch as one of the operation switches 422 of the photographing apparatus shown in FIG. 5. The photographer then selects a desired photographing mode from (1) to (16). To achieve an image effect corresponding to the photographing purpose of each mode, the photographing apparatus performs exposure control corresponding to the gist of "FEATURE OF EXPOSURE CONTROL" in the central column of FIG. 6. A typical exposure program diagram will be explained later. The right column in FIG. 6 shows whether the number of light attenuation steps of the ND filter is to be automatically selected by the camera or manually selected by the photographer in each exposure control mode. In exposure control modes (1) to (5) for still image photographing in this embodiment, the photographing apparatus automatically determines a combination of the aperture value and shutter speed in accordance with the photographing purpose of the photographer. Therefore, the number of steps of the ND filter is also automatically selected by the photographing apparatus in accordance with the conditions of an object before photographing. However, this embodiment includes a so-called single-shot mode in which one frame of an image is acquired by one photographing operation, and a continuous mode in which a plurality of images are continuously acquired. In the single-shot mode and when the first frame is photographed in the continuous mode, the ND filter is automatically selected. When the second frame and subsequent frames are photographed in the continuous mode, the ND filter selected for the first frame is directly used. Details will be explained later.

In exposure control modes (6) to (9), the degree of freedom of exposure compensation by the photographer is increased. Therefore, the number of steps of the ND filter can also be selected by the photographer. This ND filter selected by the photographer is used regardless of whether the photographing mode is the single-shot mode or continuous mode.

On the other hand, when motion image photographing is performed, it is also necessary to change the number of steps of light amount control by the light amount control apparatus in accordance with a change in luminance of an object during photographing. However, in the light amount control apparatus of this embodiment, the windmill is driven at the same time the number of light attenuation steps of the ND filter is selected. As a consequence, the F-number instantaneously changes from the open aperture to the minimum aperture value. Accordingly, the exposure level of an image temporarily becomes inappropriate, and this produces unnaturalness by which the image to be photographed flickers for a moment. In the motion image photographing mode of this embodiment, therefore, the number of light attenuation steps of the ND filter is automatically selected in accordance with the brightness of an object before photographing. During photographing, however, switching of the ND filter is inhibited, and only exposure control by the aperture blades 111 is permitted.

FIGS. 7 to 11C are control flow charts and exposure control diagrams of the photographing apparatus according to this embodiment. First, a main control flow of photographing will be explained below with reference to FIG. 7.

In step S102 after step S101, whether a main switch is turned on by a photographer is determined. If the main switch is not turned on, the flow stays in step S102. If it is determined in step S102 that the main switch is turned on, the CPU 431 leaves a sleep state and executes processing from step S103.

In step S103, the CPU 431 initializes the photographing apparatus. More specifically, the CPU 431 extends the photographing optical system in a collapsed state to a photographable state, and resets the ND filter and aperture blade driving windmill in the light amount control apparatus 100 to the initial positions. In step S104, the CPU 431 accepts the selection of a photographing mode to determine whether to perform still image photographing or motion image photographing. In step S105, the CPU 431 accepts the selection of a photographing mode corresponding to (1) to (6) in FIG. 6. In step S106, the CPU 431 accepts detailed settings of the various photographing conditions such as the single-shot/continuous mode, the focusing mode, the white balance mode, and the image size for still image photographing.

In step S107, the CPU 431 determines whether the motion image mode or still image mode is set in step S104. If the motion image photographing mode is set, the flow advances to a motion image photographing subroutine in step S111. If the still image photographing mode is set, the flow advances to step S108.

In step S108, the CPU 431 determines whether the photographing mode pertaining to exposure control when the still image photographing mode is selected is one of (1) to (9) in FIG. 6. If the photographing mode is one of (6) to (9), the flow advances to step S109 to accept an operation of setting the number of ND steps performed by the photographer. The flow then advances to step S131 to execute a still image photographing subroutine. If the photographing mode is one of (1) to (5), the flow jumps to step S131 to execute the still image photographing subroutine, without accepting the operation of setting the number of ND steps performed by the photographer.

Figure 7:
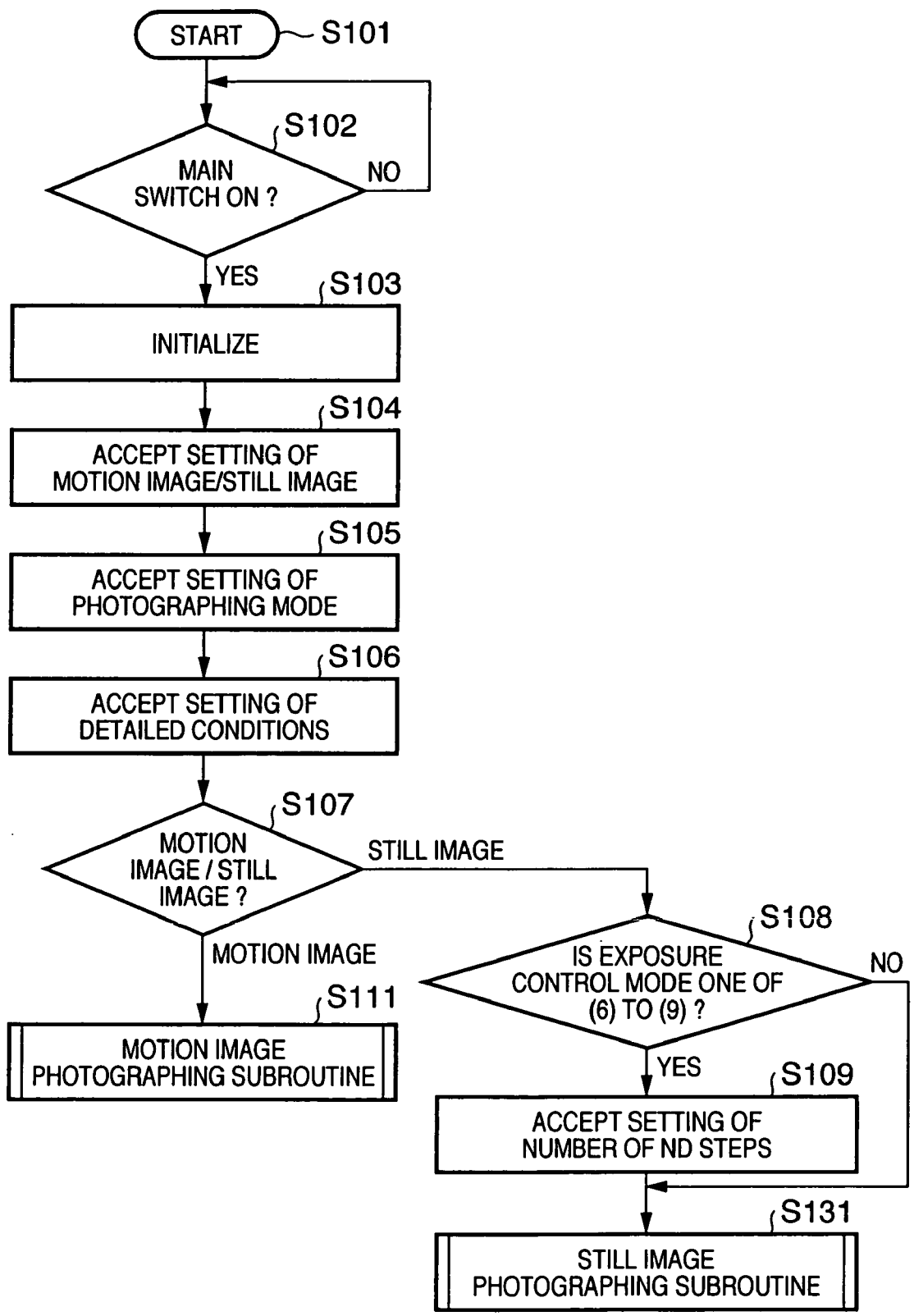
FIG. 7 is a flow chart of a main control flow of the photographing apparatus according to the first embodiment.
Figure 8:
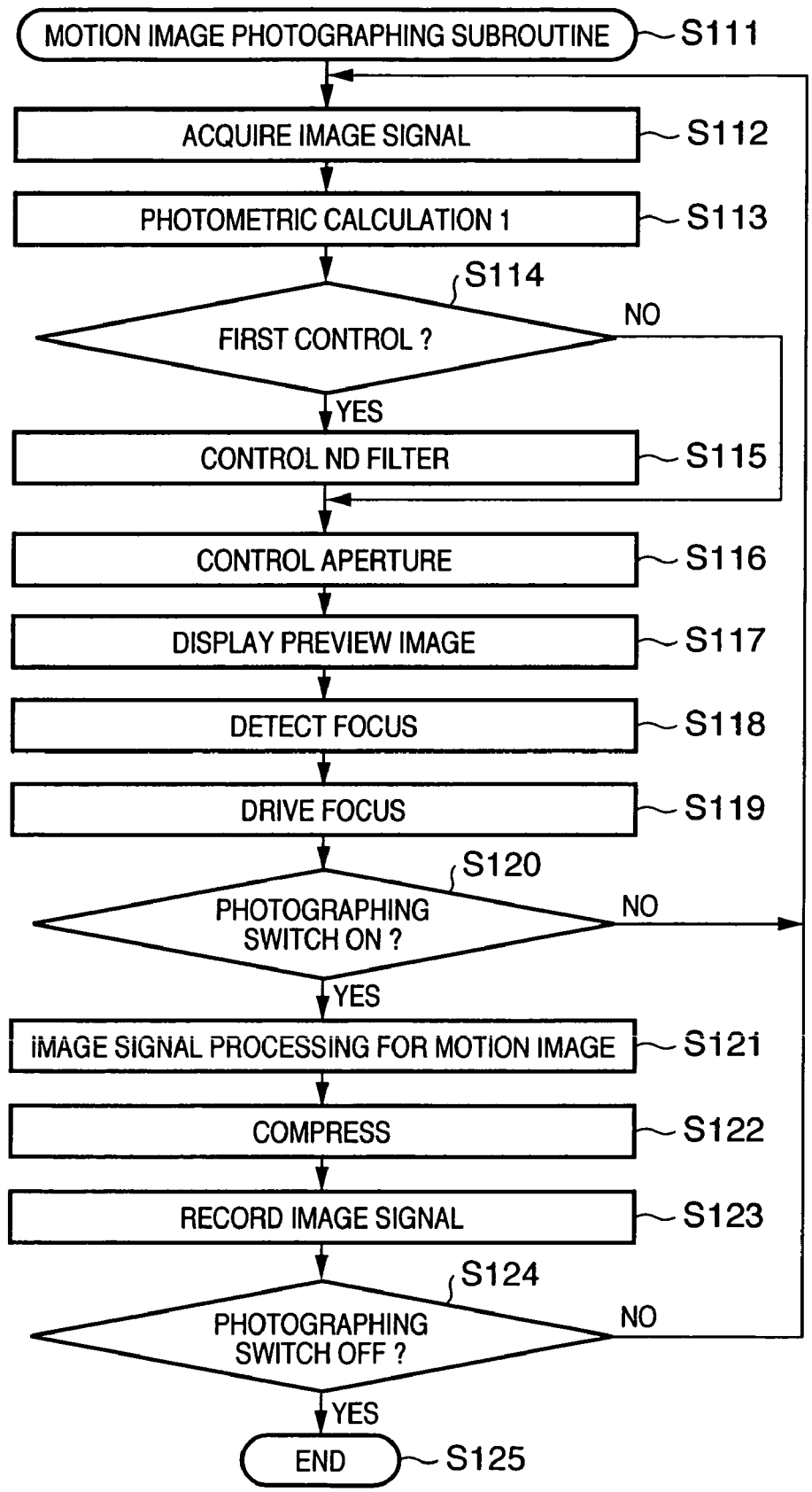
FIG. 8 is a flow chart of a motion image photographing subroutine flow in the first embodiment.

FIG. 8 is a motion image photographing subroutine flow chart which is a control flow if the flow branches to step S111 in FIG. 7. In step S112 after step S111, the CPU 431 acquires an image signal by the image sensing means 440, and performs predetermined image processing by the image signal processor 442. In step S113, the CPU 431 performs photometric calculation 1. Photometric calculation 1 is a photometric calculation for motion image photographing. That is, the CPU 431 calculates an aperture control value and a control value of the number of ND steps of the light amount control apparatus 100 by using the maximum value, minimum value, mean value, and the like of the image signal acquired in step S112. In step S114, the CPU 431 determines the number of times of execution of the exposure control after the execution of this subroutine is started. If the exposure control is the first one, the flow advances to step S115 to perform ND filter control. More specifically, as explained in FIG. 4, the CPU 431 coarsely drives the windmill 131 through an angle of 120°×n (n is an integer larger than 0), thereby setting the windmill rotation range to one of (i) to (iii). Subsequently, the CPU 431 performs aperture control in step S116. More specifically, as explained in FIG. 4, the CPU 431 finely drives the windmill 131 to select a windmill rotational angle at which a desired F-number is obtained in each of windmill rotation ranges (i) to (iii).

If in step S114 the number of times of execution of the exposure control after the execution of this subroutine is started is 2 or more, the CPU 431 executes only step S116 without executing step S115. That is, while the motion image photographing subroutine is executed, the CPU 431 selects the number of ND steps at the beginning of a preview operation, and, even if the brightness of an object changes during preview or photographing after that, the CPU 431 changes only the F-number without changing the number of ND steps.

In step S117, the CPU 431 converts the image signal acquired in step S112 into a preview image, and displays this preview image on the display 421.

In steps S118 and S119, the CPU 431 adjusts the focus of the photographing optical system 400. This focus adjustment is focusing control so-called hill-climbing servo AF which stops lenses by finding a focus position at which the high-frequency component of an image signal takes a maximum value.

In step S120, the CPU 431 determines whether a photographing switch for motion image photographing is turned on by the photographer. If the photographing switch is not turned on, the flow returns to step S112 to repetitively execute the light amount control, focusing control, and preview image display. If it is determined in step S120 that the photographing switch is turned on, the flow advances from step S120 to step S121.

In step S121., the CPU 431 reduces the image signal acquired by the image sensing means 440 into 300,000 pixels which is the number of pixels for a motion image, and performs image processing for a motion image. In step S122, the CPU 431 performs image compression for motion image recording. In step S123, the CPU 431 records the compressed image signal in the memory 443.

In step S124, the CPU 431 determines whether the photographing switch is turned off by the photographer. If the photographing switch is not turned off, the flow returns to step S112 to repetitively control the light amount, control the focusing, display the preview image, and record the motion image for recording into the memory. If it is determined in step S124 that the photographing switch is turned off, the CPU 431 terminates the photographing in step S125.

In the above control flow, the number of ND steps determined at the beginning of a preview operation is held during the preview operation and photographing. Strictly speaking, therefore, the ND filter is not selected at the start of photographing. For the sake of convenience, however, it is explained that the ND filter determined at the start of photographing is fixed after that. If the number of steps of the ND filter is to be determined by the object luminance at the start of photographing, the ND filter control need only be reexecuted when the flow advances from step S120 to step S121, that is, when the flow advances from the preview operation to the photographing operation.

Figure 9A:
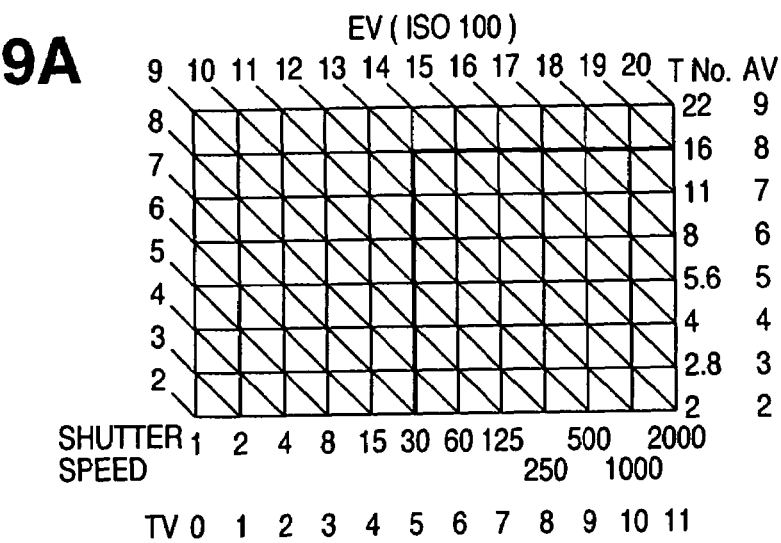
FIGS. 9A to 9C are graphs for explaining exposure control during motion image photographing in the first embodiment.
Figure 9B:
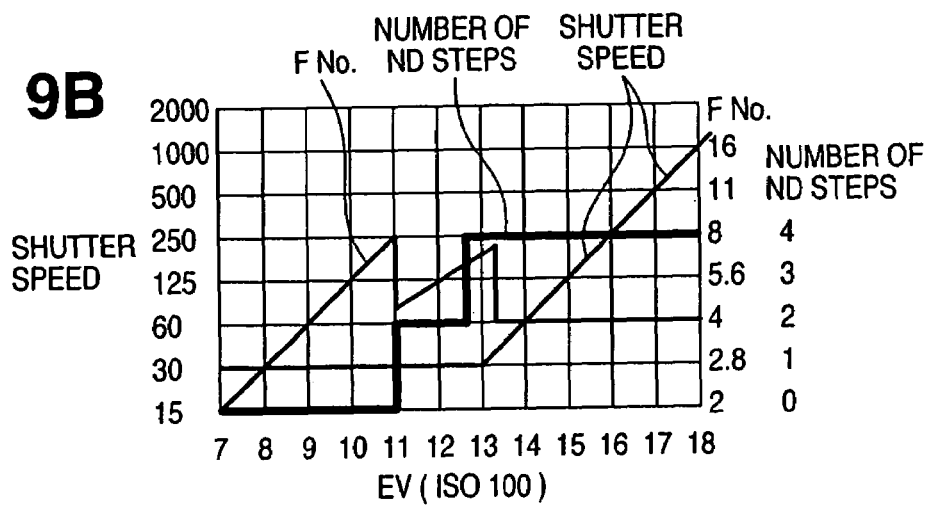
Figure 9C:
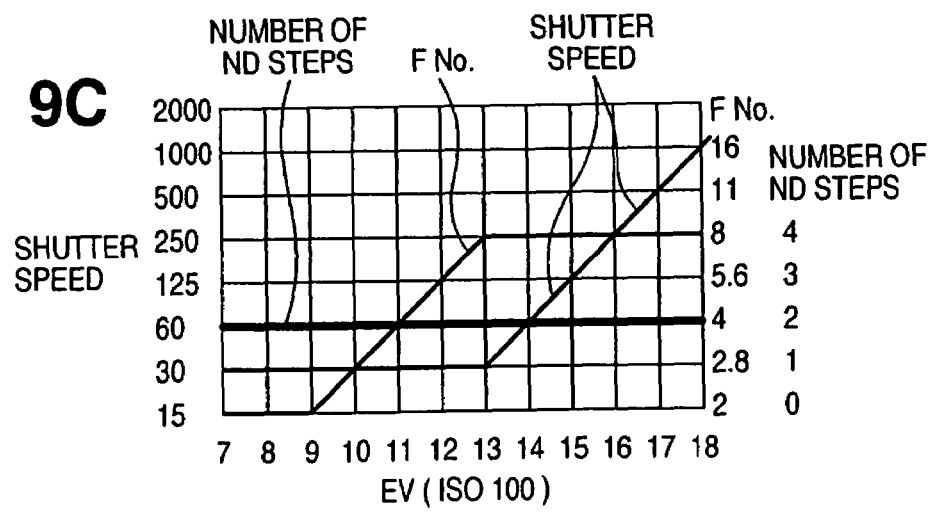

FIGS. 9A to 9C are graphs for explaining the control form of photometric calculation 1 in step S113 of FIG. 8. FIG. 9A is a graph called an EV diagram used to explain the exposure control program of a still camera. FIG. 9B is a diagram for determining the number of steps of the ND filter when photometric calculation 1 is controlled for the first time. FIG. 9C is a diagram for explaining the control states of the F-number, the shutter speed, and the number of steps of the ND filter with respect to the brightness of an object during motion image photographing. FIG. 9A will be described first.

Correct exposure of a still camera is generally obtained by using APEX equation (4) below.

$$AV+TV=BV+SV=EV \quad (4)$$

where AV is the aperture value, TV is the time value, BV is the luminance value, SV is the film speed value, and EV is the exposure value. In FIG. 9A, the abscissa indicates the shutter speed (more accurately, the reciprocal of each indicated numerical value is the actual exposure time) and the corresponding TV, and the ordinate indicates the F-number of the stop mechanism and the corresponding AV. In this embodiment, both the iris stop and ND filter are used in light amount control. Therefore, the T-number obtained by adding the transmittance of the ND filter to the F-number is plotted on the ordinate. The T-number and AV are represented by $$T\text{-number} = F\text{-number}/(ND \text{ filter transmittance } Tr)0.5 \quad (5)$$

$$\begin{aligned} AV(\text{equivalent to } T\text{-number}) &= AV(\text{equivalent to } F\text{-number}) - \\ & \text{Log}_2(Tr/100) \\ &= AV(\text{equivalent to } F\text{-number}) + \\ & \text{number of } ND \text{ steps} \end{aligned} \quad (6)$$

In FIG. 9A, 45° lines represent equal EVs. The EV when the sensitivity of the image sensing element is equivalent to ISO100 is indicated in the upper left end of each 45° line.

FIGS. 9A to 9C are exposure control diagrams in the motion image photographing mode. During motion image photographing, the mechanical shutter 406 placed in the photographing optical system is not used, and an electronic shutter function of the image sensing means 440 is used. The slowest shutter speed for a motion image is determined by a motion image photographing interval, that is, a so-called frame rate. In this embodiment, the frame rate is 30 [frame/sec], so the slowest shutter speed is approximately 1/30 sec.

The program diagrams of exposure control under the above conditions will be explained below. First, in a region where the EV is 2 (inclusive) to 7 (exclusive), the shutter speed and lens T-number are fixed to 1/30 sec and 2, respectively. Accordingly, no correct exposure amount can be obtained if the EV is 7 or less. In this case, the amplification gain of an image signal from the image sensing means 440 is increased.

In a region where the EV is 7 (inclusive) to 13 (exclusive), a correct exposure amount is obtained by fixing the shutter speed to 1/30 sec, and changing the lens T-number from 2 to 16. In a region of EV13 to EV19, a correct exposure amount is obtained by fixing the lens T-number to 16, and changing the shutter speed of the electronic shutter from 1/30 sec to 1/2000 sec.

Next, combinations of the densities of the ND filter and the F-numbers of aperture control at individual EVs when the motion image photographing subroutine is started and photometric calculation 1 is executed for the first time will be explained below with reference to FIG. 9B. In FIG. 9B, the EV is plotted on the abscissa, the shutter speed is plotted on the left ordinate, and the F-number and the number of ND steps are plotted on the right ordinate. In a region where the EV is 2 (inclusive) to 7 (exclusive), 1/30 sec is selected as the shutter speed, F2 as an open-aperture F-number is selected as the F-number of aperture control, and 0 is selected as the number of ND steps of the ND filter.

In a region where the EV is 7 (inclusive) to 11 (exclusive), the shutter speed is fixed to 1/30 sec, the F-number of aperture control is continuously variable from F2 to F8, and the number of ND steps of the ND filter is fixed to 0. In a region where the EV is 11 (inclusive) to 13 (exclusive), the shutter speed is fixed to 1/30 sec, the F-number of aperture control is continuously variable from F4 to F8, and the number of ND steps of the ND filter is fixed to 2. In a region of EV13 to EV19, the F-number of aperture control is fixed to F4, the number of ND steps of the ND filter is fixed to 4, and the shutter speed of the electronic shutter is changed from 1/30 to 1/2000 sec.

An operation if the object luminance measured when photometric calculation 1 is performed for the first time is EV12 will be explained below. Referring to FIG. 9B, when the object luminance is EV12, F5.6, 2, and 1/30 sec are selected as the F-number, the number of ND steps, and the shutter speed, respectively. Accordingly, when the first photometric calculation is performed in the flow chart of FIG. 8, the windmill must be driven so as to control the aperture and the number of ND steps of the ND filter to F5.6 and 2, respectively. That is, the windmill 131 is coarsely driven 120° to set the ND filter 151 in the state shown in FIG. 3E. In this manner, the ND filter whose number of light attenuation steps is 2 is selected. The aperture value is set to F5.6 by finely driving the windmill 131 about 20°.

A control operation when motion image photographing is started and photometric calculation 1 is performed for the second time or after that will be explained below. As described above, when the object luminance at the beginning of motion image photographing is EV12, 2 is selected as the number of ND steps. When the number of times of execution of the photometric calculation is 2 or more, the number of ND steps is fixed to 2. FIG. 9C is a control diagram showing the aperture value, the number of ND steps, and the shutter speed in this case. In motion image photographing, the light amount control apparatus must be controlled if the brightness of an object changes during photographing. However, if the number of ND steps is changed, the F-number also changes instantaneously. Therefore, even when the object luminance changes, the number of ND steps is fixed to 2, and only the aperture value and shutter speed are changed. In this embodiment, control values of the aperture value and shutter speed during motion image photographing are as follows.

First, in a region where the EV is less than 7, the shutter speed is fixed to 1/30 sec, and the F-number of aperture control is fixed to F2 as an open-aperture F-number. In a region where underexposure occurs by this combination, correct exposure is obtained by increasing the amplification gain of the image sensing means.

In a region where the EV is 9 (inclusive) to 13 (exclusive), the shutter speed is fixed to 1/30 sec, and the F-number of aperture control is continuously variable from F2 to F8. In a region where the EV is 13 or more, the F-number of aperture control is fixed to F8, and the shutter speed is changed from 1/30 to 1/2000 sec by the electronic shutter.

By the above control, when motion image photographing is started, the number of ND control steps is fixed to the initially set value, and correct exposure is obtained by controlling the stop aperture and shutter speed. Therefore, when the scene has a high luminance, small-aperture diffraction of the stop mechanism is alleviated by the ND filter. In addition, since the F-number can be continuously adjusted by the stop mechanism, the input light amount to the image sensing means can be continuously adjusted even if the luminance of an object changes during photographing.

FIG. 10 is a subroutine flow chart of still image photographing. That is, FIG. 10 shows a control flow when the flow branches to step S131 in FIG. 7. In step S132 after step S131, the CPU 431 acquires an image signal by the image sensing means 440, and performs predetermined image processing by the image signal processor 442. In step S133, the CPU 431 performs photometric calculation 1. Although this flow is a still image photographing subroutine, image acquisition is performed in the motion image mode during preview before still image photographing. Accordingly, the same calculation as in step S113 of FIG. 8 is performed in this photometric calculation. In step S134, the CPU 431 determines the number of times of execution of the exposure control after the execution of this subroutine is started. If the exposure control is the first one, the flow advances to step S135 to perform ND filter control. More specifically, as explained in FIG. 4, the CPU 431 coarsely drives the windmill 131 through an angle of 120°×n (n is an integer larger than 0), thereby setting the windmill rotation range to one of (i) to (iii). Subsequently, the CPU 431 performs aperture control in step S136. More specifically, as explained in FIG. 4, the CPU 431 finely drives the windmill 131 to select a windmill rotational angle at which a desired F-number is obtained in each of windmill rotation ranges (i) to (iii).

If in step S134 the number of times of execution of the exposure control after the execution of this subroutine is started is 2 or more, the CPU 431 executes only step S136 without executing step S135. That is, in the preview image acquisition stage, after selecting the number of ND steps at the beginning of the stage, the CPU 431 changes only the F-number without changing the number of ND steps, even if the brightness of an object changes during preview.

In step S137, the CPU 431 converts the image signal acquired in step S132 into a preview image, and displays this preview image on the display 421.

In steps S138 and S139, the CPU 431 adjusts the focus of the photographing optical system 400. This focus adjustment is focusing control so-called hill-climbing servo AF which stops lenses by finding a focusing position at which the high-frequency component of an image signal takes a maximum value.

In step S140, the CPU 431 determines whether a photographing switch for still image photographing is turned on by the photographer. If the photographing switch is not turned on, the flow returns to step S132 to repetitively execute the light amount control, focusing control, and preview image display. If it is determined in step S140 that the photographing switch is turned on, the flow advances from step S140 to step S141.

In step S141, the CPU 431 performs photometric calculation 2. Photometric calculation 2 is a photometric calculation for still image photographing. That is, the CPU 431 calculates the control amount of the light amount control apparatus 100 by using the maximum value, minimum value, mean value, and the like of the image signal acquired immediately before this step. Details of photometric calculation 2 will be described later.

In step S142, the CPU 431 determines whether to control driving of the ND filter. That is, when photographing is to be performed in the single-shot mode or when photographing of the first frame is to be performed in the continuous mode, the CPU 143 interrupts the use of the ND filter selected in the preview operation, and controls the ND filter again on the basis of the latest photometric value. In this case, therefore, the flow advances to step S143, and the CPU 143 coarsely drives the ND filter to set the windmill rotation range to one of (i) to (iii). Subsequently, in step S144, the CPU 143 performs aperture control.

On the other hand, if in step S142 photographing of the second frame or a frame after that is to be performed in the continuous mode, the ND filter used in the immediately preceding photographing is used. Therefore, the CPU 431 executes only step S144 without executing step S143. That is, in the continuous mode, the ND filter set for the first frame is kept used for the second frame and subsequent frames. This makes it possible to minimize the windmill rotation amount during continuous photographing, thereby achieving the saving of energy, the prevention of noise, the reduction of the photographing interval, and the like.

In steps S145 and S146, the CPU 431 adjusts the focus of the photographing optical system 400 again. In step S147, the CPU 431 determines whether an in-focus image is obtained. If no in-focus image is obtained, the CPU 431 repetitively executes steps S145 and S146. If an in-focus image is obtained, the CPU 431 stops driving of the focusing lens, and displays the in-focus preview image in step S148.

In step S149, the CPU 431 determines whether the photographing switch for still image photographing is turned on by the photographer. If the photographing switch is not turned on, the flow returns to step S148 to keep displaying the preview image. If it is determined in step S149 that the photographing preparation switch is turned on, the flow advances from step S148 to step S151.

In step S151, to acquire an image for still image recording, the CPU 431 starts storing electric charge in the image sensing means 440. In step S152, on the basis of the shutter speed calculated by photometric calculation 2 in step S141, the CPU 431 drives the shutter blades of the shutter mechanism 406 to close these shutter blades, thereby interrupting a light beam to the image sensing means 440. In step S153, the CPU 431 transfers the electric charge from the image sensing means 440. In step S154, the CPU 431 performs still image processing for the acquired image signal equivalent to 3,000,000 pixels. In step S155, the CPU 431 performs image compression for still image recording. In step S156, the CPU 431 records the compressed image signal in the memory 443.

In step S157, the CPU 431 drives the shutter blades of the shutter mechanism 406 to open these shutter blades. In step S158, the CPU 431 determines whether photographing is complete. More specifically, if photographing of one frame is complete in the single-shot mode or if the photographing switch is OFF in the continuous mode, the flow advances to step S159, and the CPU 431 terminates the photographing. If the photographing switch is kept ON in the continuous mode, the flow returns to step S141, and the CPU 431 reexecutes the steps on and after step S142.

Note that the continuous mode in this embodiment can include the following photographing modes in addition to the simple continuous photographing mode. One example is a so-called exposure bracket photographing in which the same scene is photographed a plurality of number of times while the exposure level is shifted a predetermined amount. Another example is so-called connected panorama photographing in which a wide object is photographed a plurality of number of times while the direction of the camera is changed step by step, and a plurality of photographed images are connected to obtain a wide-angle image. In these photographing modes, the continuity of exposure levels is important. Therefore, the ND filter selected in photographing of the first frame is preferably used for the second frame and subsequent frames.

The exposure control method in the still image photographing mode will be explained below. In this still image photographing mode, the same control as in the motion image photographing mode is performed in the preview operation in steps S132 to S140 of FIG. 10. In the preview operation, therefore, the F-number, the shutter speed, and the number of steps of the ND filter are controlled as shown in FIG. 9.

Figure 11A:
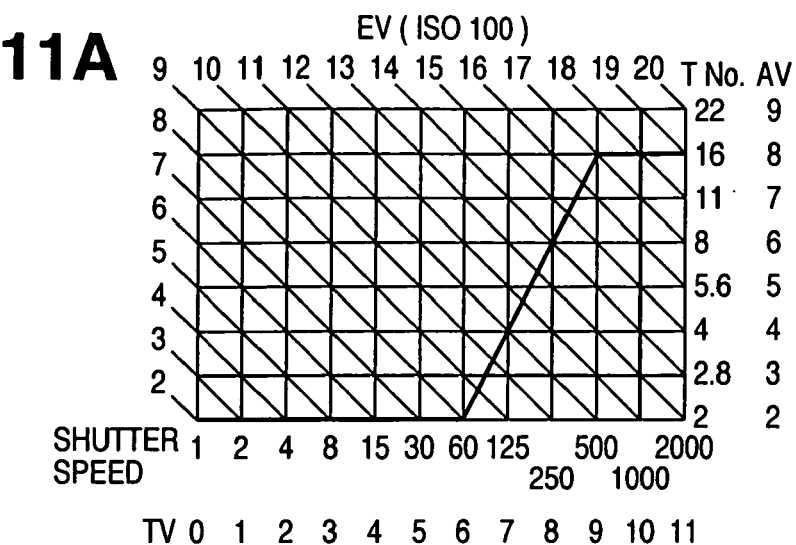
FIGS. 11A to 11C are graphs for explaining exposure control during still image photographing in the first embodiment.
Figure 11B:
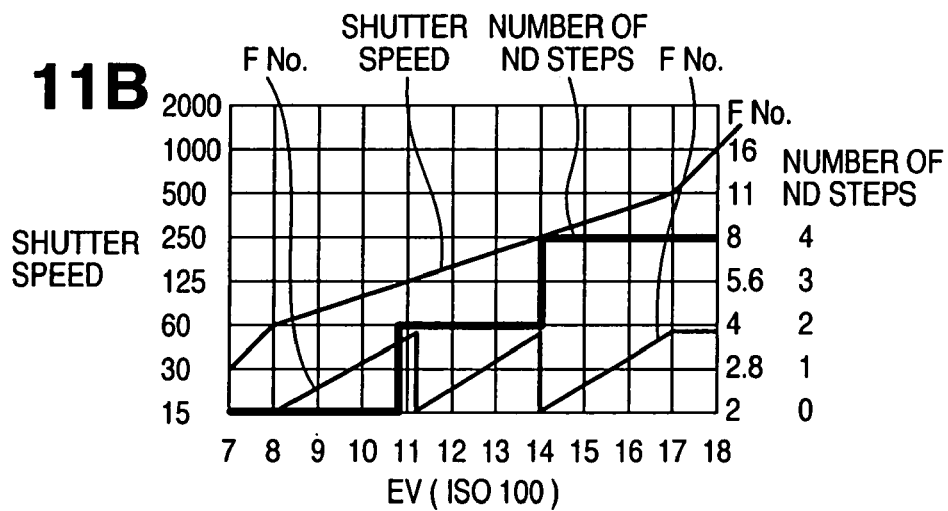
Figure 11C:
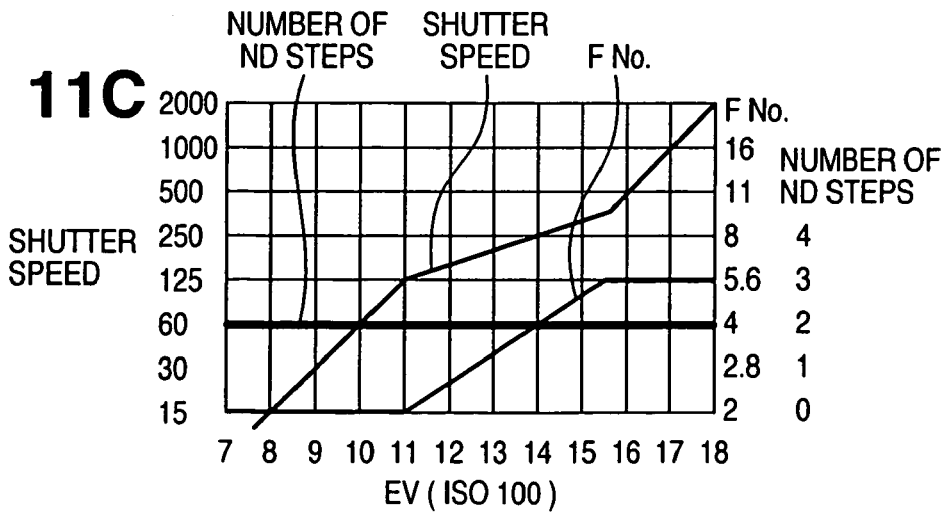

In photometric calculation 2 in step S141 of FIG. 10, control unique to still image photographing is performed. This control will be described below with reference to FIGS. 11A to 11C. FIGS. 11A, 11B, and 11C correspond to FIGS. 9A, 9B, and 9C, respectively.

FIGS. 11A to 11C are exposure control graphs in the still image photographing mode. In this still image photographing, smear occurring during charge transfer can be prevented by using the mechanical shutter 406 placed in the photographing optical system. Also, still image photographing is not controlled by the frame rate of motion image photographing. Accordingly, the slowest shutter speed can be slower than 1/30 sec.

The program diagram of exposure control under the above conditions will be explained below with reference to FIG. 11A. This exposure diagram shown in FIG. 11A is based on the assumption that so-called program AE by which the aperture value and shutter speed are controlled by a predetermined relationship in accordance with the object luminance is selected.

First, in a region where the EV is 2 (inclusive) to 8 (exclusive), a correct exposure amount is obtained by fixing the lens T-number to 2, and changing the shutter speed from 1 to 1/60 sec.

In a region where the EV is 8 (inclusive) to 17 (exclusive), a correct exposure amount is obtained by changing the shutter speed from 1/60 to 1/500 sec, and also changing the lens T-number from 2 to 16. In a region of EV17 to EV19, a correct exposure amount is obtained by fixing the lens T-number to 16, and changing the shutter speed of the mechanical shutter from 1/500 sec to 1/2000 sec.

Next, combinations of the densities of the ND filter and the F-numbers of aperture control at individual EVs will be explained below with reference to FIG. 11B. In a region where the EV is 2 (inclusive) to 8 (exclusive), the shutter speed lowers in accordance with each EV, but the F-number of aperture control is fixed to F2 as an open-aperture F-number, and the number of ND steps of the ND filter is also fixed to 0. That is, the transparent portion 151a shown in FIG. 2 of the ND filter 151 is used in this region.

In a region where the EV is 8 (inclusive) to 11 (exclusive), the shutter speed is continuously variable from 1/60 to 1/125 sec, the F-number of aperture control is continuously variable from F2 to F4, and the number of ND steps of the ND filter is fixed to 0.

When the EV is 11 or more, the F-number of aperture control is returned from F4 to F2, and the number of ND steps of the ND filter is switched from 0 to 2. (Referring to FIG. 11B, the switching points of the F-number and the number of ND steps are different. In practice, however, the F-number and the number of ND steps are simultaneously changed.) That is, in this stage, the uniform-density portion 151b having an optical density of 0.6 shown in FIG. 2 of the ND filter 151 is used.

In a region where the EV is 11 (inclusive) to 14 (exclusive), the shutter speed is continuously variable from 1/125 to 1/250 sec, the F-number of aperture control is continuously variable from F2 to F4, and the number of ND steps of the ND filter is fixed to 2.

When the EV is 14 or more, the F-number of aperture control is returned from F4 to F2, and the number of ND steps of the ND filter is switched from 2 to 4. That is, in this stage, the uniform-density portion 151c having an optical density of 1.2 shown in FIG. 2 of the ND filter 151 is used.

In a region where the EV is 14 (inclusive) to 17 (exclusive), the shutter speed is continuously variable from 1/250 to 1/500 sec, the F-number of aperture control is continuously variable from F2 to F4, and the number of ND steps of the ND filter is fixed to 4.

In a region where the EV is 17 (inclusive) to 19 (exclusive), the shutter speed is continuously variable from 1/500 to 1/2000 sec, the F-number of aperture control is fixed to F4, and the number of ND steps of the ND filter is kept fixed to 4. The exposure control diagram described above is applied to single-shot photographing or photographing of the first frame in continuous photographing.

Next, photographing of the second frame and subsequent frames in the continuous mode will be described below.

An operation if the object luminance measured when the first frame of continuous photographing is EV12 will be explained. Referring to FIG. 11B, when the object luminance is EV12, F2.5, 2, and 1/150 sec are selected as the F-number, the number of ND steps, and the shutter speed, respectively. Accordingly, when a photometric calculation for the first frame of continuous photographing of still images is performed in the flow chart of FIG. 10, the windmill must be driven so as to control the aperture and the number of ND steps of the ND filter to F2.5 and 2, respectively. That is, the windmill 131 is coarsely driven 120° to set the ND filter 151 in the state shown in FIG. 3E. In this manner, the ND filter whose number of light attenuation steps is 2 is selected. The aperture value is set to F2.5 by finely driving the windmill 131 about 5°.

A control operation when still image continuous photographing is started and photographing is performed for the second time or after that will be explained below. As described above, when the object luminance at the beginning of continuous photographing is EV12, 2 is selected as the number of ND steps. When the number of times of execution of the continuous photographing is 2 or more, the number of ND steps is fixed to 2. FIG. 11C is a control diagram showing the aperture value, the number of ND steps, and the shutter speed in this case. In still image continuous photographing, if the brightness of an object changes during photographing, the light amount control apparatus must be controlled between exposure of one frame and exposure of the next frame. FIG. 11C is a control diagram in this case. That is, even when the object luminance changes, the number of ND steps is fixed to 2, and only the aperture value and shutter speed are changed. In this embodiment, the aperture value and shutter speed are controlled as follows during continuous photographing.

First, in a region where the EV is less than 11, the shutter speed is continuously variable to slower shutter speeds than 1/125 sec, and the F-number of aperture control is fixed to F2 as an open-aperture F-number.

In a region where the EV is 11 (inclusive) to 15.5 (exclusive), the shutter speed is continuously variable from 1/125 to 1/350 sec, and the F-number of aperture control is continuously variable from F2 to F5.6. In a region where the EV is 15.5 or more, the F-number of aperture control is fixed to F5.6, and the shutter speed is changed from 1/350 to 1/2000 sec.

By the above control, when continuous photographing is performed, the umber of ND control steps is fixed to the set value of the first frame, and correct exposure is obtained by controlling the stop aperture and shutter speed for photographing of the second frame and subsequent frames. Therefore, when the scene has a high luminance, small-aperture diffraction of the stop mechanism is alleviated by the ND filter. In addition, since the windmill driving amount during continuous photographing is very small, it is possible to save energy and prevent noise during photographing. Furthermore, the input light amount to the image sensing means can be continuously adjusted by continuous control of the F-number.

In the control of this embodiment, when an image is acquired in any of a preview operation, motion image photographing, and still image photographing, the opening 141c of the light amount control apparatus 100 is completely covered with the uniform-density portions of the ND filter. In other words, only the state in which the beam passing opening is completely covered with the uniform-density portions is permitted, and the state in which this opening is partially covered is inhibited. Accordingly, this embodiment also has the advantage that naturally blurred images can be obtained whenever photographing is performed.

(Second Embodiment)

In the light amount control apparatus used in the first embodiment, the aperture blades and ND filter are driven by one actuator. In the second embodiment described below, aperture blades and ND filter are driven by independent actuators.

Figure 12:
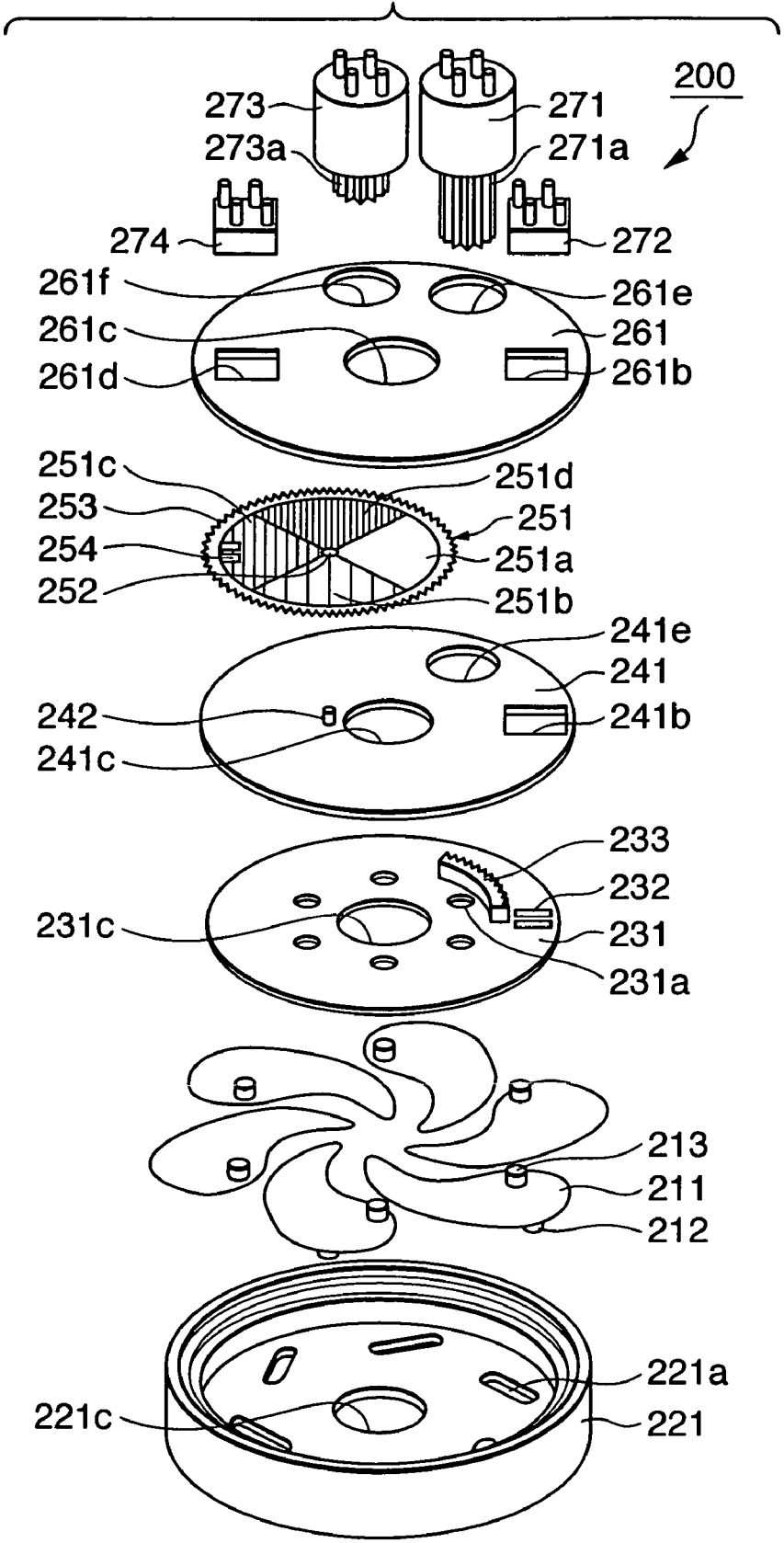
FIG. 12 is an exploded perspective view of a light amount control apparatus according to the second embodiment.

FIG. 12 is an exploded perspective view for explaining the structure of a light amount control apparatus 200 of the second embodiment. FIG. 12 corresponds to FIG. 1 of the first embodiment.

In FIG. 12, reference numeral 211 denotes an aperture blade having light-shielding properties over the entire region. Pins 212 and 213 to be driven stand upward from the lower and upper surfaces, respectively, of the aperture blade 211. A stop aperture is formed by using six aperture blades 211 having the same shape.

Reference numeral 221 denotes a base plate for holding the aperture blades 211. In the center of the planar bottom surface, an opening 221c which defines the maximum diameter of a light beam at open aperture is formed. Cam grooves 221a are formed around the opening 221c. The pins 212 of the aperture blades 211 fit in the cam grooves 221a and can move in slidable contact with the cam grooves 221a.

Reference numeral 231 denotes a driving member called a windmill. Six holes 231a for driving the blades are equally spaced around a central opening 231c. The pins 213 of the aperture blades 211 rotatably fit in the holes 231a. When the windmill 231 rotates counterclockwise, the six aperture blades 211 are driven by the pins 213 on their upper surfaces, and the pins 212 on their lower surfaces slidably move in the cam grooves 221a. As a consequence, the stop aperture diameter continuously decreases to perform a stopping-down operation. An index 232 for detecting the windmill initial position and a gear 233 to be driven are also formed on the upper surface of the windmill 231.

A partition 241 forms a predetermined space between the base plate 221 and partition 241. In this space, the aperture blades 211 and windmill 231 are accommodated. An opening 241c for allowing a light beam to pass through it is formed in the center of the partition 241. A rotation support shaft 242 of an ND filter (to be described later) stands upward adjacent to the opening 241c. In addition, a phase detecting window 241b for detecting the presence/absence of the index 232 of the windmill and an escape hole 241e for a pinion gear (to be described layer) are formed in the partition 241.

Reference numeral 251 denotes a disk-like ND filter. As in the first embodiment, the ND filter 251 is obtained by forming an ND pattern (to be described later) on a transparent resin film, for example, a PET (PolyEthylene Terephthalate) film about 0.1 mm thick by inkjet printing. A bearing 252 is formed in the center of the ND filter 251 and rotatably axially supported by the rotation support shaft 242 on the partition. A gear 253 made of a metal plate is adhered to the outer edge of the ND filter. Note that the outer edge of the transparent film as the base of the ND filter may also be formed into the shape of a gear. On the upper surface of the ND filter 251, an index 254 for detecting the initial position of the ND filter is formed.

The light attenuation pattern of the ND filter 251 is made up of the following four regions. Reference numeral 251a denotes a transparent portion having a transmittance of 100%, in which the optical density is 0 and the number of ND steps (the number of light attenuation steps) is also 0. Reference numeral 251b denotes a uniform-density portion having an optical density of 0.45 (the number of ND steps is 1.5); 251c, a uniform-density portion having an optical density of 0.9 (the number of ND steps is 3); and 251d, a uniform-density portion having an optical density of 1.35 (the number of ND steps is 4.5). That is, the optical densities of the four ND filters including the transparent portion are set to form an arithmetic sequence.

A cover plate 261 forms a predetermined space between the partition 241 and cover plate 261. The ND filter 251 is accommodated in this space. An opening 261c for letting a light beam pass through it is formed in the center of the cover plate 261. In addition, detection windows 261b and 261d for detecting the presence/absence of the index 232 of the windmill and the index 254 of the ND filter, respectively, and escape holes 261e and 261f for pinion gears (to be described later) are formed in the cover plate 261.

Reference numeral 271 denotes a step motor for driving the windmill 231. A pinion gear 271a extends through the holes 261e and 241e, and meshes with the gear 233 formed on the windmill 231. Reference numeral 272 denotes an optical position detecting means incorporating a light-emitting element and light-receiving element. The optical position detecting means 272 detects reflected light from the upper surface of the windmill 231. When the index 232 opposes the detecting means 272 in a position immediately below the detecting means 272, the detecting means 272 outputs a predetermined signal to indicate that the phase angle of the windmill 231 has returned to the initial state.

In the above arrangement, the windmill 131 is returned to the initial state by driving the step motor 171 while the output from the detecting means 172 is monitored, thereby returning the stop aperture to the open aperture. By driving the step motor from this position in accordance with a predetermined program, the stop aperture can be controlled to an arbitrary size. Note that in this embodiment, when the above stop mechanism is incorporated into a photographing optical system (to be described later), the F-number can be controlled from F2 as an open-aperture F-number to F8 as a small-aperture F-number.

Reference numeral 273 denotes a step motor for driving the ND filter 251. A pinion gear 273a extends through the hole 261f, and meshes with the gear 253 formed on the ND filter 251. Reference numeral 274 denotes an optical position detecting means incorporating a light-emitting element and light-receiving element. The optical position detecting means 274 detects reflected light from the upper surface of the ND filter 251. When the index 254 opposes the detecting means 274 in a position immediately below the detecting means 274, the detecting means 274 outputs a predetermined signal to indicate that the phase angle of the ND filter 251 has returned to the initial state.

In the above arrangement, the ND filter 251 is returned to the initial state, that is, the state in which the transparent portion 251a covers the opening 241c, by driving the step motor 273 while the output from the detecting means 274 is monitored. By driving the step motor from this position in accordance with a predetermined program, the transmitted light attenuation ratio of the ND filter can be controlled to an arbitrary value.

Also, in the above arrangement, a plurality of driving control means, that is, the two stop motors 271 and 273 are juxtaposed in the annular space around the opening 221c or 241c. Therefore, this light amount control apparatus can be made as small as the light amount control apparatus of the first embodiment.

Figure 13:
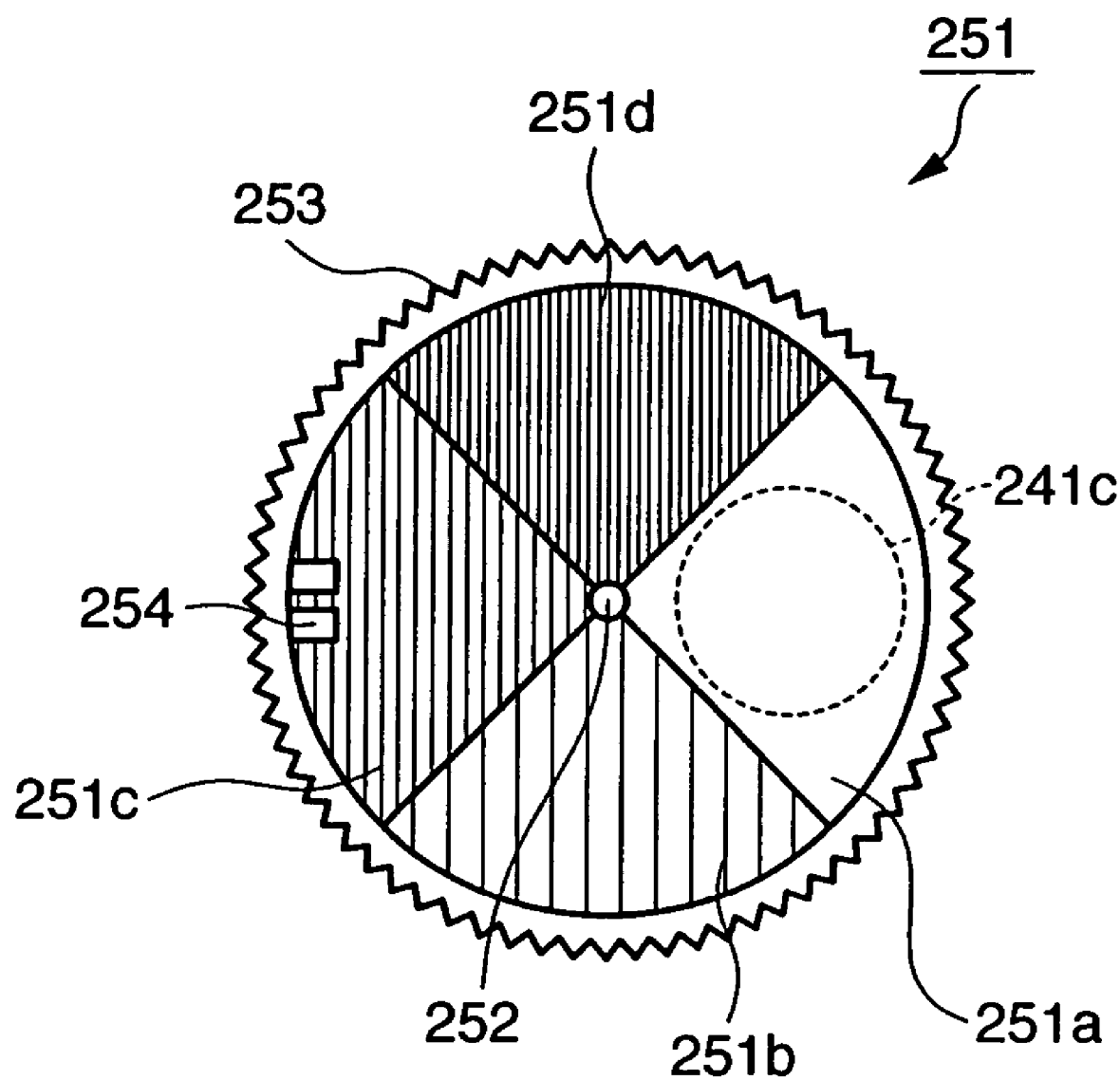
FIG. 13 is a plan view of an ND filter according to the second embodiment.

FIG. 13 is a plan view for explaining details of the optical density distribution of the ND filter 251. FIG. 13 corresponds to FIG. 2 of the first embodiment. The disk-like ND filter 251 has the same mechanical arrangement as that of the ND filter 151 of the first embodiment. That is, the ND filter 251 is obtained by forming an ND pattern (to be described later) on a transparent resin film, that is, a PET (PolyEthylene Terephthalate) film about 0.1 mm thick by ink-jet printing. The bearing 252 is formed in the center of the ND filter 251 and rotatably axially supported by the rotation support shaft 242 on the partition. The gear 253 made of a metal plate is adhered to the outer edge of the ND filter. In addition, the index 254 for detecting the initial position of the ND filter is formed on the upper surface of the ND filter 251.

Reference numeral 251a denotes the uniform-density portion having an optical density of 0, that is, a transparent portion; 251b, the uniform-density portion having an optical density of 0.45; 251c, the uniform-density portion having an optical density of 0.9; and 251d, the uniform-density portion having an optical density of 1.35. Each of these fourth uniform-density portions assumes a fan shape, and the central angle of each uniform-density portion is 90°. The optical densities of these portions including the transparent portion are so set as to form an arithmetic sequence. Each fan-shaped uniform-density portion has an enough size to completely cover the opening 141c.

Figure 14A:
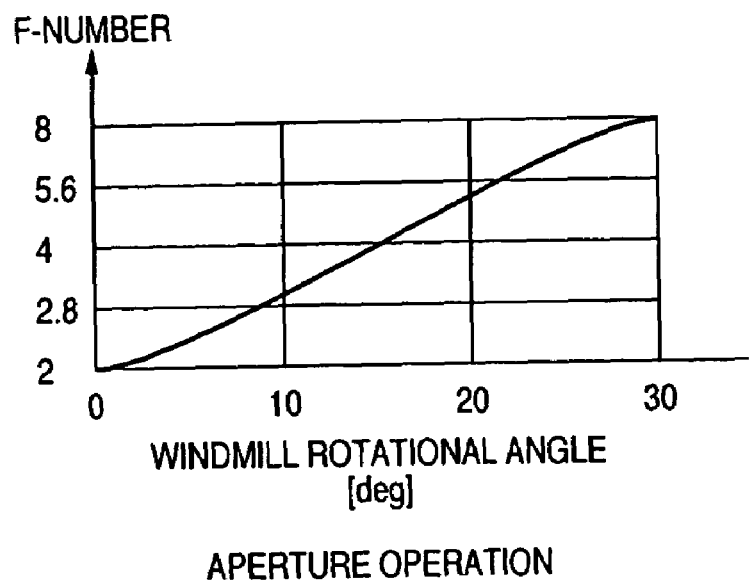
FIGS. 14A and 14B are graphs for explaining the light amount control function of the light amount control apparatus according to the second embodiment.
Figure 14B:
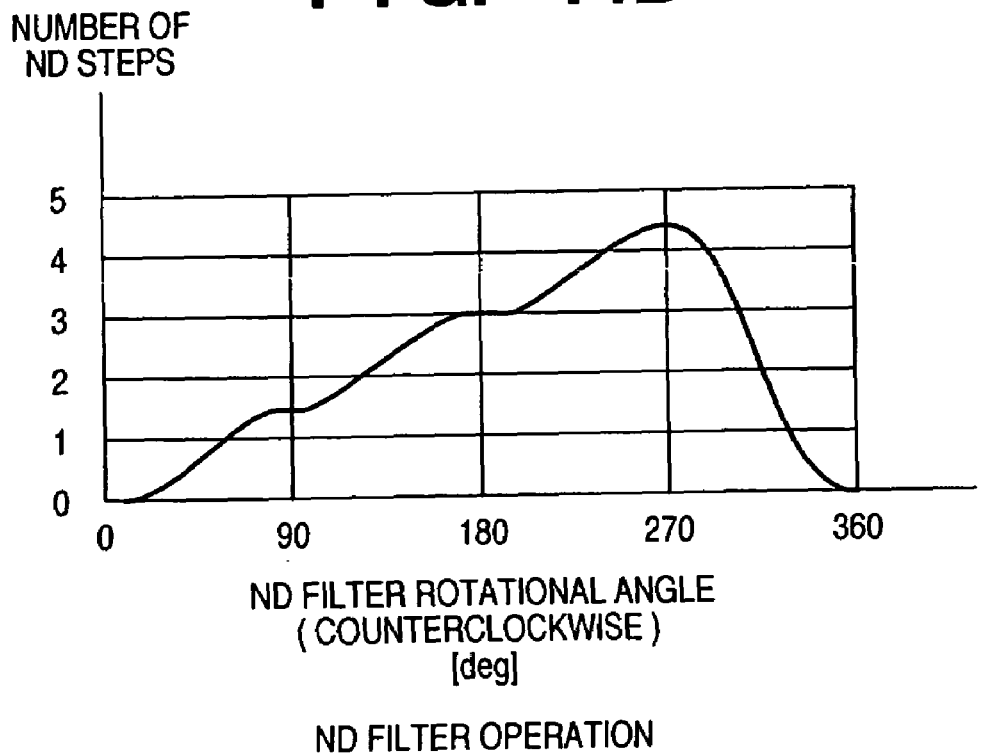

FIGS. 14A and 14B are graphs for explaining the light amount control function of the light amount control apparatus shown in FIG. 12. That is, FIGS. 14A and 14B explain the light amount control function of the ND filter 251, and correspond to FIG. 4 of the first embodiment. In the second embodiment, it is possible to independently control the F-number of the aperture blades and the number of light attenuation steps of the ND filter. Therefore, FIG. 14A shows the aperture operation, and FIG. 14B shows the operation of the ND filter.

First, the aperture operation shown in FIG. 14A will be explained. In FIG. 14A, the abscissa indicates the rotational angle of the windmill 131, and the ordinate indicates the F-number of the aperture formed by the aperture blades 211. As shown in FIG. 14A, as the rotational angle of the windmill 231 increases, the F-number increases substantially linearly from F2 as an open-aperture F-number to F8 as the minimum aperture value.

The operation of the ND filter shown in FIG. 14B is as follows. In FIG. 14B, the abscissa indicates the rotational angle of the ND filter, and the ordinate indicates the number of ND steps (the number of light attenuation steps). As the ND filter rotates, the regions from the zero-density region to the highest-density region cover the stop aperture, so the number of ND steps also changes from 0 to 4.5. However, since the uniform-density portions and their boundaries of the ND filter alternately cover the aperture, the number of ND steps does not linearly change. That is, the rate of change is 0 at 0°, 90°. 80°, and 270° at which the uniform-density portion completely covers the aperture.

FIG. 15 shows an arrangement in which the light amount control apparatus 200 explained in FIGS. 12 to 14B is incorporated into a photographing apparatus. In the first embodiment, the aperture blades and ND filter are driven by the single actuator, so the driver 433 shown in FIG. 5 is the only driving circuit of the light amount control apparatus. In the second embodiment, the aperture and ND filter are driven by the different step motors. Therefore, this embodiment includes two driving circuits, that is, an ND filter driver 432 and aperture driver 433, thereby independently controlling driving of the step motors 273 and 271 shown in FIG. 12. The rest of the arrangement is the same as the photographing apparatus of the first embodiment, so a detailed description thereof will be omitted.

Light amount control performed by the photographing apparatus of the second embodiment will be described below. The photographing apparatus of the second embodiment shown in FIG. 15 also has various photographing modes similar to those of the photographing apparatus shown in FIG. 5. However, a main control flow of photographing is substantially the same as that shown in FIG. 7 of the first embodiment, so a detailed explanation thereof will be omitted.

Figure 16:
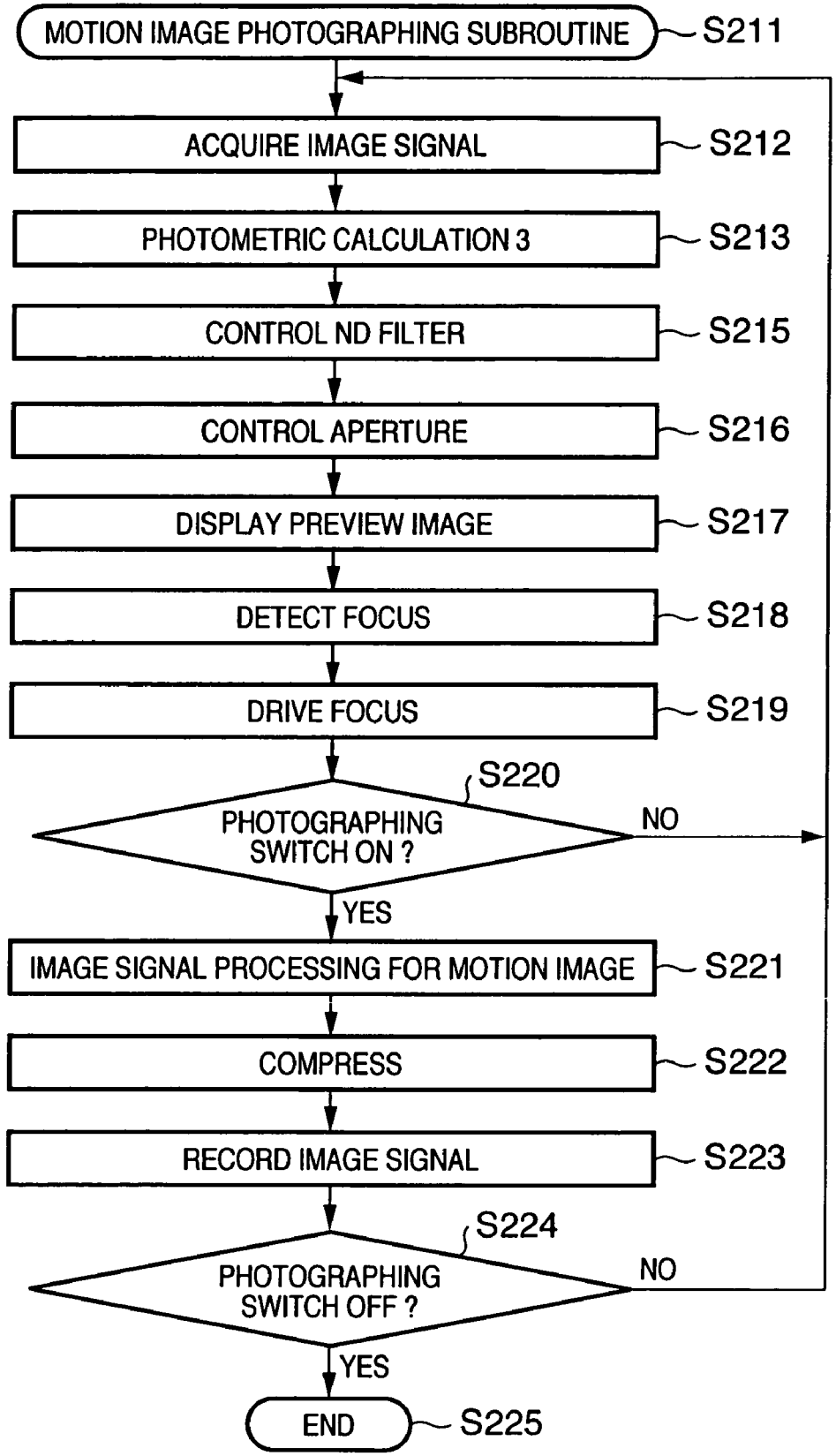
FIG. 16 is a flow chart of a motion image photographing subroutine flow in the second embodiment.

FIG. 16 is a motion image photographing subroutine flow chart which corresponds to FIG. 8 of the first embodiment. That is, when the flow branches from the main control flow chart to the motion image subroutine, in step S212 after step S211, a CPU 431 acquires an image signal by an image sensing means 440, and performs predetermined image processing by an image signal processor 442. In step S213, the CPU 431 performs photometric calculation 3. Photometric calculation 3 is a photometric calculation for motion image photographing. That is, the CPU 431 calculates an aperture control value and a control value of the number of ND steps of the light amount control apparatus 200 by using the maximum value, minimum value, mean value, and the like of the image signal acquired in step S212. In step S215, the CPU 431 controls the ND filter. More specifically, the CPU 431 sets a desired number of ND steps by rotating the ND filer 251 through a predetermined angle as explained in FIG. 14B. In step S216, the CPU 431 controls the aperture. More specifically, the CPU 431 controls the stop aperture to a desired F-number by rotating the windmill 231 through a predetermined angle as explained in FIG. 14A.

In step S217, the CPU 431 converts the image signal acquired in step S212 into a preview image, and displays this preview image on a display 421.

In steps S218 and S219, the CPU 431 adjusts the focus of the photographing optical system 400. This focus adjustment is focusing control so-called hill-climbing servo AF which stops lenses by finding a focus position at which the high-frequency component of an image signal takes a maximum value.

In step S220, the CPU 431 determines whether a photographing switch for motion image photographing is turned on by the photographer. If the photographing switch is not turned on, the flow returns to step S212 to repetitively execute the light amount control, focusing control, and preview image display. If it is determined in step S220 that the photographing switch is turned on, the flow advances from step S220 to step S221.

In step S221, the CPU 431 reduces the image signal acquired by the image sensing means 440 into 300,000 pixels which is the number of pixels for a motion image, and performs image processing for a motion image. In step S222, the CPU 431 performs image compression for motion image recording. In step S223, the CPU 431 records the compressed image signal in the memory 443.

In step S224, the CPU 431 determines whether the photographing switch is turned off by the photographer. If the photographing switch is not turned off, the flow returns to step S212 to repetitively control the light amount, control the focusing, display the preview image, and record the motion image for recording into the memory. If it is determined in step S224 that the photographing switch is turned off, the CPU 431 terminates the photographing in step S225.

In the light amount control apparatus of the second embodiment as described above, the F-number and the number of ND steps can be independently controlled by the different actuators. This makes it possible to set an arbitrary number of ND steps in real time during motion image photographing, and further increases the degree of freedom of light amount control. Also, various control methods different from that in the first embodiment can be performed during still image photographing. However, these methods need only be performed in accordance with the method executed in the motion image mode described above, so a detailed explanation thereof will be omitted.

(Third Embodiment)

In the ND filter used in the second embodiment described above, a disk-like filter is divided into a plurality of regions to give different optical densities to these regions, and the optical density distribution of each divided region is uniform. In an ND filter of the third embodiment described below, however, the optical density changes step by step or continuously along the circumference of a disk-like filter.

Figure 17A:
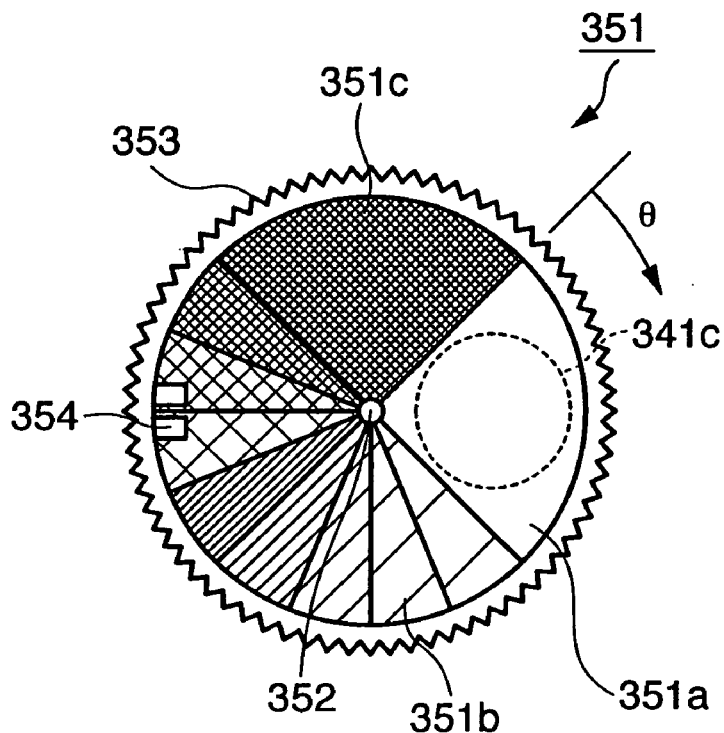
FIGS. 17A and 17B are a plan view of an ND filter according to the third embodiment and a graph for explaining the light amount control function of the ND filter, respectively.

FIG. 17A is a plan view for explaining details of the optical density distribution of an ND filter 351 of the third embodiment. FIG. 17A corresponds to FIG. 13 of the second embodiment. A disk-like ND filter 351 has the same mechanical arrangement as that of the ND filter 151 of the first embodiment and the ND filter 251 of the second embodiment. That is, the ND filter 351 is obtained by forming an ND pattern (to be described later) on a transparent resin film, for example, a PET (PolyEthylene Terephthalate) film about 0.1 mm thick by inkjet printing. A bearing 352 is formed in the center of the ND filter 351 and rotatably axially supported by a rotation support shaft on a partition. A gear 353 made of a metal plate is adhered to the outer edge of the ND filter. In addition, an index 354 for detecting the initial position of the ND filter is formed on the upper surface of the ND filter 351.

Figure 17B:
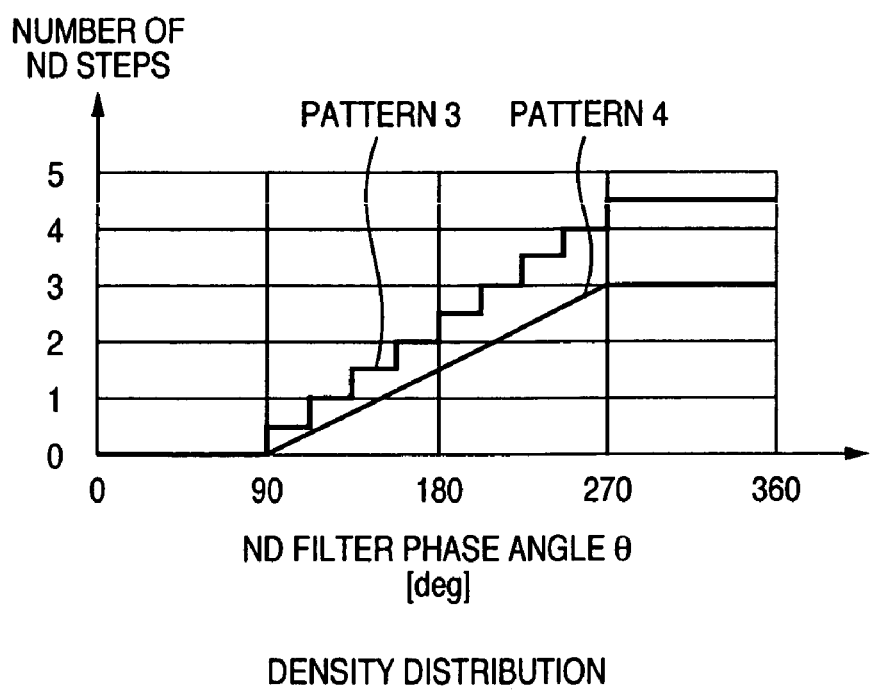

Reference numeral 351a denotes a uniform-density portion having an optical density of 0, that is, a transparent portion; and 351c, a uniform-density portion having an optical density of 1.35. Each of these two uniform-density portions assumes a fan shape, and the central angle of each uniform-density portion is 90°. On the other hand, reference numeral 351b denotes a multi-density portion. In this embodiment, the multi-density portion 351b is a set of eight unit fan shapes having a central angle of 22.5°. These unit regions are so arranged that the number of ND steps increases step by step by 0.5 at one time, that is, the OD value indicating the optical density increases step by step by 0.15 at one time, from a portion adjacent to the transparent portion 351a toward a portion adjacent to the highest-density portion 351c. FIG. 17B shows the density distribution of the ND filter with respect to a clockwise phase angle θ defined by taking the boundary between the transparent portion 351a and highest-density portion 351c as the origin in FIG. 17A.

Referring to FIG. 17B, the abscissa indicates the phase angle θ on the ND filter, and the ordinate indicates the number of ND steps of the ND filter at each phase position. In FIG. 17B, a curve indicated by pattern 3 is the density distribution pattern of the ND filter explained in FIG. 17A. As shown in FIG. 17B, a region between phase angles of 90° and 180° is equally divided into eight regions. In these unit regions, the number of ND steps linearly increases step by step by 0.5 at one time as the phase angle increases.

As a modification of pattern 3 described above, an ND filter having a density distribution indicated by pattern 4 in FIG. 17B may also be used. That is, a disk-like ND filter has a transparent portion having a predetermined central angle, and a uniform-density portion which also has a predetermined central angle and in which the number of ND steps is 3 (the optical density is 0.9). In a transition region sandwiched between these two portions, the optical density continuously and linearly changes with the phase angle θ. By thus giving a density pattern in which the optical density linearly changes with the phase angle θ, it is possible to simultaneously achieve the maximum width of the light attenuation ratio of the ND filter and the control resolution. Another advantage is that the exposure control algorithm based on the control equation indicated by equation (4) or equation (6) is simplified.

In the light amount control apparatus according to this application as described above, the F-number of the stop mechanism and the number of light attenuation steps of the ND filter can be independently controlled. Therefore, small-aperture diffraction caused by the use of the ND filter can be prevented in high-luminance scenes. Additionally, the F-number can be freely controlled in all photographing scenes.

In the second light amount control apparatus according to this application, the light amount attenuating function of the aperture blades and the light amount attenuating function of the ND filter are independently controlled by one actuator. This achieves downsizing and a low price of the apparatus.

In the third light amount control apparatus according to this application, driving control of the actuator is simplified. This makes it possible to reduce components of the light amount control apparatus, and simplify the control program.

In the fourth light amount control apparatus according to this application, an increase in size of the apparatus can be prevented while the degree of freedom of the light amount control function is increased by using a plurality of actuators.

In the fifth photographing apparatus according to this application, the F-number of the aperture and the number of light attenuation steps of the ND filter can be freely controlled. Consequently, both high-quality motion images and still images can be obtained.

By the sixth filter according to this application, a small-sized light amount control filter having high light amount attenuating ability can be obtained.

By the seventh filter according to this application, high-quality images can be obtained, while small-aperture diffraction is prevented, without producing any unevenness in the illuminance distribution of a blurred image.

By the eighth filter according to this application, high-quality images can be obtained by achieving both the continuity of light amount control and the prevention of unevenness of the illuminance distribution of a blurred image.

By the ninth filter according to this application, a control program can be simplified while the light amount control accuracy is ensured.

As described above, the first to third embodiments can provide a small and inexpensive light amount control apparatus, photographing apparatus, and filter by which the degree of freedom of light amount control is large, and the form of an aperture during stopping down is held.

(Fourth Embodiment)

FIGS. 18 to 27B are views related to the fourth embodiment.

<Light Amount Control Apparatus>

FIG. 18 is an exploded perspective view of the main parts of a light amount control apparatus 1100. In FIG. 18, reference numeral 1111 denotes an aperture blade having light-shielding properties over the entire region. Pins 1112 and 1113 to be driven stand upward from the lower and upper surfaces, respectively, of the aperture blade 1111. A stop aperture is formed by using six aperture blades 111 having the same shape.

Reference numeral 1121 denotes a base plate for holding the aperture blades 1111. In the center of the planar bottom surface, an opening 1121c which defines the maximum diameter of a light beam at open aperture is formed. Six cam grooves 1121a are formed around the opening 1121c. The pins 1112 of the aperture blades 1111 fit in the cam grooves 1121a and can move in slidable contact with the cam grooves 1121a.

Reference numeral 1131 denotes a driving member called a windmill. Six holes 1131a for driving the blades are equally spaced around a central opening 1131c. The pins 1113 of the aperture blades 1111 rotatably fit in the holes 1131a. When the windmill 1131 rotates counterclockwise, the six aperture blades 1111 are driven by the pins 1113 on their upper surfaces, and the pins 1112 on their lower surfaces slidably move in the cam grooves 1121a. Consequently, the stop aperture diameter continuously decreases to perform a stopping-down operation. On the upper surface of the windmill 131, an index 1132 for detecting the initial position of the windmill and a gear 1133 to be driven are formed.

A partition 1141 forms a predetermined space between the base plate 1121 and partition 1141. In this space, the aperture blades 1111 and windmill 1131 are accommodated. An opening 1141c for allowing a light beam to pass through it is formed in the center of the partition 1141. A rotation support shaft 1142 of an ND filter (to be described later) stands upward adjacent to the opening 1141c. In addition, a phase detecting window 1141b for detecting the presence/absence of the index 1132 of the windmill and an escape hole 1141e for a pinion gear (to be described layer) are formed in the partition 1141.

Reference numeral 1151 denotes a disk-like filter, for example, an ND filter obtained by forming an ND pattern (to be described later) on a transparent resin film, for example, a PET (PolyEthylene Terephthalate) film about 0.1 mm thick by ink-jet printing. A bearing 1152 is formed in the center of the ND filter 1151 and rotatably axially supported by the rotation support shaft 1142 on the partition. A gear 1153 to be driven made of a metal plate is adhered to the outer edge of the ND filter. Note that the outer edge of the transparent film as the base of the ND filter may also be formed into the shape of a gear. In addition, an index 1154 for detecting the initial position of the ND filter is formed on the upper surface of the ND filter 1151.

In this embodiment, the light attenuation pattern of the ND filter 1151 is made up of the following five regions. Reference numeral 1151a denotes a transparent portion having a transmittance of 100%, in which the optical density is 0 and the number of ND steps (the number of light attenuation steps) is also 0. The optical density (OD value), a transmittance Tr (%), and the number of ND steps are related by $$\text{Transmittance } Tr=100*10(-_{OD} \text{ value}) \quad (7)$$

$$OD \text{ value}=-\text{Log}_{10}(Tr/100) \quad (8)$$

$$\begin{aligned}\text{Number of } ND \text{ steps} &= -\text{Log}_2(Tr/100) \\ &= -3.32*\text{Log}_{10}(Tr/100) \\ &= 3.32*OD \text{ value}\end{aligned} \quad (9)$$

Reference numeral 1151c denotes a uniform-density portion having an optical density of 0.6 (the number of ND steps is 2); and 1151e, a uniform-density portion having an optical density of 1.2 (the number of ND steps is 4). Also, reference numeral 151b denotes a first gradation-density portion in which the optical density continuously changes from 0 to 0.6 along the clockwise phase angle direction; and 1151d, a second gradation-density portion in which the optical density continuously changes from 0.6 to 1.2 along the same phase angle direction.

A cover plate 1161 forms a predetermined space between the partition 1141 and cover plate 1161. The ND filter 1151 is accommodated in this space. An opening 1161c for letting a light beam pass through it is formed in the center of the cover plate 1161. In addition, a detection window 1161b for detecting the presence/absence of the index 1132 of the windmill and the index of the ND filter, and escape holes 1161e and 1161f for pinion gears (to be described later) are formed in the cover plate 1161.

Reference numeral 1171 denotes a step motor for driving the windmill 1131. A pinion gear 1171a extends through the holes 1161e and 1141e, and meshes with the gear 1133 formed on the windmill 1131. Reference numeral 1172 denotes an optical position detecting means incorporating a light-emitting element and light-receiving element. The optical position detecting means 1172 detects reflected light from the upper surface of the windmill 1131. When the index 1132 opposes the detecting means 1172 in a position immediately below the detecting means 1172, the detecting means 1172 outputs a predetermined signal to indicate that the phase angle of the windmill 1131 has returned to the initial state.

In the above arrangement, the windmill 1131 is returned to the initial state by driving the step motor 1171 while the output from the detecting means 1172 is monitored, thereby returning the stop aperture to the open aperture. By driving the step motor from this position in accordance with a predetermined program, the stop aperture can be controlled to an arbitrary size. Note that in this embodiment, when the above stop mechanism is incorporated into a photographing optical system (to be described later), the F-number can be controlled from F2 as an open-aperture F-number to F8 as a small-aperture F-number.

Reference numeral 1173 denotes a step motor for driving the ND filter 1151. A pinion gear 1173a extends through the hole 1161f, and meshes with the gear 1153 formed on the ND filter 1151. Reference numeral 1174 denotes an optical position detecting means incorporating a light-emitting element and light-receiving element. The optical position detecting means 1174 detects reflected light from the upper surface of the ND filter 1151. When the index 1152 opposes the detecting means 1174 in a position immediately below the detecting means 1174, the detecting means 1174 outputs a predetermined signal to indicate that the phase angle of the ND filter 1151 has returned to the initial state.

In the above arrangement, the ND filter 1151 is returned to the initial state, that is, the state in which the transparent portion 1151a covers the opening 1141c, by driving the step motor 1173 while the output from the detecting means 1174 is monitored. By driving the step motor from this position in accordance with a predetermined program, the transmitted light attenuation ratio of the ND filter can be controlled to an arbitrary value.

<Optical Density Distribution of Filter>

Figure 19:
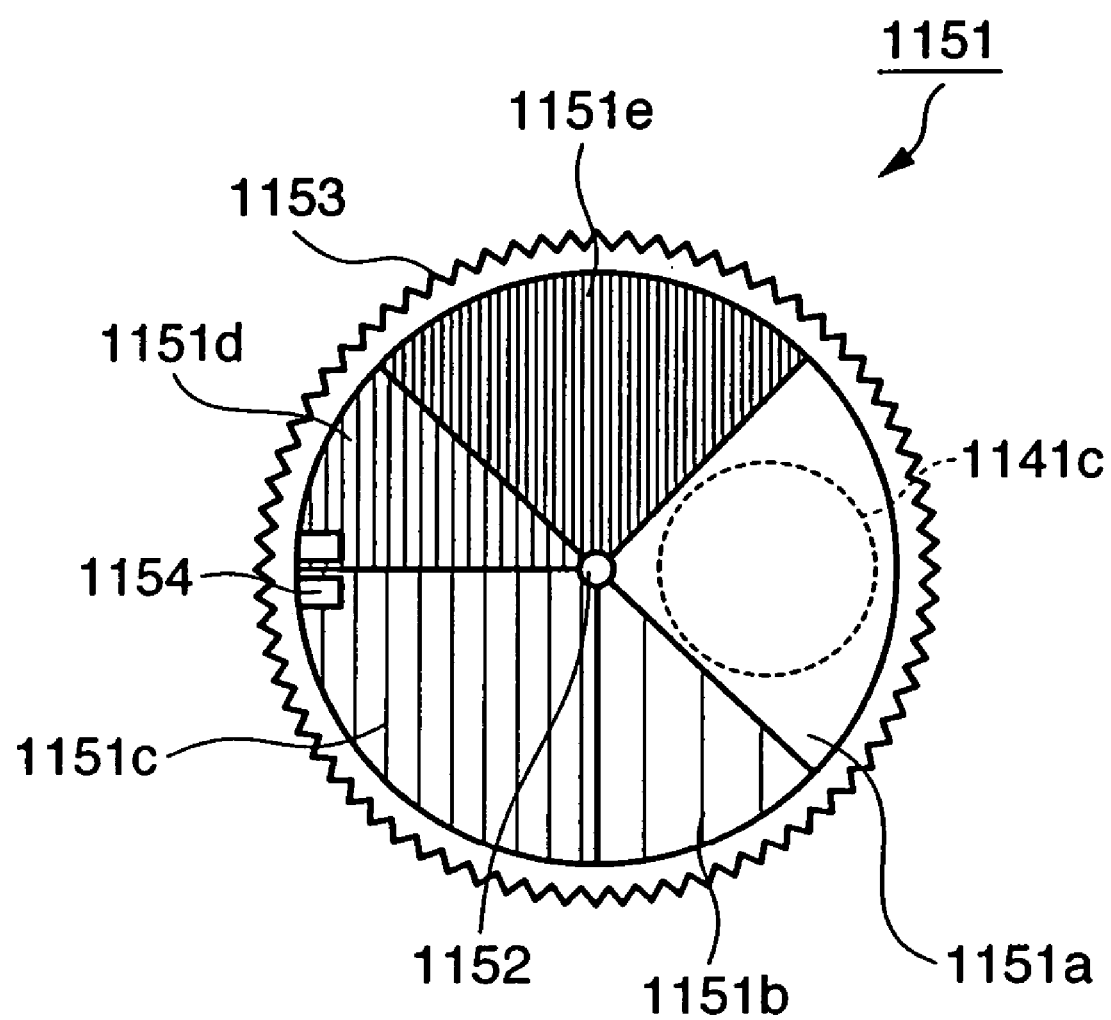
FIG. 19 is a plan view of an ND filter according to the fourth embodiment.

FIG. 19 is a plan view for explaining details of the optical density distribution of the ND filter 1151. Reference numeral 1151a denotes the uniform-density portion having an optical density of 0, that is, a transparent portion (the number of ND steps is 0); 1151c, the uniform-density portion having an optical density of 0.6 (the number of ND steps is 2); and 1151e, the uniform-density portion having an optical density of 1.2 (the number of ND steps is 4). Each of these three uniform-density portions assumes a fan shape, and the central angle of each uniform-density portion is 90°. The circle 141c indicated by the broken line is the opening of the partition 1141, and represents an effective beam diameter at open aperture. In this embodiment, each of the three uniform-density portions 1151a, 1151b, and 1151c has an enough size to completely cover the opening 1141c when the central axis of the fan shape is aligned with the center of the opening 1141c.

Reference numeral 1151b denotes the first gradation-density portion in which the optical density continuously changes from 0 to 0.6 along the clockwise phase angle direction; and 1151d, the second gradation-density portion in which the optical density continuously changes from 0.6 to 1.2 along the same phase angle direction. Each of these two gradation-density portions also assumes a fan shape, and the central angle of each portion is 45°.

The ND filter having the above density distribution can be manufactured by vapor deposition, printing, or the like. When the technique described in Japanese Patent Application No. 2002-041634 filed by the present applicant is used, an ND filter which does not cause many optical defects such as scattering and has a desired optical density distribution can be manufactured by using the inkjet printing method.

<Relative Positions of Opening and Filter>

FIGS. 20A to 20E are views for explaining the relative positions of the beam passing opening and ND filter with respect to the rotational angle of the ND filter.

Figure 20A:
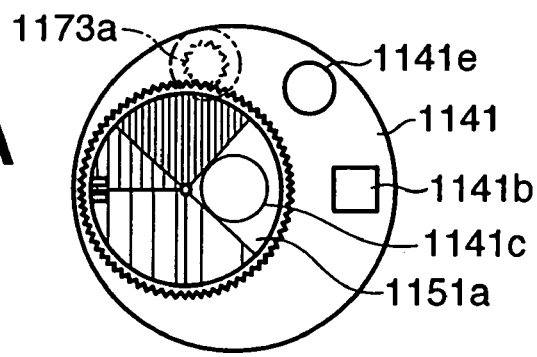
FIGS. 20A to 20E are views for explaining the rotational phase of the ND filter according to the fourth embodiment.

FIG. 20A is a view showing the state in which the rotational angle of the ND filter 1151 is 0°, that is, the ND filter 1151 is in the initial position. In this state, the whole region of the opening 1141c is covered with the transparent portion 1151a of the ND filter. That is, in this state, the transmittance of the stop aperture is uniform throughout the entire region, and the intensity distribution of a light beam passing through the aperture is uniform. In other words, the pupil intensity distribution viewed from the image formation plane is uniform.

Figure 20B:
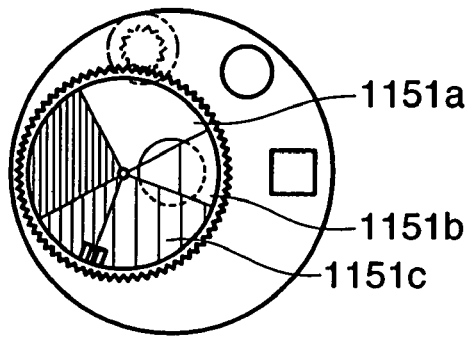

FIG. 20B shows the state in which the rotational angle of the ND filter 1151 is 67.5°. In this state, the opening 1141c is covered with the first gradation-density portion 1151b of the ND filter. In other words, the uniform-density portion 1151a or 1151c of the ND filter partially covers the opening 1141c. In this state, the transmittance of the stop aperture changes from one place to another, so the intensity distribution of a light beam passing through the aperture is nonuniform. In other words, the pupil intensity distribution viewed from the image formation plane is nonuniform.

Figure 20C:
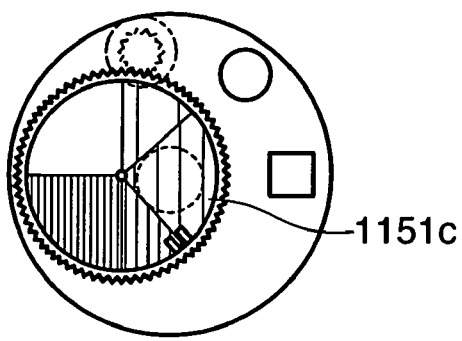

FIG. 20C shows the state in which the rotational angle of the ND filter 1151 is 135°. In this state, the opening 1141c is entirely covered with the uniform-density portion 1151c having an optical density of 0.6. That is, in this state, the transmittance of the stop aperture is uniform throughout the entire region, and the pupil intensity distribution viewed from the image formation plane is also uniform.

Figure 20D:
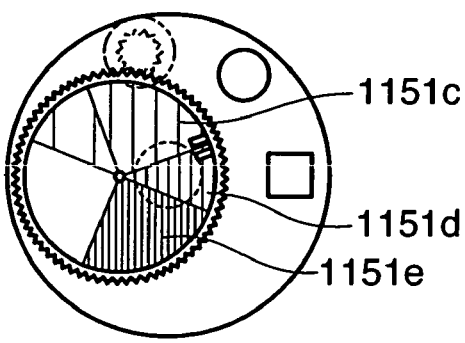

FIG. 20D shows the state in which the rotational angle of the ND filter 1151 is 202.5°. In this state, the opening 1141c is covered with the second gradation-density portion 1151d of the ND filter. In other words, the uniform-density portion 1151c or 1151e of the ND filter partially covers the opening 1141c. That is, in this state, the transmittance of the stop aperture changes from one place to another, so the intensity distribution of a light beam passing through the aperture is nonuniform. In other words, the pupil intensity distribution viewed from the image formation plane is nonuniform.

Figure 20E:
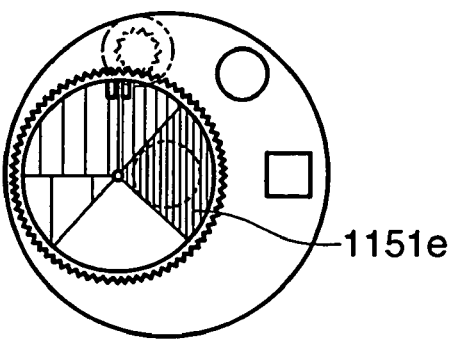

FIG. 20E shows the state in which the rotational angle of the ND filter 1151 is 270°. In this state, the opening 1141c is entirely covered with the uniform-density portion 1151e having an optical density of 1.2. That is, in this state, the transmittance of the stop aperture is uniform throughout the entire region, and the pupil intensity distribution viewed from the image formation plane is also uniform.

<Light Amount Control Function>

Figure 21A:
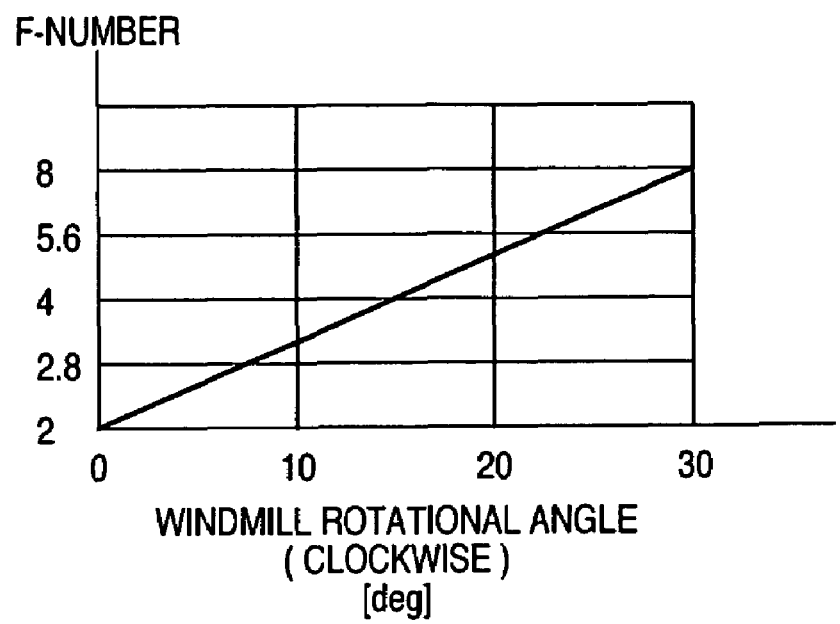
FIGS. 21A and 21B are graphs for explaining the light amount control function of the light amount control apparatus according to the fourth embodiment.
Figure 21B:
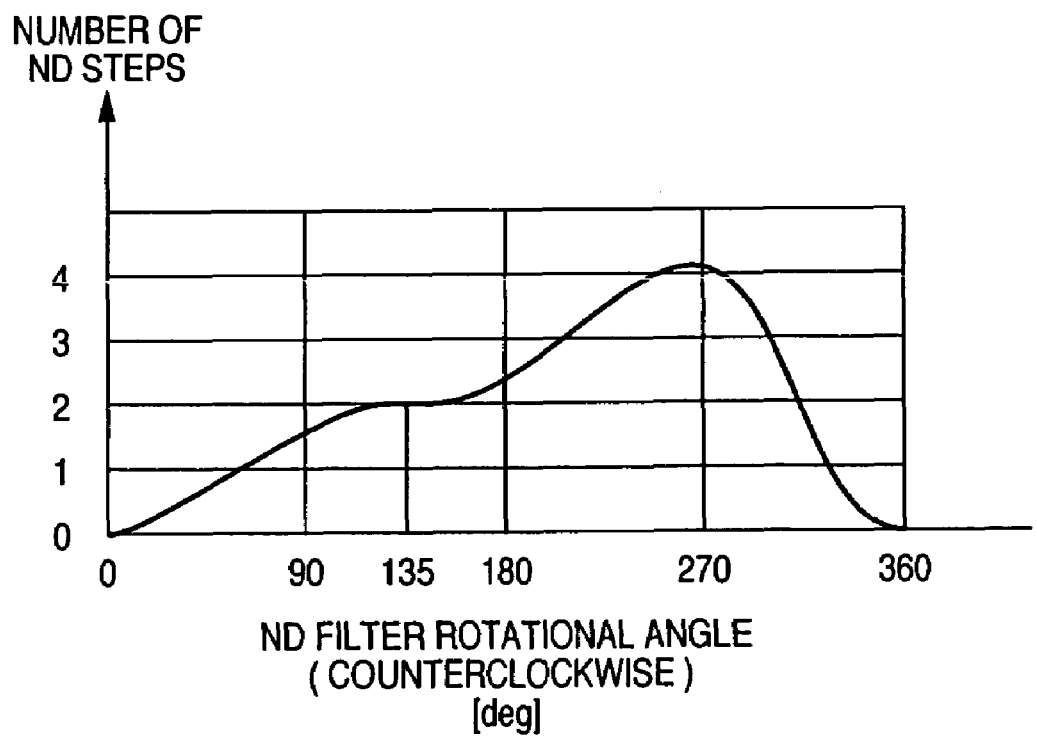

FIGS. 21A and 21B are graphs for explaining the light amount control function of the light amount control apparatus 1100 shown in FIG. 18. FIG. 21A is a graph showing the way the aperture value, that is, the F-number changes with the rotational angle of the windmill 1131. In FIG. 21A, the abscissa indicates the rotational angle when the windmill 1131 rotates clockwise, and the ordinates indicate the F-number of the stop aperture. As the windmill 1131 rotates, the aperture blades 1111 are continuously stopped down, and the F-number continuously changes from F2 to F8.

FIG. 21B is a graph showing the number of ND steps as a function of the rotational angle of the ND filter 1151. In FIG. 21B, the abscissa indicates the rotational angle when the ND filter 1151 rotates counterclockwise, and the ordinate indicates the number of ND steps represented by equation (9) presented earlier. As the ND filter 1151 rotates, regions from the zero-density region to the highest-density region cover the stop aperture, so the number of ND steps changes from 0 to 4. However, since the uniform-density portions and gradation-density portions of the ND filter alternately cover the aperture, the change in number of ND steps is nonlinear. That is, the rate of change is 0 at 0°, 135°, and 270° at which the uniform-density portion covers the aperture.

<Digital Camera>

Figure 22:
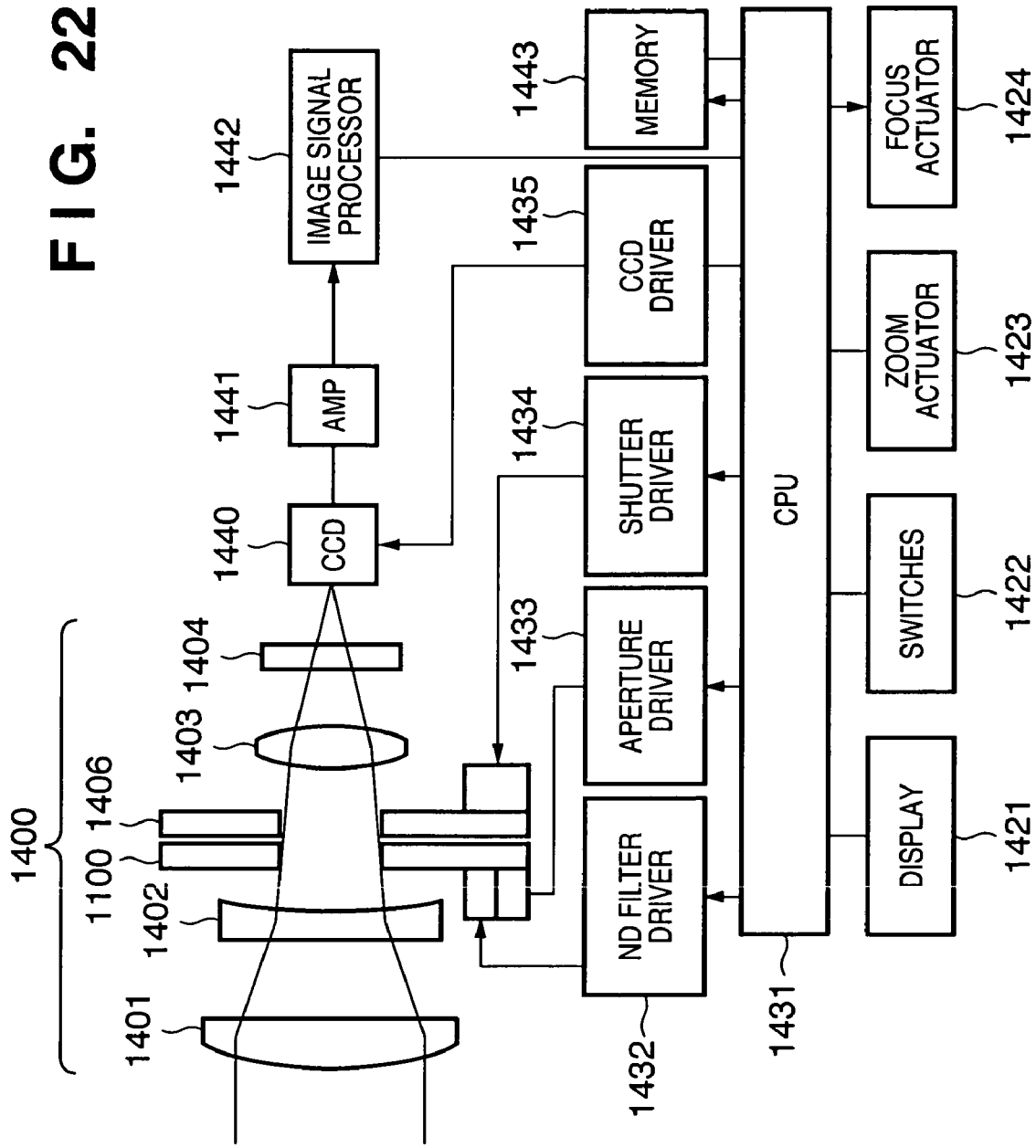
FIG. 22 is a block diagram of a photographing apparatus according to the fourth embodiment.

FIG. 22 shows an arrangement in which the light amount control apparatus 1100 explained in FIGS. 18 to 21B is incorporated into a photographing apparatus. In this embodiment, the photographing apparatus will be explained by taking as an example a digital camera in which an image sensing means photoelectrically converts an optical image into an electrical signal, and still images and motion images are recorded as digital data.

A photographing optical system 1400 made up of a plurality of lens groups has a front lens group 1401, variator lens group 1402, focusing lens group 1403, and optical low-pass filter 1404. The optical specifications of the photographing optical system of this embodiment are that the focal length is 35 to 200 mm and the open-aperture F-number is 2 as specifications of a camera using a 35-mm film. Reference numeral 1100 denotes the light amount control apparatus shown in FIG. 18; and 1406, a well-known shutter mechanism which controls the exposure time.

An image sensing means 1440 is placed in the focusing position (prospective image formation plane) of the photographing optical system 1400. The image sensing means 1440 is a photoelectric converting means such as a two-dimensional CCD including a plurality of photoelectric converters which convert radiated optical energy into electric charge, a charge storage unit which stores the electric charge, and a charge transfer unit which transfers the electric charge to the outside. In this embodiment, a CCD sensor having 3,000,000 pixels is used.

An object image formed on the image sensing means 1440 is converted into an electrical signal as a charge amount of each pixel which corresponds to the brightness of the pixel. This electrical signal is amplified by an amplifier circuit 1441, and undergoes predetermined processing such as γ correction performed by a camera signal processor 1442. This processing may also be performed by digital signal processing after A/D conversion. The video signal thus obtained is recorded in a memory 1443. As the memory 1443, it is possible to use various memories, for example, a semiconductor memory such as a flash ROM, an optical memory such as a magneto-optical disk, and a magnetic memory such as a magnetic tape.

A display 1421 such as a liquid crystal display displays an object image acquired by the image sensing means 1440, the operation status of the optical apparatus, and the like. Operation switches 1422 include a zoom switch, a photographing preparation switch, a photographing start switch, a photographing mode select switch for selecting a still image mode and motion image mode, and a photographing condition switch for setting an exposure control mode, AF mode, and the like. A zoom actuator 1423 changes the focal length of the photographing optical system 1400 by driving the zoom lens group 1402. A focus actuator 1424 adjusts the focusing state of the photographing optical system 1400 by driving the focusing lens group 1403.

A CPU 1431 controls the overall photographing apparatus. An ND filter driver 1432 drives the step motor 1173 while monitoring the output from the optical position detecting means 1174 shown in FIG. 18. The ND filter driver 1432 adjusts the rotational angle of the ND filter 1151, and controls the transmittance of the beam passing opening to a desired value. An aperture driver 1433 drives the step motor 1171 while monitoring the output from the optical position detecting means 1172 shown in FIG. 18. The aperture driver 1433 adjusts the rotational angle of the windmill 1131, and controls the aperture value, that is, the F-number to a desired value. A shutter driver 1434 controls the exposure time of the image sensing means 1440 by driving the shutter mechanism 1406.

<CPU Flow>

Figure 23:
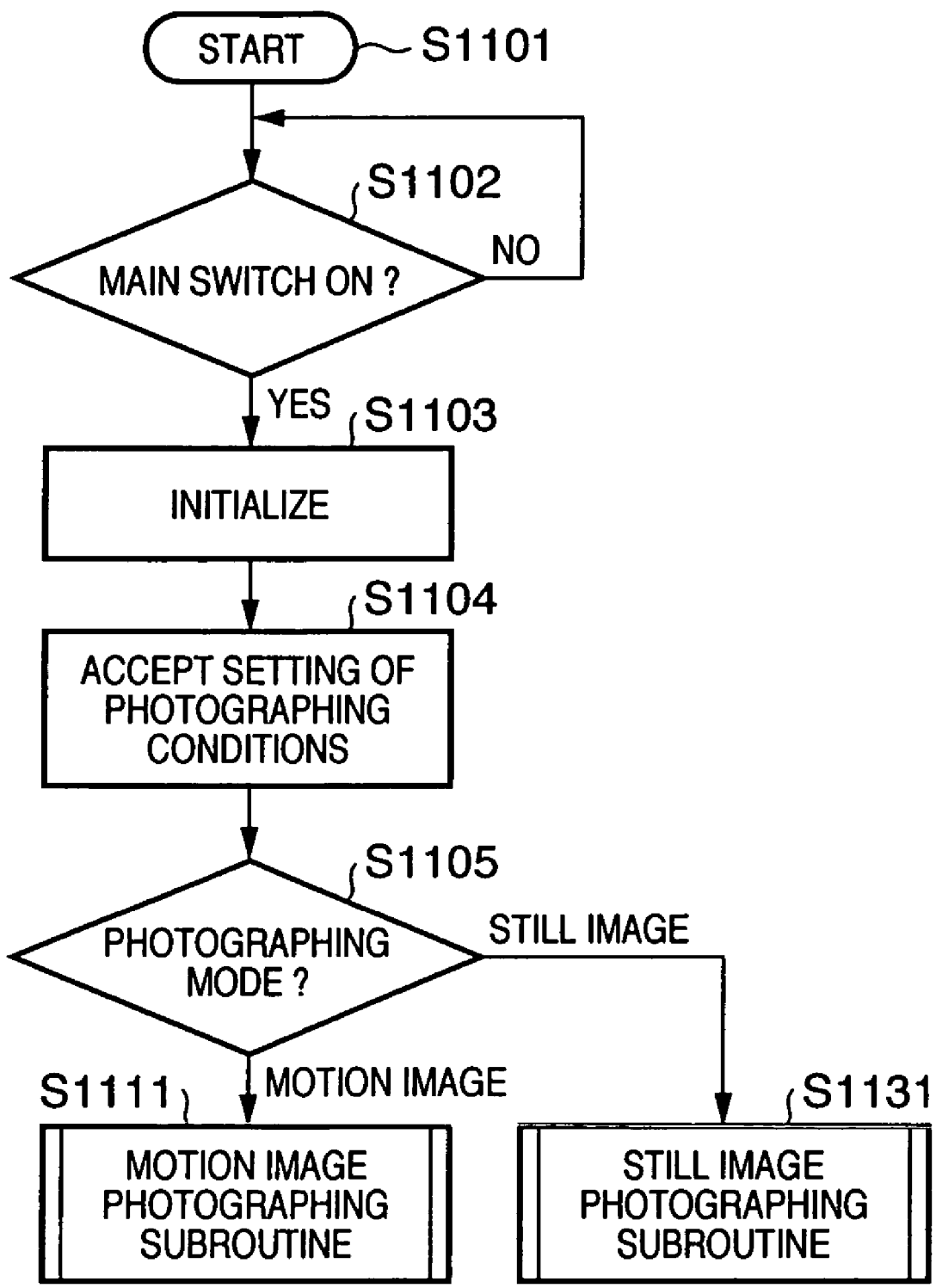
FIG. 23 is a flow chart of a main control flow of the photographing apparatus according to the fourth embodiment.
Figure 24:
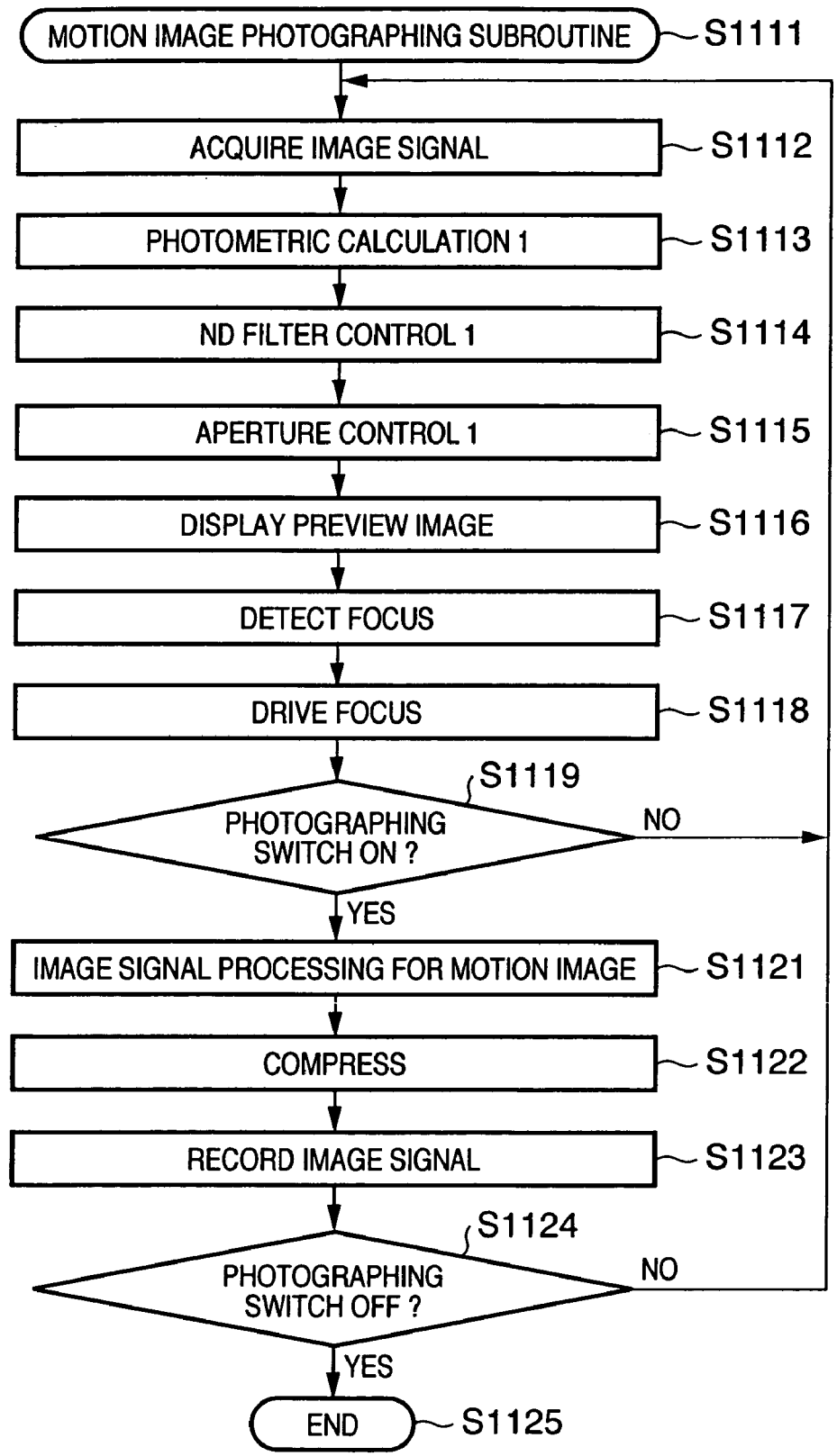
FIG. 24 is a flow chart of a motion image photographing subroutine flow in the fourth embodiment.
Figure 25:
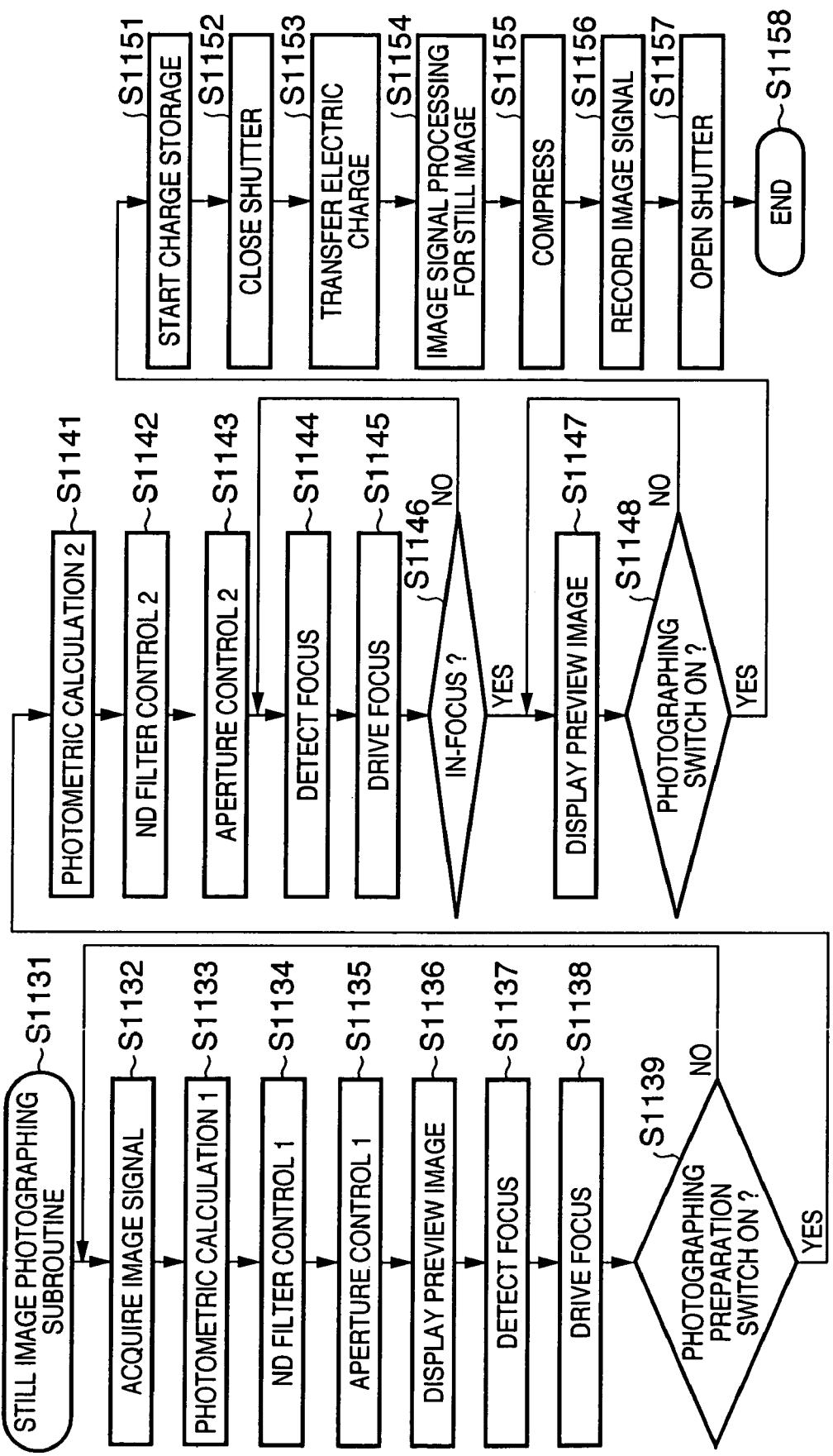
FIG. 25 is a flow chart of a still image photographing subroutine flow in the fourth embodiment.

FIGS. 23 to 25 are control flow charts of the CPU 1431 of the photographing apparatus shown in FIG. 22. First, a main control flow of the photographing apparatus will be explained below with reference to FIG. 23.

In step S1102 after step S1101, whether a main switch is turned on by a photographer is determined. If the main switch is not turned on, the flow stays in step S1102. If it is determined in step S1102 that the main switch is turned on, the CPU 1431 leaves a sleep state and executes processing from step S1103.

In step S1103, the CPU 1431 initializes the photographing apparatus. More specifically, the CPU 1431 extends the photographing optical system in a collapsed state to a photographable state, and resets the ND filter and aperture blades in the light amount control apparatus 1100 to the initial positions. In step S1104, the CPU 1431 accepts the settings of a photographing mode which determines whether to perform still image photographing or motion image photographing, and the settings of the various photographing conditions such as the exposure control mode, the focusing mode, the white balance mode, and the image size for still image photographing.

In step S1105, the CPU 1431 discriminates the photographing mode set in step S1104. If the motion image photographing mode is set, the flow advances to a motion image photographing subroutine in step S1111. If the still image photographing mode is set, the flow advances to a still image photographing subroutine in step S1131.

<Motion Image Photographing Subroutine>

FIG. 24 is a motion image photographing subroutine flow chart which is a control flow if the flow branches to step S1111 in FIG. 23. In step S1112 after step S1111, the CPU 1431 acquires an image signal by the image sensing means 1440, and performs predetermined image processing by the image signal processor 1442. In step S1113, the CPU 1431 performs photometric calculation 1. Photometric calculation 1 is a photometric calculation for motion image photographing. That is, the CPU 1431 calculates the control amount of the light amount control apparatus 100 by using the maximum value, minimum value, mean value, and the like of the image information acquired in step S1112. Details of this calculation will be described later. In step S1114, the CPU 1431 rotates the ND filter 1151 on the basis of the ND filter density control value calculated by photometric calculation 1. In step S1115, the CPU 1431 rotates the windmill 1131 and controls the stop aperture to a predetermined F-number on the basis of the aperture control value calculated by photometric calculation 1. In step S1116, the CPU 1431 converts the image signal acquired in step S1112 into a preview image, and displays this preview image on the display 1421.

In steps S1117 and S1118, the CPU 1431 adjusts the focus of the photographing optical system 1400. This focus adjustment is focusing control so-called hill-climbing servo AF which stops lenses by finding a focus position at which the high-frequency component of an image signal takes a maximum value. In step S1123, the CPU 1431 determines whether an in-focus image is obtained. If no in-focus image is obtained, the CPU 1431 repetitively executes steps S1121 and S1122. If an in-focus image is obtained, the CPU 1431 stops driving the focusing lens, and the flow advances to step S1131.

In step S1119, the CPU 1431 determines whether a photographing switch for motion image photographing is turned on by the photographer. If the photographing switch is not turned on, the flow returns to step S1112 to repetitively execute the light amount control, focusing control, and preview image display. If it is determined in step S1119 that the photographing switch is turned on, the flow advances from step S1119 to step S1121.

In step S1121, the CPU 1431 reduces the image signal acquired by the image sensing means 1440 into 300,000 pixels which is the number of pixels for a motion image, and performs image processing for a motion image. In step S1122, the CPU 1431 performs image compression for motion image recording. In step S1123, the CPU 1431 records the compressed image signal in the memory 1443.

In step S1124, the CPU 1431 determines whether the photographing switch is turned off by the photographer. If the photographing switch is not turned off, the flow returns to step S1112 to repetitively control the light amount, control the focusing, display the preview image, and record the motion image for recording into the memory. If it is determined in step S1124 that the photographing switch is turned off, the CPU 1431 terminates the photographing in step S1125.

<Photometric Calculation>

Figure 26A:
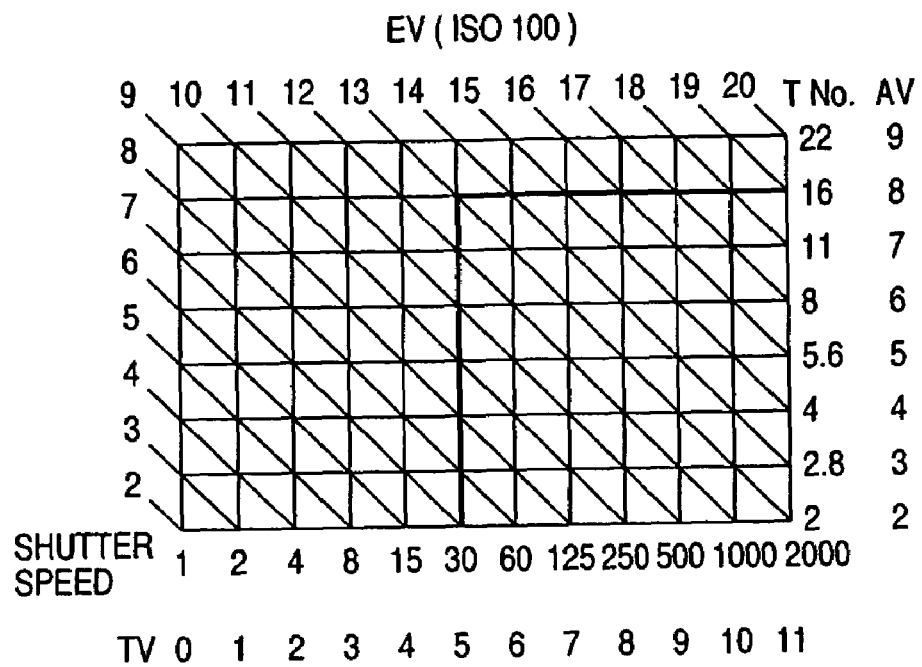
FIGS. 26A and 26B are graphs for explaining exposure control during motion image photographing in the fourth embodiment.
Figure 26B:
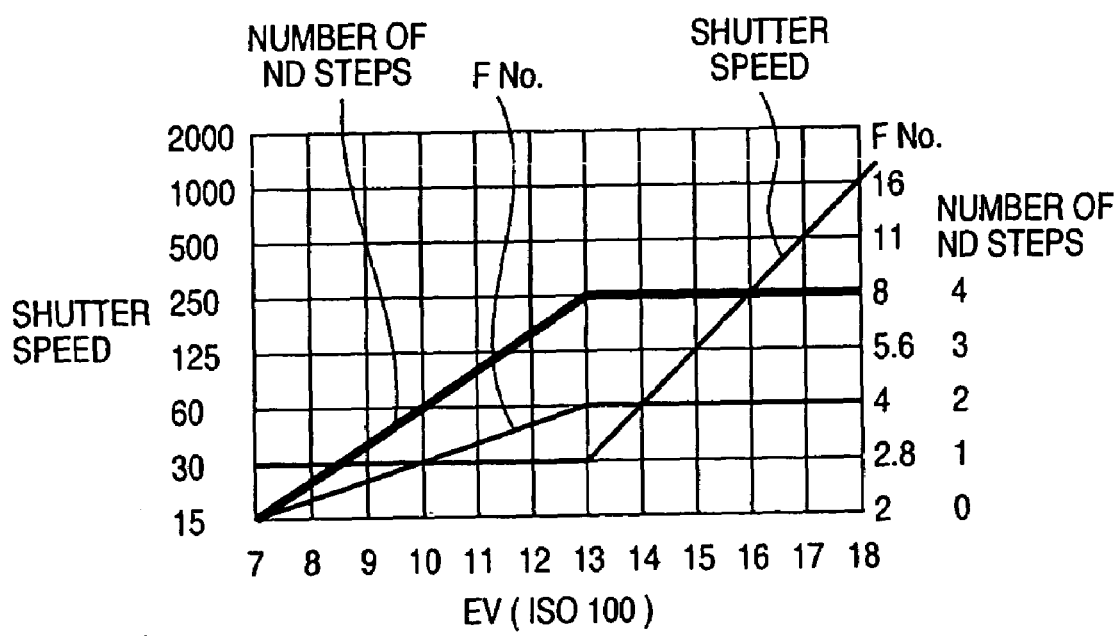

FIGS. 26A and 26B are graphs for explaining the control form of photometric calculation 1 in step S1113 of FIG. 24. FIG. 26A is a graph called an EV diagram used to explain the exposure control program of a still camera. FIG. 26B is a diagram for explaining the control state of the ND filter with respect to the brightness of an object. FIG. 26A will be described first.

Correct exposure of a still camera is generally obtained by using APEX equation (10) below.

$$AV + TV = BV + SV = EV \tag{10}$$

where AV is the aperture value, TV is the time value, BV is the luminance value, SV is the film speed value, and EV is the exposure value. In FIG. 26A, the abscissa indicates the shutter speed (more accurately, the reciprocal of each indicated numeral value is the actual exposure time) and the corresponding TV, and the ordinate indicates the F-number of the stop mechanism and the corresponding AV. In this embodiment, both the iris stop and ND filter are used in light amount control. Therefore, the T-number obtained by adding the transmittance of the ND filter to the F-number is plotted on the ordinate. The T-number and AV are represented by $$T\text{-number} = F\text{-number}/(ND \text{ filter transmittance } Tr) \tag{11}$$

$$\begin{aligned} AV(\text{equivalent to } T\text{-number}) &= AV(\text{equivalent to } F\text{-number}) - \\ &\quad \text{Log}_2(Tr/100) \\ &= AV(\text{equivalent to } F\text{-number}) + \\ &\quad \text{number of } ND \text{ steps} \end{aligned} \tag{12}$$

In FIG. 26A, 45° lines represent equal EVs. The EV when the sensitivity of the image sensing element is equivalent to ISO100 is indicated in the upper left end of each 45° line.

<Exposure Control in Motion Image Photographing Mode>

FIGS. 26A and 26B are exposure control diagrams in the motion image photographing mode. During motion image photographing, the mechanical shutter 1406 placed in the photographing optical system is not used, and an electronic shutter function of the image sensing means 1440 is used. The slowest shutter speed is determined by a motion image photographing interval, that is, a so-called frame rate. In this embodiment, the frame rate is 30 [frame/sec], so the slowest shutter speed is approximately ⅓₀ sec.

The program diagram of exposure control under the above conditions will be explained below. First, in a region where the EV is 2 (inclusive) to 7 (exclusive), the shutter speed and lens T-number are fixed to ⅓₀ sec and 2, respectively. Accordingly, no correct exposure amount can be obtained if the EV is 7 or less. In this case, the amplification gain of an image signal from the image sensing means 1440 is increased.

In a region where the EV is 7 (inclusive) to 13 (exclusive), a correct exposure amount is obtained by fixing the shutter speed to ⅓₀ sec, and changing the lens T-number from 2 to 16. In a region of EV13 to EV19, a correct exposure amount is obtained by fixing the lens T-number to 16, and changing the shutter speed of the electronic shutter from ⅓₀ sec to ½₀₀₀ sec.

Next, combinations of the densities of the ND filter and the F-numbers of aperture control at individual EVs will be explained below with reference to FIG. 26B. In FIG. 26B, the EV is plotted on the abscissa, the shutter speed is plotted on the left ordinate, and the F-number and the number of ND steps are plotted on the right ordinate. In a region where the EV is 2 (inclusive) to 7 (exclusive), the shutter speed is ⅓₀ sec, the F-number of aperture control is F2 as an open-aperture F-number, and the number of ND steps of the ND filter is 0. That is, the transparent portion 1151a shown in FIG. 19 is used, and all these value are fixed in an arbitrary region of EV7 or less.

In a region where the EV is 7 (inclusive) to 13 (exclusive), the shutter speed is fixed to ⅓₀ sec, the F-number of aperture control is continuously variable from F2 to F8, and the number of ND steps of the ND filter is continuously variable from 0 to 4. In a region of EV13 to EV19, the F-number of aperture control is fixed to F8, the number of ND steps of the ND filter is fixed to 4, and the shutter speed of the electronic shutter is changed from ⅓₀ to ½₀₀₀ sec.

In the above control, all the states shown in FIGS. 20A to 20E of the ND filter are used. Therefore, the amount of light beam passing through the aperture can be continuously attenuated by rotating the ND filter.

When the brightness of an object changes during motion image photographing, the F-number and the transmittance of the ND filter are continuously changed by the above light amount control. Consequently, the continuity of exposure control is maintained, and natural motion images are obtained. Also, the use of the ND filter makes it possible to prevent the iris stop from being narrowed more than necessary. Since this alleviates small-aperture diffraction, high-resolution motion images are obtained.

<Still Image Photographing Subroutine>

FIG. 25 is a subroutine flow chart of still image photographing. That is, FIG. 25 shows a control flow when the flow branches to step S1131 in FIG. 23. In step S1132 after step S1131, the CPU 1431 acquires an image signal by the image sensing means 1440, and performs predetermined image processing by the image signal processor 1442. In step S1133, the CPU 1431 performs photometric calculation 1. Although this flow is a still image photographing subroutine, image acquisition is performed in the motion image mode during preview before still image photographing. Accordingly, the same calculation as in step S1113 of FIG. 24 is performed in this photometric calculation. In step S1134, the CPU 1431 rotates the ND filter 1151 on the basis of the ND filter density control value calculated by photometric calculation 1. In step S1135, the CPU 1431 rotates the windmill 1131 on the basis of the aperture control value calculated by photometric calculation 1, thereby controlling the stop aperture to a predetermined F-number. In step S1136, the CPU 1431 converts the image signal acquired in step S1132 into a preview image, and displays this preview image on the display 1421.

In steps S1137 and S1138, the CPU 1431 adjusts the focus of the photographing optical system 1400. That is, the CPU 1431 executes the same hill-climbing servo AF as in steps S1117 and S1118 of FIG. 24.

In step S1139, the CPU 1431 determines whether a photographing switch for still image photographing is turned on by the photographer. If the photographing switch is not turned on, the flow returns to step S1132 to repetitively execute the light amount control, focusing control, and preview image display. If it is determined in step S1139 that the photographing switch is turned on, the flow advances from step S1139 to step S1141.

In step S1141, the CPU 1431 performs photometric calculation 2. Photometric calculation 2 is a photometric calculation for still image photographing. That is, the CPU 1431 calculates the control amount of the light amount control apparatus 1100 by using the maximum value, minimum value, mean value, and the like of the image signal acquired in step S1132. Details of photometric calculation 2 will be described later. In step S1142, the CPU 1432 rotates the ND filter 1151 on the basis of the ND filter density control value calculated by photometric calculation 2. In step S1143, the CPU 1432 rotates the windmill 1131 on the basis of the aperture control value calculated by photometric calculation 2, thereby controlling the stop aperture to a predetermined F-number.

In steps S1144 and S1145, the CPU 1431 adjusts the focus of the photographing optical system 1400 again. In step S1146, the CPU 1431 determines whether an in-focus image is obtained. If no in-focus image is obtained, the CPU 1431 repetitively executes steps S1144 and S1145. If an in-focus image is obtained, the CPU 1431 stops driving of the focusing lens, and displays the in-focus preview image in step S1147.

In step S1148, the CPU 1431 determines whether the photographing switch for still image photographing is turned on by the photographer. If the photographing switch is not turned on, the flow returns to step S1147 to keep displaying the preview image. If it is determined in step S1148 that the photographing preparation switch is turned on, the flow advances from step S1148 to step S1151.

In step S1151, to acquire an image for still image recording, the CPU 1431 starts storing electric charge in the image sensing means 1440. In step S1152, on the basis of the shutter speed calculated by photometric calculation 2 in step S1141, the CPU 1431 drives the shutter blades of the shutter mechanism 1406 to close these shutter blades, thereby interrupting a light beam to the image sensing means 1440. In step S1153, the CPU 1431 transfers the electric charge from the image sensing means 1440. In step S1154, the CPU 1431 performs still image processing for the acquired image signal equivalent to 3,000,000 pixels. In step S1155, the CPU 1431 performs image compression for still image recording. In step S1156, the CPU 1431 records the compressed image signal in the memory 1443.

In step S1157, the CPU 1431 drives the shutter blades of the shutter mechanism 406 to open these shutter blades. In step S1158, the CPU 1431 terminates the photographing.

<Photometric Calculation>

Figure 27A:
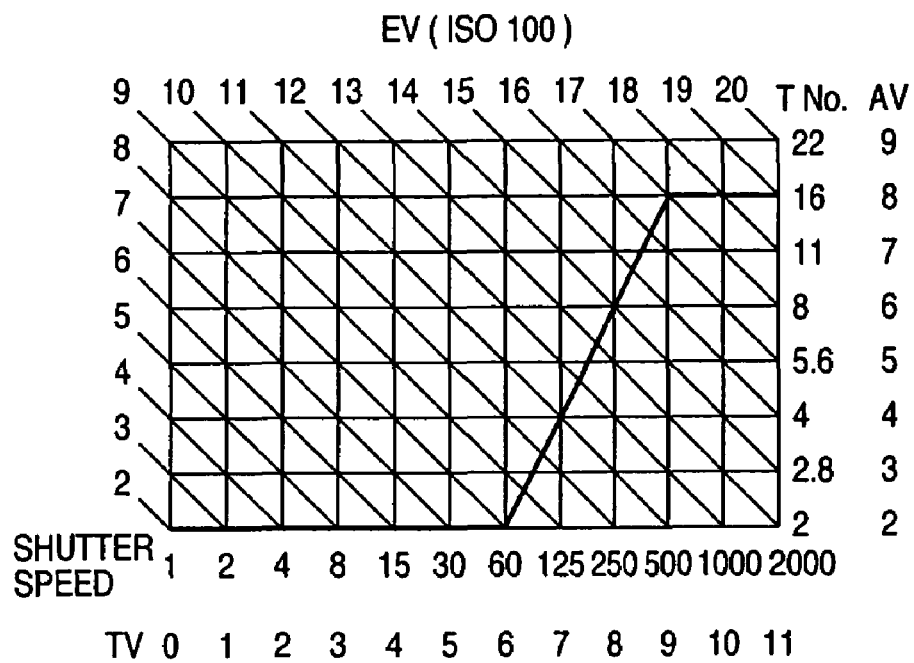
FIGS. 27A and 27B are graphs for explaining exposure control during still image photographing in the fourth embodiment.
Figure 27B:
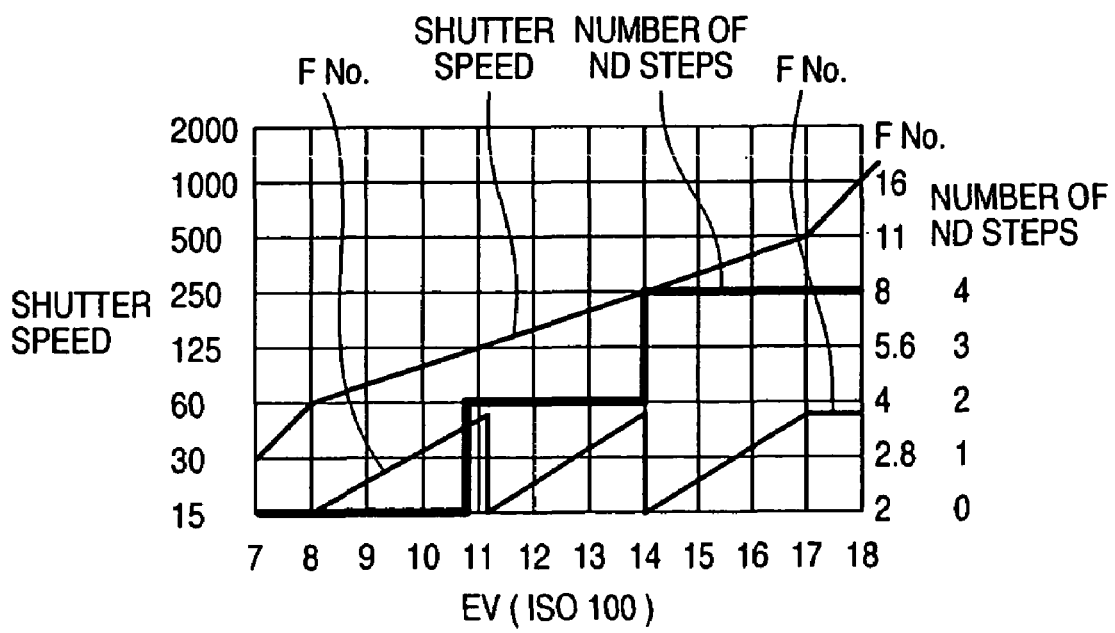

FIGS. 27A and 27B are graphs for explaining the control form of photometric calculation 2 in step S1141 of FIG. 25. FIGS. 27A and 27B correspond to FIGS. 26A and 26B, respectively.

FIGS. 27A and 27B are exposure control diagrams in the still image photographing mode. In this still image photographing, smear occurring during charge transfer can be prevented by using the mechanical shutter 1406 placed in the photographing optical system. Also, still image photographing is not controlled by the frame rate of motion image photographing. Accordingly, the slowest shutter speed can be slower than 1/30 sec.

The program diagram of exposure control under the above conditions will be explained below. First, in a region where the EV is 2 (inclusive) to 8 (exclusive), a correct exposure amount is obtained by fixing the lens T-number to 2, and changing the shutter speed from 1 to 1/60 sec.

In a region where the EV is 8 (inclusive) to 17 (exclusive), a correct exposure amount is obtained by changing the shutter speed from 1/60 to 1/500 sec, and also changing the lens T-number from 2 to 16. In a region of EV17 to EV19, a correct exposure amount is obtained by fixing the lens T-number to 16, and changing the shutter speed of the mechanical shutter from 1/500 sec to 1/2000 sec.

Next, combinations of the densities of the ND filter and the F-numbers of aperture control at individual EVs will be explained below with reference to FIG. 27B. In a region where the EV is 2 (inclusive) to 8 (exclusive), the shutter speed lowers in accordance with each EV, but the F-number of aperture control is fixed to F2 as an open-aperture F-number, and the number of ND steps of the ND filter is also fixed to 0. That is, the transparent portion 1151a shown in FIG. 19 of the ND filter 1151 is used in this region.

In a region where the EV is 8 (inclusive) to 11 (exclusive), the shutter speed is continuously variable from 1/60 to 1/125 sec, the F-number of aperture control is continuously variable from F2 to F4, and the number of ND steps of the ND filter is fixed to 0.

When the EV slightly exceeds 11, the F-number of aperture control is returned from F4 to F2, and the number of ND steps of the ND filter is switched from 0 to 2. (Referring to FIG. 27B, the switching points of the F-number and the number of ND steps are different. In practice, however, the F-number and the number of ND steps are simultaneously changed.) That is, in this stage, the uniform-density portion 1151c having an optical density of 0.6 shown in FIG. 19 of the ND filter 1151 is used.

In a region where the EV is 11 (inclusive) to 14 (exclusive), the shutter speed is continuously variable from 1/125 to 1/250 sec, the F-number of aperture control is continuously variable from F2 to F4, and the number of ND steps of the ND filter is fixed to 2.

When the EV slightly exceeds 0.14, the F-number of aperture control is returned from F4 to F2, and the number of ND steps of the ND filter is switched from 2 to 4. That is, in this stage, the uniform-density portion 1151e having an optical density of 1.2 shown in FIG. 19 of the ND filter 1151 is used.

In a region where the EV is 14 (inclusive) to 17 (exclusive), the shutter speed is continuously variable from 1/250 to 1/500 sec, the F-number of aperture control is continuously variable from F2 to F4, and the number of ND steps of the ND filter is fixed to 4.

In a region where the EV is 17 (inclusive) to 19 (exclusive), the shutter speed is continuously variable from 1/500 to 1/2000 sec, the F-number of aperture control is fixed to F4, and the number of ND steps of the ND filter is kept fixed to 4.

In the above control, only the states shown in FIGS. 20A, 20C, and 20E of the ND filter are used, and the intermediate states shown in FIGS. 20B and 20D are not used. In other words, only the state in which the beam passing opening is completely covered with the uniform-density portion is permitted, and the state in which this opening is partially covered is inhibited. This reason is that the quality of still images is required to be higher than that of motion images, so even an out-of-focus blurred image is required to be uniform. That is, if the optical density distribution of the ND filter placed in the position of the pupil of the photographing optical system 1400 changes from one place to another as shown in FIGS. 20B and 20D, the symmetry of a blurred image deteriorates. Consequently, in a photographing scene in which the distance between a main object and the background is large and the background has a bright point, a blurred image of this bright point becomes asymmetric, and this degrades the image quality.

In this embodiment, therefore, only the uniform-density portions of the ND filter are selectively used during still image photographing. As a consequence, natural blurred images are obtained, so still images having no unnaturalness are obtained. In addition, the use of the ND filter makes it possible to prevent the iris stop from being narrowed more than necessary. Since this alleviates small-aperture diffraction, high-resolution still images are obtained.

(Fifth Embodiment)

The ND filter used in the fourth embodiment is obtained by forming, on the disk-like transparent film, the three uniform-density portions including the transparent portion, and the two gradation-density portions formed in the boundaries between the uniform-density portions.

An ND filter of the fifth embodiment described below does not have any gradation-density portion, and has only a plurality of uniform-density portions. The arrangement except for this ND filter is the same as the fourth embodiment, so a detailed explanation thereof will be omitted.

<Optical Density Distribution of Filter>

Figure 28:
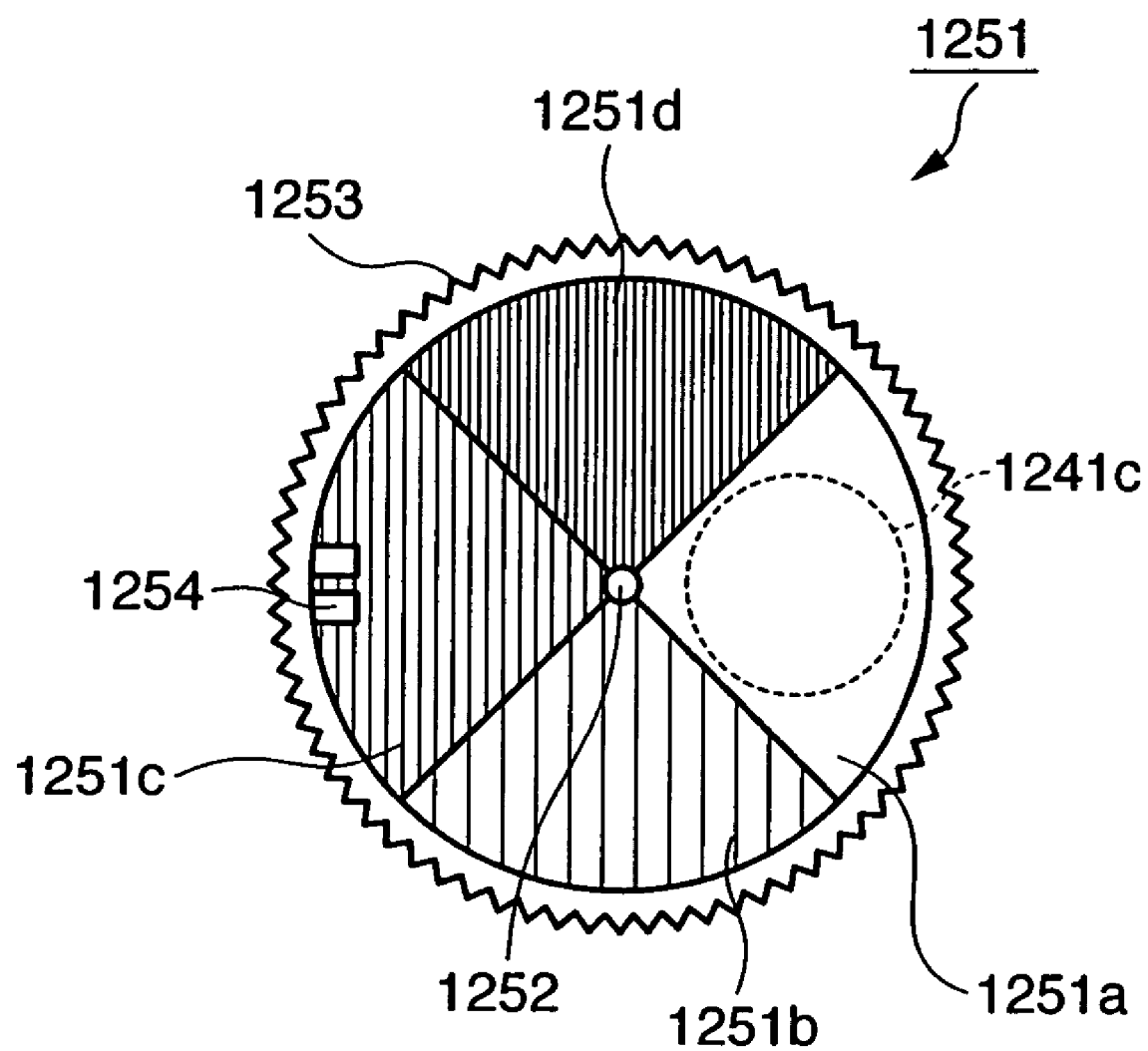
FIG. 28 is a plan view of an ND filter according to the fifth embodiment.

FIG. 28 is a plan view for explaining details of the optical density distribution of an ND filter 1251 of the fifth embodiment. FIG. 28 corresponds to FIG. 19 of the fourth embodiment. Reference numeral 1251 denotes the disk-like ND filter having the same mechanical arrangement as that of the ND filter 1151 of the fourth embodiment. That is, the ND filter 1251 is obtained by forming an ND pattern (to be described later) on a transparent resin film, for example, a PET (PolyEthylene Terephthalate) film about 0.1 mm thick by inkjet printing. A bearing 1252 is formed in the center of the ND filter 1251 and rotatably axially supported by a rotation support shaft 1242 on a partition. A gear 1253 made of a metal plate is adhered to the outer edge of the ND filter. In addition, an index 1254 for detecting the initial position of the ND filter is formed on the upper surface of the ND filter 1251.

Reference numeral 1251a denotes a uniform-density portion having an optical density of 0, that is, a transparent portion; 1251b, a uniform-density portion having an optical density of 0.45; 1251c, a uniform-density portion having an optical density of 0.9; and 1251d, a uniform-density portion having an optical density of 1.35. Each of these four uniform-density portions assumes a fan shape, and the central angle of each uniform-density portion is 90°.

<Relative Positions of Beam Passing Opening and Filter>

FIGS. 29A to 29G are views for explaining the relative positions of the beam passing opening and ND filter with respect to the rotational angle of the ND filter. FIGS. 29A to 29G correspond to FIGS. 20A to 20E of the fourth embodiment.

Figure 29A:
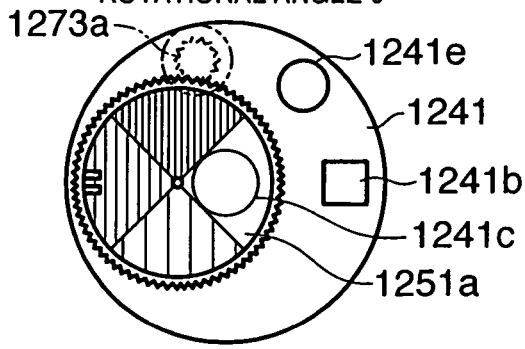
FIGS. 29A to 29G are views for explaining the rotational phase of the ND filter according to the fifth embodiment.

FIG. 29A is a view showing the state in which the rotational angle of the ND filter 1251 is 0°, that is, the ND filter 1251 is in the initial position. In this state, the whole region of an opening 1241c is covered with the transparent portion 1251a of the ND filter. That is, in this state, the transmittance of the stop aperture is uniform throughout the entire region, and the intensity distribution of a light beam passing through the aperture is uniform. In other words, the pupil intensity distribution viewed from the image formation plane is uniform.

Figure 29B:
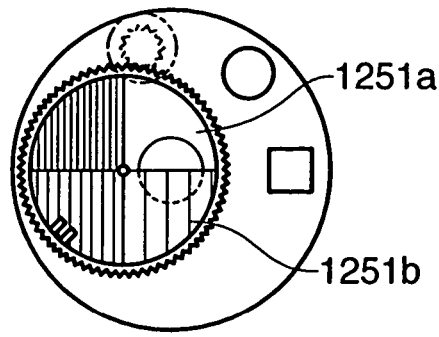

FIG. 29B shows the state in which the rotational angle of the ND filter 1251 is 45°. In this state, the upper half of the opening 1241c is covered with the transparent portion 1241a, and the lower half is covered with the uniform-density portion 1241b having an optical density of 0.45. In other words, the uniform-density portion 1251a or 1251b of the ND filter partially covers the opening 1241c. In this state, the transmittance of the stop aperture changes from one place to another, so the intensity distribution of a light beam passing through the aperture is nonuniform. In other words, the pupil intensity distribution viewed from the image formation plane is nonuniform.

Figure 29C:
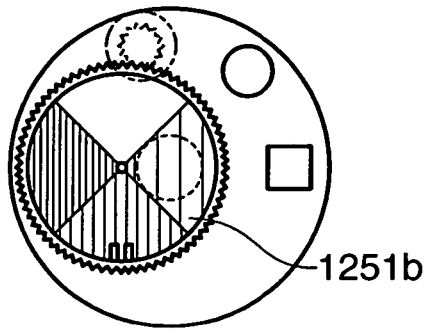

FIG. 29C shows the state in which the rotational angle of the ND filter 1251 is 90°. In this state, the opening 1241c is entirely covered with the uniform-density portion 1251b having an optical density of 0.45. That is, in this state, the transmittance of the stop aperture is uniform throughout the entire region, and the intensity distribution of a light beam passing through the aperture is uniform. In other words, the pupil intensity distribution viewed from the image formation plane is also uniform.

Figure 29D:
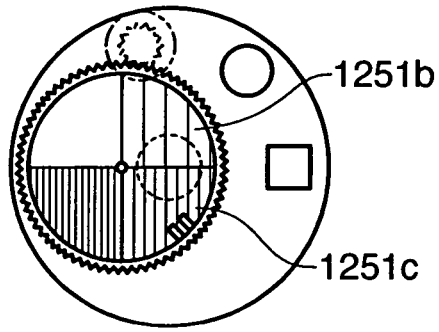
Figure 29E:
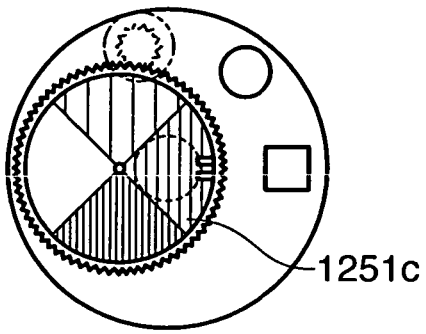
Figure 29F:
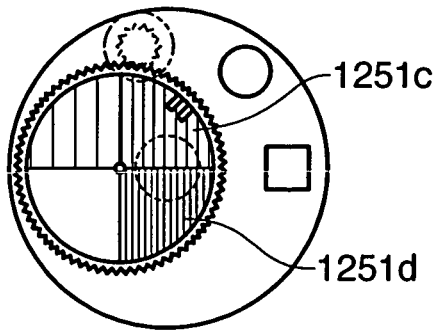
Figure 29G:
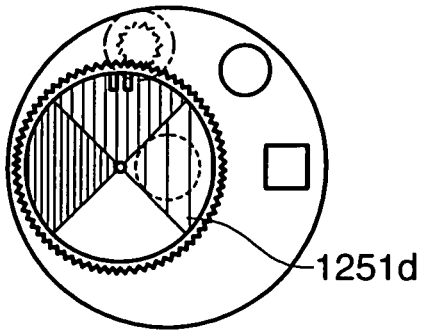

Similarly, FIGS. 29D to 29F illustrate the states in which the rotational angle of the ND filter 1251 increases step by step by 45° at one time. In these states, the transmittance of the opening 1241c alternately becomes nonuniform and uniform.

<Light Amount Control Function>

Figure 30:
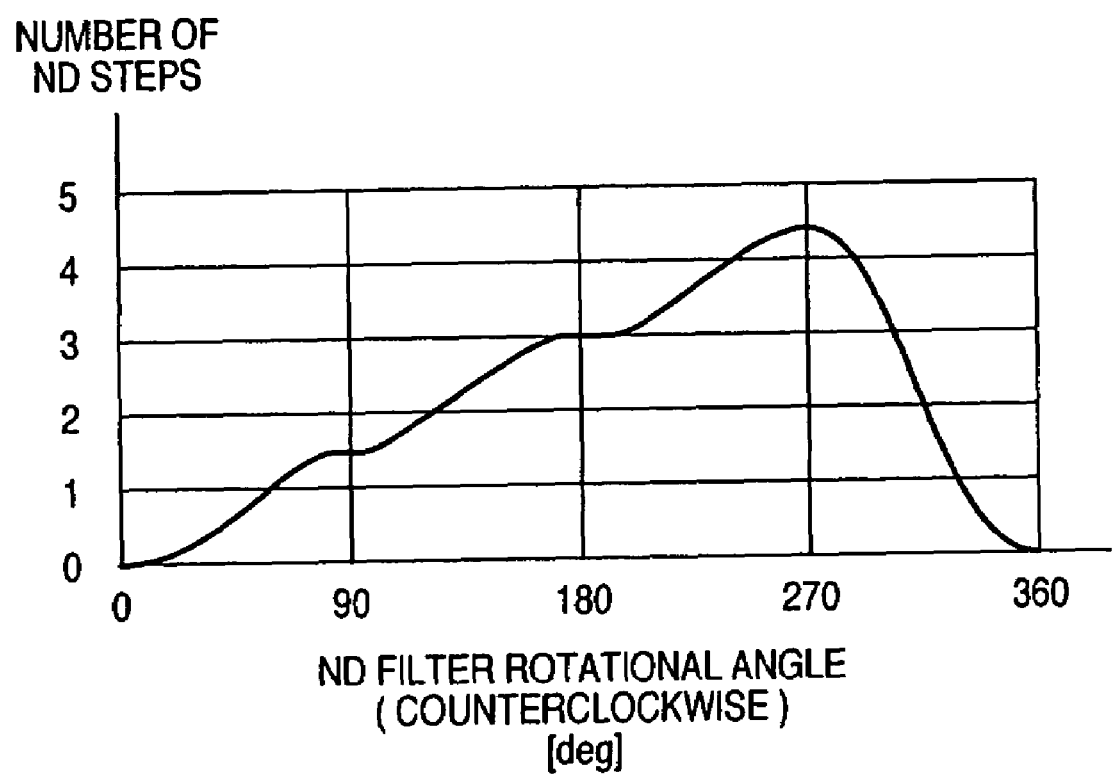
FIG. 30 is a graph for explaining the light amount control function of the light amount control apparatus according to the fifth embodiment.

FIG. 30 is a graph for explaining the light amount control function of the ND filter 1251 shown in FIG. 28. FIG. 30 corresponds to FIG. 21B of the fourth embodiment.

FIG. 30 is a graph showing the number of ND steps as a function of the rotational angle of the ND filter 1251. As the ND filter 1251 rotates, regions from the zero-density region to the highest-density region cover the stop aperture, so the number of ND steps changes from 0 to 4.5. However, since the uniform-density portions and boundaries of the ND filter alternately cover the aperture, the change in number of ND steps is nonlinear. That is, the rate of change is 0 at 0°, 90°, 180°, and 270° at which the uniform-density portion covers the aperture.

<Exposure Control in Motion Image Photographing Mode>

Figure 31A:
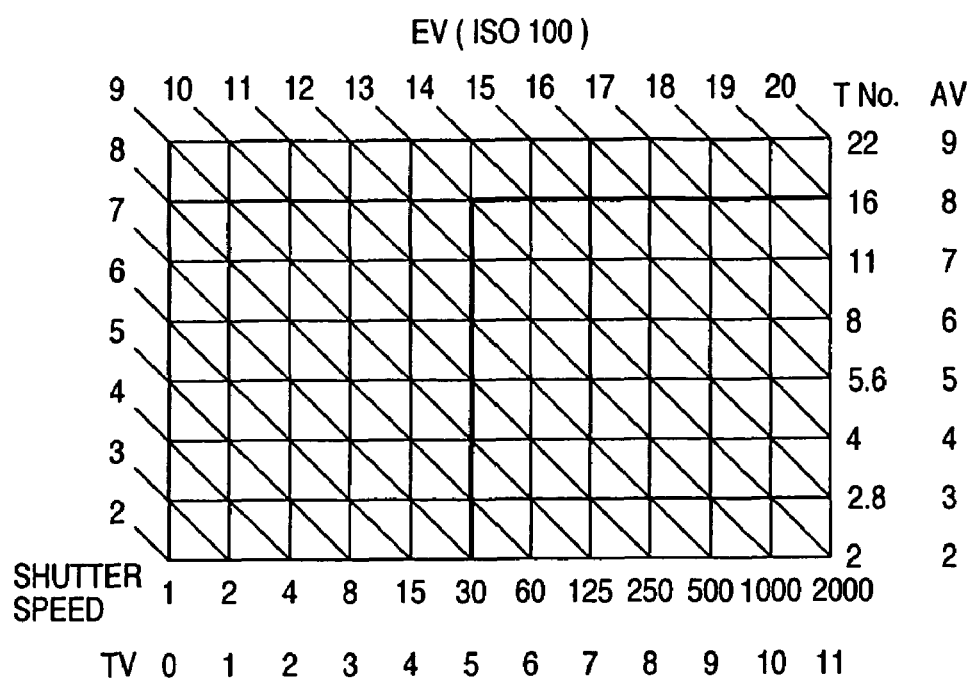
FIGS. 31A and 31B are graphs for explaining exposure control during motion image photographing in the fifth embodiment.
Figure 31B:
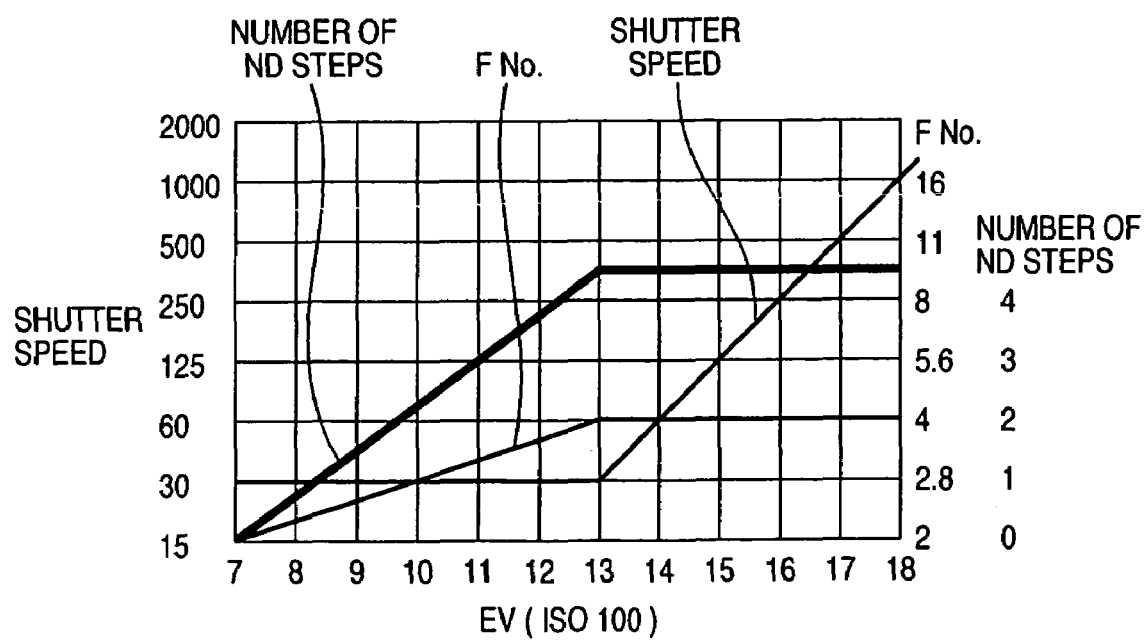

FIGS. 31A and 31B are exposure control diagrams when the ND filter 1251 of the fifth embodiment is incorporated into a photographing apparatus, and photographing is performed in a motion image mode. FIGS. 31A and 31B correspond to FIGS. 26A and 26B of the fourth embodiment. The only difference is that the largest number of steps of the ND filter is 4 in the fourth embodiment, whereas it is 4.5 in the fifth embodiment.

<Exposure Control in Still Image Photographing Mode>

Figure 32A:
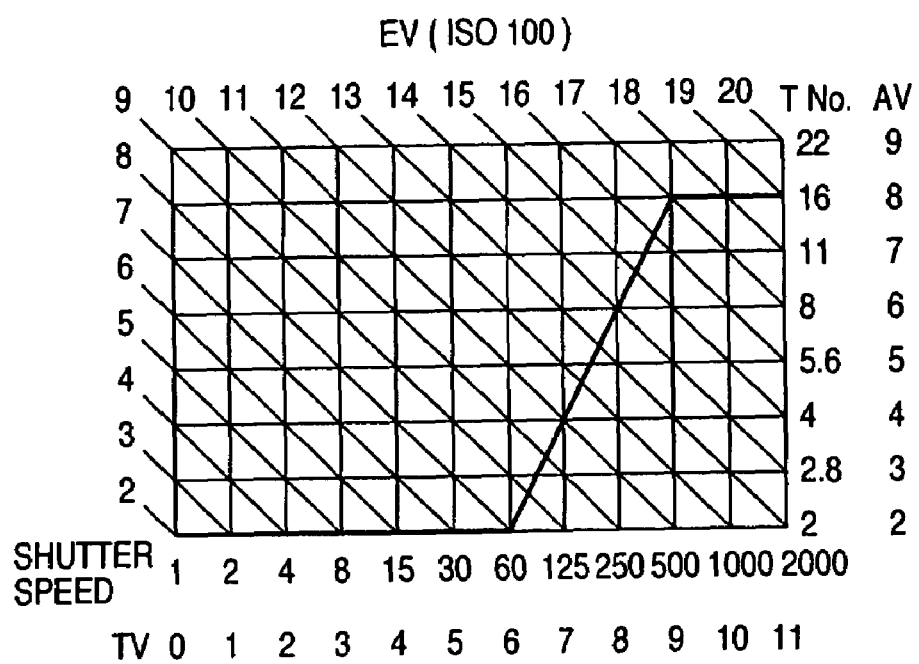
FIGS. 32A and 32B are graphs for explaining exposure control during still image photographing in the fifth embodiment.
Figure 32B:
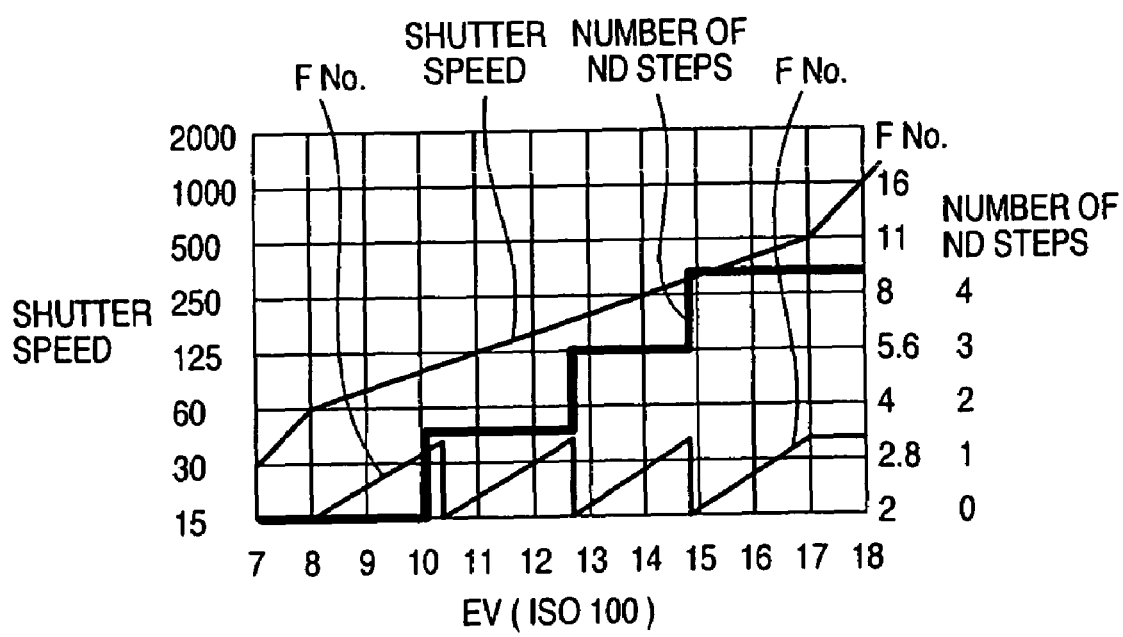

FIGS. 32A and 32B are exposure control diagrams when the ND filter 1251 of the fifth embodiment is incorporated into a photographing apparatus, and photographing is performed in a still image mode. FIGS. 32A and 32B correspond to FIGS. 27A and 27B of the fourth embodiment. The ND filter 1251 of the fifth embodiment has the four uniform-density portions including the transparent portion, and the density difference between these regions is 0.45. Therefore, the difference between the numbers of ND steps is 1.5 when calculated by equation (9) presented earlier. Accordingly, substantially the same effect as in the fourth embodiment is obtained by controlling the F-number and the number of ND steps as shown in FIG. 32B in accordance with an increase in EV of an object.

Since the ND filter 1251 of this embodiment need not have any gradation-density portion, the ND filter 1251 may also be formed by using, for example, offset printing or vapor deposition, instead of ink-jet printing.

In the ND filter 1251 of this embodiment, a density difference of 0.45 is produced in the boundary between the uniform-density portions. When the density difference is as small as this one, image quality deterioration caused by diffraction is allowable. Therefore, image quality deterioration can be permitted even when photographing is performed while the boundary enters into the pupil in the motion image photographing mode.

In the ND filters of the fourth and fifth embodiments, the size of each uniform-density portion is larger than the effective beam diameter at open aperture. However, to downsize the light amount control apparatus, it is also possible to set the size of the uniform-density portion to a value slightly smaller than the effective beam diameter, for example, about 80% of the effective beam diameter. In this case, the light amount becomes slightly insufficient in the periphery of a blurred image at open aperture. However, this insufficiency of the light amount produces almost no unnaturalness on a blurred image, and any actual harm is completely prevented by stopping down the aperture by one step.

As described above, in the 10th light amount control apparatus according to this application, the ND filter used to control the light amount of a light beam passing through the photographing optical system has a uniform-density portion in at least a partial region of the filter. The apparatus has the first control mode which allows the uniform-density portion to partially cover the stop aperture, and the second control mode which inhibits the uniform-density portion to partially cover the stop aperture. This makes it possible to selectively attach importance to the continuity of light amount control, or to the naturalness of a blur of an image.

In the 11th light amount control apparatus according to this application, the ND filter has a plurality of uniform-density portions different in optical density. Therefore, the density difference between the uniform-density portions can be decreased. Since this alleviates diffraction when the boundary between the uniform-density portions is used, both the continuity of light amount control and the prevention of diffraction can be accomplished.

The 12th photographing apparatus according to this application automatically selects the first control mode when motion image photographing is to be performed, and the second control mode when still image photographing is to be performed. Accordingly, even when the luminance of an object changes during motion image photographing, the continuity of light amount control by the ND filter is maintained. Also, when still image photographing is performed, natural blurred images are obtained, and no diffraction is caused by the density difference of the ND filter. As a consequence, high-quality still images are obtained.

The 13th ND filter according to this application makes it possible to obtain an optical filter which achieves, in a well-balanced manner, the individual functions such as the attenuation of the light amount, the prevention of diffraction caused by the density difference, and the prevention of deterioration of blurred images.

The 14th ND filter according to this application makes it possible to obtain a small-sized, inexpensive, multifunction ND filter.

As described above, the fourth and fifth embodiments can provide a filter having a predetermined density distribution, and a light amount control apparatus and photographing apparatus having this filter and capable of obtaining high-quality images.

As many apparently widely different embodiments of the present invention can be made without departing from the spirit and scope thereof, it is to be understood that the invention is not limited to the specific embodiments thereof except as defined in the appended claims.

What is claimed is:

1. A light amount control apparatus for controlling an amount of a light beam passing through an opening, comprising:
   a filter having a first region having a first optical density;
   a driving device which moves the first region relative to the opening; and
   a controller which can select a first control mode which permits the first region to partially cover the opening, and a second control mode which inhibits the first region to cover a portion of the opening,
   wherein said filter has a second region having a second optical density, and an optical density of a boundary portion between the first and second regions changes step by step or continuously.

2. A photographing apparatus comprising a photographing optical system, an image sensing device, and a light amount control apparatus for controlling an amount of a light beam passing through an opening, the light amount control apparatus comprising:
   a filter having a first region having a first optical density;
   a driving device which moves the first region relative to the opening; and
   a controller which can select a first control mode which permits the first region to partially cover the opening, and a second control mode which inhibits the first region to cover a portion of the opening,
   wherein the first control mode corresponds to motion image photographing, and the second control mode corresponds to still image photographing.

* * * * *